(12) United States Patent
Stinson et al.

(10) Patent No.: US 12,313,529 B2
(45) Date of Patent: May 27, 2025

(54) FLUID ANALYZER WITH SELF-CHECK, LEAK DETECTION, AND ADJUSTABLE GAIN

(71) Applicant: DAYLIGHT SOLUTIONS, INC., San Diego, CA (US)

(72) Inventors: H. T. Stinson, San Diego, CA (US); Rudy Bermudez, San Diego, CA (US); Mark Bermal, San Diego, CA (US); Jeremy Rowlette, Escondido, CA (US); David Francis Arnone, Mountain View, CA (US); Edeline Fotheringham, San Diego, CA (US); Ronald Arp, Ramona, CA (US)

(73) Assignee: Daylight Solutions, Inc., San Diego, CA (US)

(*) Notice: Subject to any disclaimer, the term of this patent is extended or adjusted under 35 U.S.C. 154(b) by 374 days.

(21) Appl. No.: 17/792,115

(22) PCT Filed: Jan. 28, 2021

(86) PCT No.: PCT/US2021/015465
§ 371 (c)(1),
(2) Date: Jul. 11, 2022

(87) PCT Pub. No.: WO2021/154977
PCT Pub. Date: Aug. 5, 2021

(65) Prior Publication Data
US 2023/0061661 A1    Mar. 2, 2023

Related U.S. Application Data

(60) Provisional application No. 62/966,729, filed on Jan. 28, 2020.

(51) Int. Cl.
*G01N 21/39*    (2006.01)
*G01N 21/27*    (2006.01)
(Continued)

(52) U.S. Cl.
CPC .......... *G01N 21/276* (2013.01); *G01N 21/39* (2013.01); *G01N 29/30* (2013.01); *G01N 30/74* (2013.01); *G01N 2030/027* (2013.01)

(58) Field of Classification Search
CPC .......... G01N 1/00; G01N 21/00; G01N 21/01; G01N 11/00; G01N 2021/178;
(Continued)

(56) References Cited

U.S. PATENT DOCUMENTS 3,798,459 A    3/1974    Anderson et al.
4,773,755 A    9/1988    Huber
(Continued)

FOREIGN PATENT DOCUMENTS

CA    2889982 A1    10/2016
JP    2006003165 A    1/2006
(Continued)

OTHER PUBLICATIONS

International Search Report and Written Opinion issued in PCT Serial No. PCT/US21/15465, on Jun. 30, 2021 by the International Searching Authority Europe.
(Continued)

*Primary Examiner* — Don K Wong
(74) *Attorney, Agent, or Firm* — ROEDER & BRODER LLP; Steven G. Roeder

(57) ABSTRACT

A fluid analyzer (214) that analyzes a sample (12) includes an analyzer frame (236); a test cell assembly (242) that receives the sample (12); a laser assembly (238) that generates a laser beam (239A) a signal detector assembly (232) and a self-check assembly (230). The self-check assembly (230) includes (i) a check frame (230A); (ii) a check substance (230E) with known spectral characteristics; and (iii) a check frame mover (230B) that selectively moves the check frame (230A) between a self-check position (231 B)
(Continued)

and a test position (231 A) relative to the analyzer frame (236). In the self-check position (231 B), the laser beam (239A) is directed through the check substance (230E) to evaluate the performance of the fluid analyzer (214). In the test position (231 A), the laser beam (239A) is directed through the sample (12) in the test cell assembly (242) to evaluate the sample (12).

18 Claims, 35 Drawing Sheets

(51) Int. Cl.
*G01N 29/30* (2006.01)
*G01N 30/74* (2006.01)
*G01N 30/02* (2006.01)

(58) Field of Classification Search
CPC .. G01N 22/04; G01N 21/39; G01N 2021/395; G01N 21/59; G01N 30/74; G01N 29/30; G01N 21/276; G01N 21/0303; G01N 21/05; G01N 21/031; G01N 21/3577; G01N 30/7233; G01N 2021/056
See application file for complete search history.

(56) References Cited

U.S. PATENT DOCUMENTS

| | | | |
|---|---|---|---|
| 5,173,749 | A | 12/1992 | Tell |
| 5,774,209 | A | 6/1998 | Shestock |
| 9,759,658 | B2 | 9/2017 | Rothberg et al. |
| 10,753,856 | B2 | 8/2020 | Arnone et al. |
| 11,119,079 | B2 | 9/2021 | Weida et al. |
| 11,137,351 | B2 | 10/2021 | Weida et al. |
| 2003/0235919 | A1 | 12/2003 | Chandler |
| 2007/0047599 | A1 | 3/2007 | Wysocki et al. |
| 2008/0070318 | A1 | 3/2008 | Yamamoto |
| 2009/0079965 | A1 | 3/2009 | Forsell |
| 2011/0134431 | A1 | 6/2011 | Yokobayashi et al. |
| 2012/0212744 | A1 | 8/2012 | Okada |
| 2012/0286171 | A1 | 11/2012 | Hoshishima |
| 2013/0021612 | A1 | 1/2013 | Okada |
| 2013/0177991 | A1 | 7/2013 | Tang et al. |
| 2014/0253922 | A1 | 9/2014 | Liu |
| 2015/0070756 | A1 | 3/2015 | Priest et al. |
| 2017/0030827 | A1 | 2/2017 | Nickel et al. |
| 2017/0059478 | A1 | 3/2017 | Pol et al. |
| 2019/0107487 | A1 | 4/2019 | Rahmlow et al. |
| 2021/0018433 | A1* | 1/2021 | Liu .............. G01N 21/01 |
| 2021/0041351 | A1 | 2/2021 | Arnone et al. |

FOREIGN PATENT DOCUMENTS

| | | |
|---|---|---|
| JP | 2014055796 A | 3/2014 |
| KR | 101029775 B1 | 4/2011 |
| TW | 201135182 A | 10/2011 |

OTHER PUBLICATIONS

Official Communication pursuant to Article 94(3) EPC from the European Patent Office, dated Sep. 12, 2023, for EPO Application Serial No. 21706144.9.

International Search Report and Written Opinion issued in PCT Serial No. PCT/US21/15451, on Jun. 23, 2021 by the International Searching Authority Europe.

Partial European Search Report, European Patent Application No. EP24160506, dated Jun. 6, 2024.

Kazuto Tamura, "TDLS200 Tunable Diode Laser Gas Analyzer and its Application to Industrial Process", Jan. 1, 2010, pp. 51-54, XP093163169, Yokogawa Technical Report English Edition, vol. 53, No. 2 (2010). Retrieved by the EPO on May 16, 2024, from the internet: URL:https://web-material3.yokogawa.com/rd-te-r05302-12.pdf.

Extended European Search Report, European Patent Application No. EP24160506, dated Aug. 27, 2024.

* cited by examiner

FLUID ANALYZER WITH SELF-CHECK, LEAK DETECTION, AND ADJUSTABLE GAIN

RELATED APPLICATION

As far as permitted, the contents of U.S. Provisional Application No. 62/966,729 filed on Jan. 28, 2020, and entitled "FLUID ANALYZER FOR DETECTION AND QUANTITATION OF COMPOUNDS IN LIQUIDS" are incorporated herein.

As far as permitted, the contents of U.S. patent application Ser. No. 16/100,762 filed on Aug. 10, 2018, and entitled "FLOW CELL FOR DIRECT ABSORPTION SPECTROSCOPY" are incorporated herein.

BACKGROUND

Infrared spectroscopy of liquids is useful for characterizing liquid components. Different liquid or dissolved chemicals have strong identifying absorption features in the infrared wavelengths.

Traditionally, Fourier transform infrared (FTIR) spectrometers have been used for liquid characterization. However, liquids present unique challenges for FTIR spectroscopy. First, most liquids have strong background absorptions. Because the optical powers per wavelength available for FTIR spectrometers are quite low due to the use of broadband globar incandescent source, the path lengths through liquids that can be probed are quite small before the probe light is attenuated to unacceptably low values. Hence, FTIR is typically used to determine percent level fractions of components in liquids, and not trace additions (less than one part per thousand) to liquids that would require longer liquid path lengths for adequate sensitivity. Also, this has pushed FTIR spectroscopy to use attenuated total reflectance (ATR) interfaces. These interfaces typically result in smaller path lengths, and have the problem that they distort the spectral signatures of the chemicals being probed due to a combined effect of absorption and changing refractive index on the signal. Furthermore, ATR technique is highly sensitive to the angle of incidence of the light striking the ATR surface and therefore measurement repeatability can be poor.

Accordingly, existing systems are not entirely satisfactory for quantitative liquid spectroscopy or trace detection.

SUMMARY

The present invention is directed to a fluid analyzer that analyzes a sample.

In one implementation, the fluid analyzer includes: (i) an analyzer frame; (ii) a test cell assembly that receives the sample; (iii) a laser assembly that generates a laser beam; a signal detector assembly; and (iv) a self-check assembly. The self-check assembly can include (i) a check frame; (ii) a check substance coupled to the check frame; and (iii) a check frame mover that selectively moves the check frame between a self-check position and a test position relative to the analyzer frame. In this design, in the self-check position, the laser beam is directed through the check substance to create a check signal light that is collected by the signal detector assembly to evaluate the performance of the fluid analyzer. Alternatively, in the test position, the laser beam is directed through the sample in the test cell assembly to create a test signal light that is collected by the signal detector assembly to evaluate the sample. As provided herein, the check substance can have known spectral characteristics.

The self-check assembly can include a first check director that directs the laser beam at the check substance, the first check director being coupled to the check frame. Additionally, the self-check assembly can include a second check director that is coupled to the check frame spaced apart from the check substance and the first check director. In this design, the second check director directs the check signal light transmitted through the check substance at the signal detector assembly.

Additionally, the fluid analyzer can include a reference detector assembly; and the self-check assembly can include a check splitter element that directs a portion laser beam at the reference detector assembly and a portion of the laser beam at the check substance.

The laser assembly can be tunable over a tunable range, and a detector gain setting of the reference detector assembly can be adjusted during tuning of the laser assembly. Further, a signal gain setting of the signal detector assembly can be adjusted during tuning of the laser assembly.

The check mover can include a guide that guides the movement of the check frame relative to the analyzer frame, and an actuator that moves the check frame relative to the analyzer frame.

In one implementation, the self-check assembly includes a stop that secured to the analyzer frame, and the stop engages the check frame in the self-check position. The stop can a stop frame and a stop adjuster that engages the check frame. In this design, the stop adjuster is selectively adjustable to adjust the positon of the check frame in the self-check position.

The check mover can selectively move the check frame linearly relative to the analyzer frame between the self-check position and the test position.

In certain implementations, the laser assembly is tunable over a tunable range, and a signal gain setting of the signal detector assembly is adjusted during tuning of the laser assembly.

Additionally or alternatively, the fluid analyzer can include a leak detection assembly that detects a leak in the test cell assembly. The leak detection assembly can include a reservoir that receives sample leaking from the test cell assembly, and a leak sensor that detects when there is sufficient sample is in the reservoir.

In yet another implementation, the fluid analyzer includes: (i) a test cell assembly that receives the sample; (ii) a laser assembly that generates a tunable laser beam that is directed through the test cell assembly, the laser assembly being tunable over a tunable range; and (iii) a signal detector assembly that collects a test signal light transmitted through the test cell assembly. In this design, a signal gain setting of the signal detector assembly is adjusted as the laser assembly is tuned over at least a portion of the tunable range.

Additionally, the fluid analyzer can include a reference detector assembly; and a splitter element that splits a portion of the laser beam and directs the portion of laser beam at the reference detector assembly. Further, a reference gain setting of the reference detector assembly can be adjusted as the laser is tuned over at least a portion of the tunable range. For example, the reference gain setting of the reference detector assembly can be adjusted as the laser is tuned over at least a portion of the tunable range as a function of the absorbance of the sample; and/or the signal gain setting of the signal detector assembly can be is adjusted as the laser is tuned over at least a portion of the tunable range as a function of the absorbance of the sample.

Additionally, or alternatively, (i) the reference gain setting of the reference detector assembly can be optimized for the magnitude of the light that is expected to be received by the reference detector assembly as the laser beam is tuned; and/or (ii) the signal gain setting of the signal detector assembly is adjusted as the laser is tuned over at least a portion of the tunable range as a function of the absorbance of the sample. The adjustable gain is particularly useful to the MID-infrared wavelength range. However, the adjustable gain can be useful in other wavelength ranges as well.

In still another implementation, the fluid analyzer includes: (i) a test cell assembly that receives the sample; (ii) a laser assembly that generates a tunable laser beam that is directed through the test cell assembly, the laser assembly being tunable over a tunable range; (iii) a signal detector assembly that collects a test signal light transmitted through the test cell assembly; and (iv) a leak detection assembly that detects a leak in the test cell assembly.

For example, the leak detection assembly can include a reservoir that receives sample leaking from the test cell assembly, and a leak sensor that detects when there is sufficient sample in the reservoir.

In yet another implementation, a method for analyzing a sample includes: providing an analyzer frame; providing a test cell assembly that receives the sample; generating a laser beam with a laser assembly; providing a signal detector assembly; and analyzing the fluid analyzer with a self-check assembly. For example, the self-check assembly can includes (i) a check frame; (ii) a check substance coupled to the check frame; and (iii) a check frame mover that selectively moves the check frame between a self-check position and a test position relative to the analyzer frame. In this design, in the self-check position, the laser beam is directed through the check substance to create a check signal light that is collected by the signal detector assembly to evaluate the performance of the fluid analyzer. Alternatively, in the test position, the laser beam is directed through the sample in the test cell assembly to create a test signal light that is collected by the signal detector assembly to evaluate the sample.

In still another implementation, a method for analyzing a sample includes: providing a test cell assembly that receives the sample; generating a tunable laser beam that is directed through the test cell assembly with a laser assembly that is tunable over a tunable range; and collecting a test signal light transmitted through the test cell assembly with a signal detector assembly. In this design, a signal gain setting of the signal detector assembly is adjusted as the laser assembly is tuned over at least a portion of the tunable range.

In yet another implementation, a method for analyzing a sample includes: providing a test cell assembly that receives the sample; generating a tunable laser beam that is directed through the test cell assembly with a laser assembly, the laser assembly being tunable over a tunable range; collecting a test signal light transmitted through the test cell assembly with a signal detector assembly; and detecting a leak in the test cell assembly with a leak detection assembly.

In another implementation, the fluid analyzer comprises: an analyzer frame; a test cell module that includes a test cell assembly that receives the sample; a laser assembly that generates a laser beam that is directed through the test cell assembly, the laser assembly being coupled to the analyzer frame; and a signal detector assembly that collects a test signal light transmitted through the test cell assembly, the signal detector assembly being coupled to the analyzer frame; wherein the test cell module is selectively attachable to the analyzer frame.

The test cell module can include a module frame, and wherein the test cell assembly is selectively attachable to the module frame.

The beam director assembly directs the laser beam at the test cell assembly, wherein the beam director assembly includes at least one element that is coupled to the module frame.

In another implementation, a fluid analyzer that analyzes a sample includes: an analyzer frame; a test cell assembly that receives the sample; a self-check assembly that includes a check substance with known spectral characteristics; a laser assembly that generates a laser beam; a signal detector assembly; wherein in a self-check mode, at least a portion of the laser beam is transmitted through the check substance to create a check signal light that is collected by the signal detector assembly to evaluate the performance of the fluid analyzer.

In a test mode, at least a portion of the laser beam is transmitted through the sample to create a test signal light that is collected by the signal detector assembly In another implementation, the fluid analyzer includes: a test cell assembly that receives the sample; a laser assembly that generates a tunable laser beam that is directed through the test cell assembly, the laser assembly being tunable over a tunable range; and a signal detector assembly that collects a test signal light transmitted through the test cell assembly, wherein a gain of the signal detector assembly is adjusted as the laser assembly is tuned over at least a portion of the tunable range.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
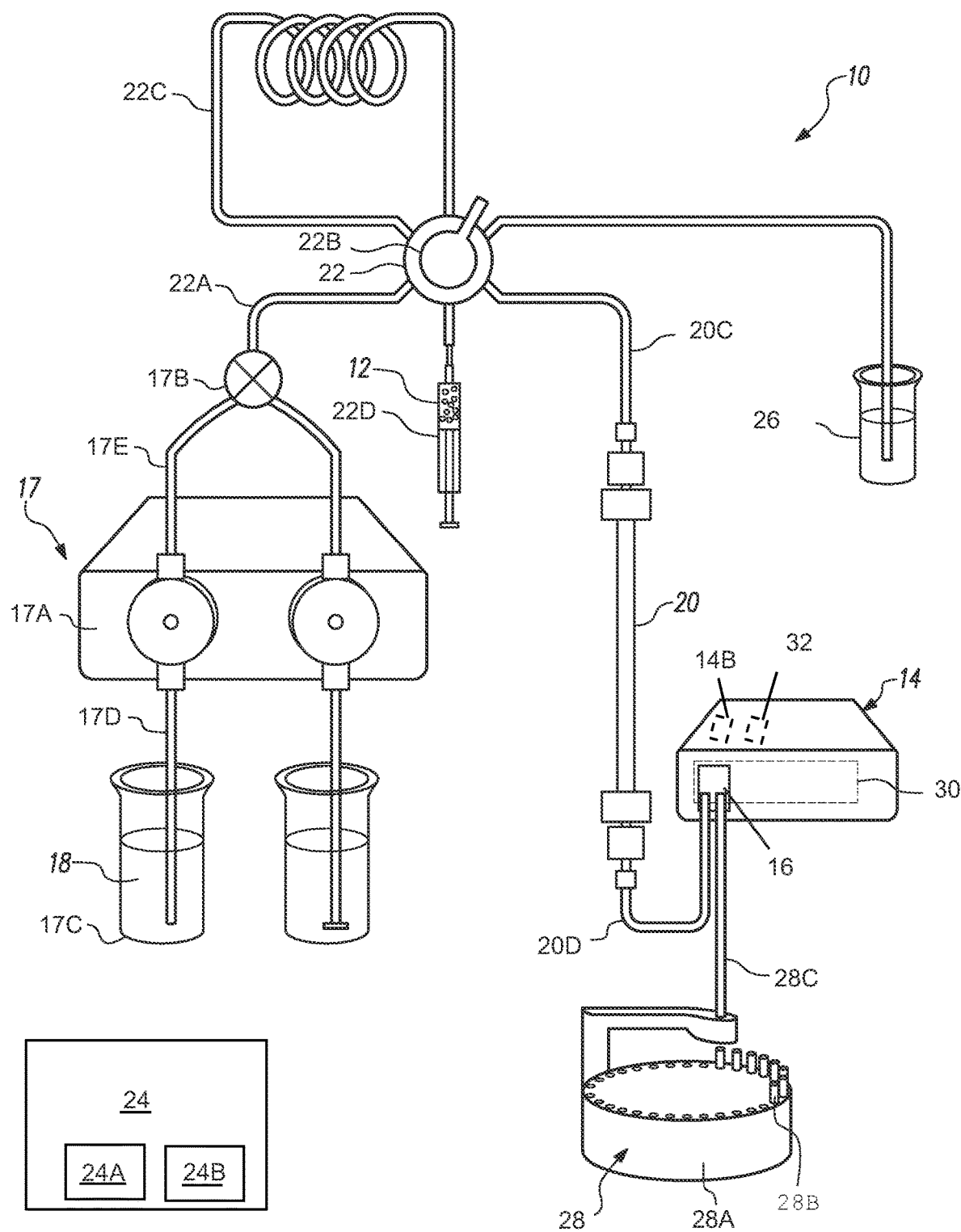
FIG. 1A is a simplified schematic illustration of a liquid chromatography and spectroscopy system having features of the present invention.

FIG. 1A is simplified illustration of a non-exclusive example of a liquid chromatography and spectroscopy system 10 having features of the present invention. In one, non-exclusive embodiment, the liquid chromatography and spectroscopy system 10 is a direct absorption spectroscopy system, e.g. a high performance liquid chromatography (HPLC) system that utilizes liquid separation to analyze a sample 12 (illustrated with small circles).

In the non-exclusive embodiment illustrated in FIG. 1A, the liquid chromatography and spectroscopy system 10 includes (i) a fluid analyzer 14 having a test cell module 16 (illustrated as a box), (ii) a solvent supply 17 that provides one or more solvents 18 (two different solvents 18 are illustrated in FIG. 1A), (iii) a separation column 20, (iv) an injector assembly 22 that includes an injector valve 22B, a sample loop 22C, and an injector port 22D, (v) a control and analysis system 24, (vi) a waste collection assembly 26, and (vii) a fraction collector assembly 28. It should be noted that the number of components and/or the positioning of the components in the spectroscopy system 10 can be different than that illustrated in FIG. 1A.

As an overview, the fluid analyzer 14 provided herein is uniquely designed to spectrally analyze the sample 12 with improved accuracy. This allows the trace components of the sample 12 to be identified and quantified with improved accuracy. For example, the fluid analyzer 14 can include one or more of the following features (i) the test cell module 16 is selectively removable to allow for the use of different test cell modules 16 for different samples 12; (ii) a self-check assembly 30 (illustrated as a box in phantom in FIG. 1A) that selectively evaluates the performance of the fluid analyzer 16 to determine if it has deviated outside of specified acceptable limits; (iii) a signal detector assembly 32 (illustrated with a box in phantom) that utilizes adjustable gain during at least a portion of a spectral sweep; (iv) a spectral scan of one or more solvents 18 to identify and determine the characteristics of the one or more solvents 18; (v) leak detection and handling of volatile organic compounds and liquids, e.g. detect and handle leaks of the sample 12 and/or solvents 18 from the test cell module 16; and/or (vi) removable test cell module 16 compatibility-detect insertion/removal of test cell assembly and read data from test cell module memory.

The type of sample 12 that is spectrally analyzed can vary. As non-exclusive examples, the sample 12 can be a liquid, a complex mixture of multiple liquids, or a complex mixture of liquids, dissolved chemicals, and/or solids.

In the embodiment illustrated in FIG. 1A, the liquid chromatography and spectroscopy system 10 works by flowing one or more liquid solvents 18 and the sample 12 through the separation column 20 and into the fluid analyzer 14. The flow of the liquid solvent 18 and the sample 12 through the separation column 20 can be substantially constant or variable.

In one embodiment, the solvent supply 17 includes a fluid pump assembly 17A, a mixer 17B that mixes the solvents 18, and one or more reservoirs 17C (two are illustrated in FIG. 1A). In this embodiment, the fluid pump assembly 17A pumps the one or more solvents 18 from the one or more reservoirs 17C, through the mixer 17B, into the injector assembly 22, through the separation column 20, into the test cell module 16 of the fluid analyzer 14, and finally to the fraction collector 28. The fluid pump assembly 17A can include one or more pumps.

Further, the fluid pump assembly 17A can direct the sample 12 and solvent 18 at a substantially constant rate through the test cell module 16 to analyze the sample 12 relatively quickly. As alternative, non-exclusive examples, the fluid pump assembly 17A can direct the sample 12 and solvent 18 at a flow rate of approximately 0.1 mL/min, 0.2 mL/min, 0.5 mL/min, 0.7 mL/min, 1.0 mL/min, 2.0 mL/min, 5.0 mL/min, 10 mL/min, 25 mL/min, 35 mL/min, 50 mL/min, 100 mL/min, 150 mL/min, or 500 mL/min through the test cell module 16.

Still alternatively, the fluid pump assembly 17A can direct the sample 12 and solvents 18 into the test cell module 16, and the sample 12 can be analyzed in the test cell module 16 with the sample 12 stationary in the test cell module 16.

In FIG. 1A, the fluid pump assembly 17A is located near the solvent reservoirs 17C. Alternatively, the fluid pump assembly 17A can include one or more pumps located at alternative positions along the flow path. Further, the fluid pump assembly 17A can direct the sample 12 and solvent 18 at a variable flow rate through the test cell module 16, under the control of the control and analysis system 24.

The type of solvents 18 utilized can be varied according to the type of sample 12. As non-exclusive examples, suitable solvents 18 include water, phosphate-buffered saline (PBS), dimethyl sulfoxide (DMSO), isopropyl alcohol, methyl alcohol, toluene, or tetrahydrofuran (THF).

In the non-exclusive embodiment illustrated in FIG. 1A, the sample 12 to analyze is introduced into the injection valve 22B at the injector port 22D. The injection valve 22B is then actuated to force the solvent 18 flow path through the injection loop 22C before heading to the separation column 20. As non-exclusive examples, the injection loop can have a volume of 5 µL, 10 µL, 20 µL, 50 µL, 75 µL, or 100 µL. When the sample 12 reaches the separation column 20, it is separated into different components based on physical properties of the sample mixture 12 (e.g. size or mobility).

Figure 1B:
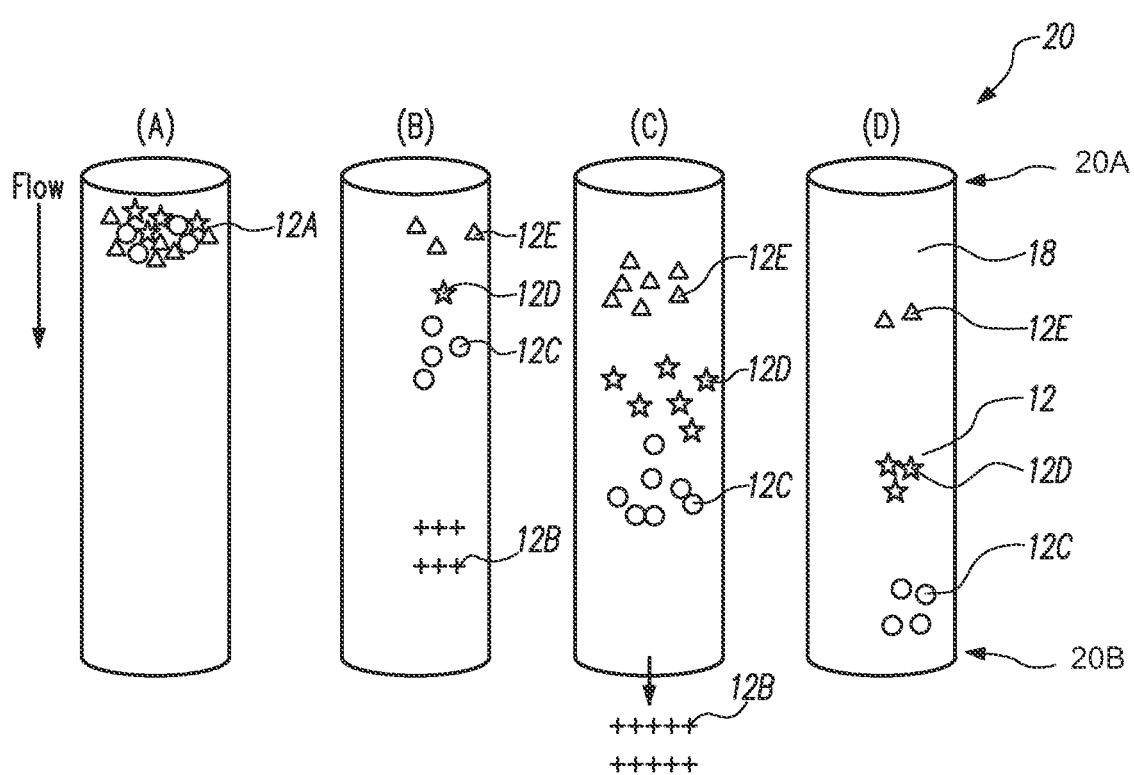
FIG. 1B illustrates a column of the liquid chromatography system of FIG. 1A at four different times.

FIG. 1B is a schematic illustration of the separation column 20 separating a mixture into different aliquots that then elute from the column 20 at different times. More specifically, moving left to right, FIG. 1B illustrates the separation column 20 at four different times labeled A, B, C, and D. As shown in FIG. 1B, the column 20 includes an inlet 20A and an outlet 20B. Further, the components 12A enter at the inlet 20A concurrently, and these separations elute from the separation column 20 from the outlet 21B at different times, resulting in time aliquots of different components of the sample 12 mixture moving at different times through the separation column 20. As a result thereof, the separations will subsequently be directed into the test cell module 16 (illustrated in FIG. 1A) at different times. Stated in another fashion, a constant flow of solvent 18 through the column 20 moves these sample 12 aliquots along to the test cell module 16 at different times for analysis at different times.

More specifically, in FIG. 1B, the first column (on the left) illustrates a plurality of different compounds 12A represented by plus sign, circle, star, and triangle, enter the separation column concurrently. Next, the second through four columns illustrate that the compounds have separated with the plus sign compound 12B exiting the column first, the circle compound 12C exiting next, the star compound 12D exiting next, and the triangle compound 12E exiting last.

Referring back to FIG. 1A, the liquid chromatography and spectroscopy system 10 can include the control and analysis system 24 that controls one or more components of the system 10. For example, the control and analysis system 24 can control the operation of the fluid analyzer 14, the solvent supply 17, the injector assembly 22, the waste collection assembly 26, and the fraction collector assembly 28. Moreover, the control and analysis system 24 can analyze the data generated by the fluid analyzer 14 to characterize one or more components of the sample 12.

In certain embodiments, the control and analysis system 24 can include one or more processors 24A and/or electronic data storage devices 24B. It should be noted that the control and analysis system 24 is illustrated in FIG. 1A as a single, central processing system. Alternatively, the control and analysis system 24 can be a distributed processing system. For example, the fluid analyzer 14 can include one or more separate processors (not shown) and/or electronic storage devices (not shown). Additionally, the control and analysis system 24 can include a display (e.g. LED display) that displays the test results.

The waste collection assembly 26 receives the waste from the injector valve 22B. For example, the waste collection assembly 26 include one or more receptacles.

The fraction collector assembly 28 collects one or more of the fractions that have passed through the fluid analyzer 14. In one non-exclusive embodiment, the fraction collector assembly 28 includes a collector frame 28A that retains one or more collector receptacles 28B. In this embodiment, the collector frame 28A is disk shaped and can be rotated to position different collector receptacles for collecting the fractions that have passed through the fluid analyzer 14.

In the embodiment illustrated in FIG. 1A, (i) the fluid analyzer 14 can be considered the spectroscopy portion of the liquid chromatography and spectroscopy system 10; and (ii) the rest of the components other than the fluid analyzer 14 can be considered the liquid chromatography portion of the liquid chromatography and spectroscopy system 10. It should be noted that the fluid analyzer 14 provided herein can be used with a different system, e.g. a different liquid sample source (not shown) than the liquid chromatography portion illustrated in FIG. 1A.

Additionally, it should be noted that the pump assembly 17A is connected in fluid communication to the solvent reservoirs 17C with a pair of reservoir conduits 17D, and the pump assembly 17A is connected in fluid communication to the mixer 17B with a pair of mixer conduits 17E. Further, the mixer 17B is connected in fluid communication to the injector assembly 22 with an injector conduit 22A. Moreover, the injector assembly 22 is connected in fluid communication with the column 20 with a connector conduit 20C. Further, the column 20 is connected in fluid communication with the fluid analyzer 14 with an analyzer connector conduit 20D. Additionally, the fluid analyzer 14 is connected in fluid communication with the fraction collector assembly 28 with a collection conduit 28C.

Figure 2A:
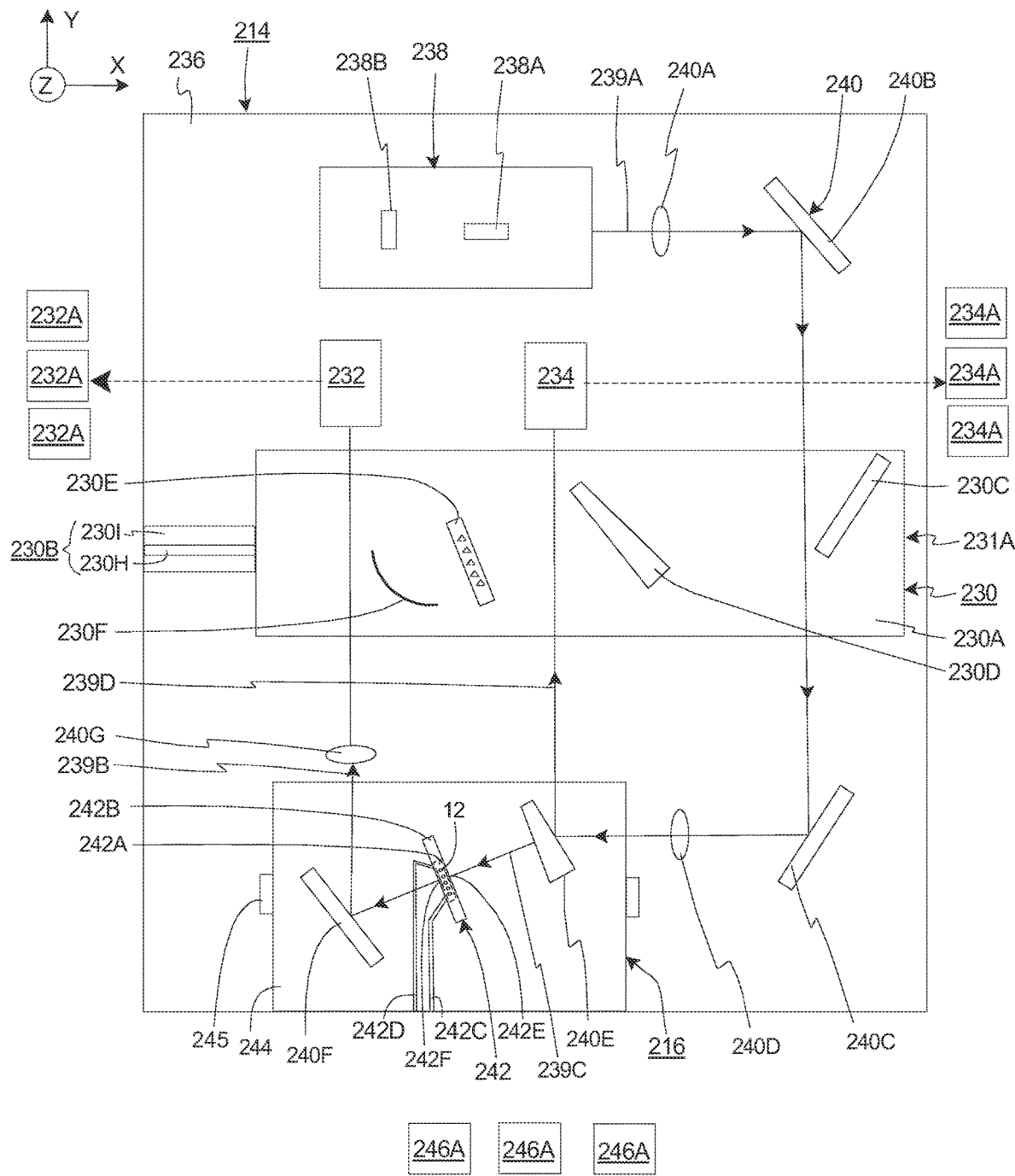
FIGS. 2A and 2B are alternative simplified, top schematics of one implementation of a fluid analyzer.
Figure 2B:
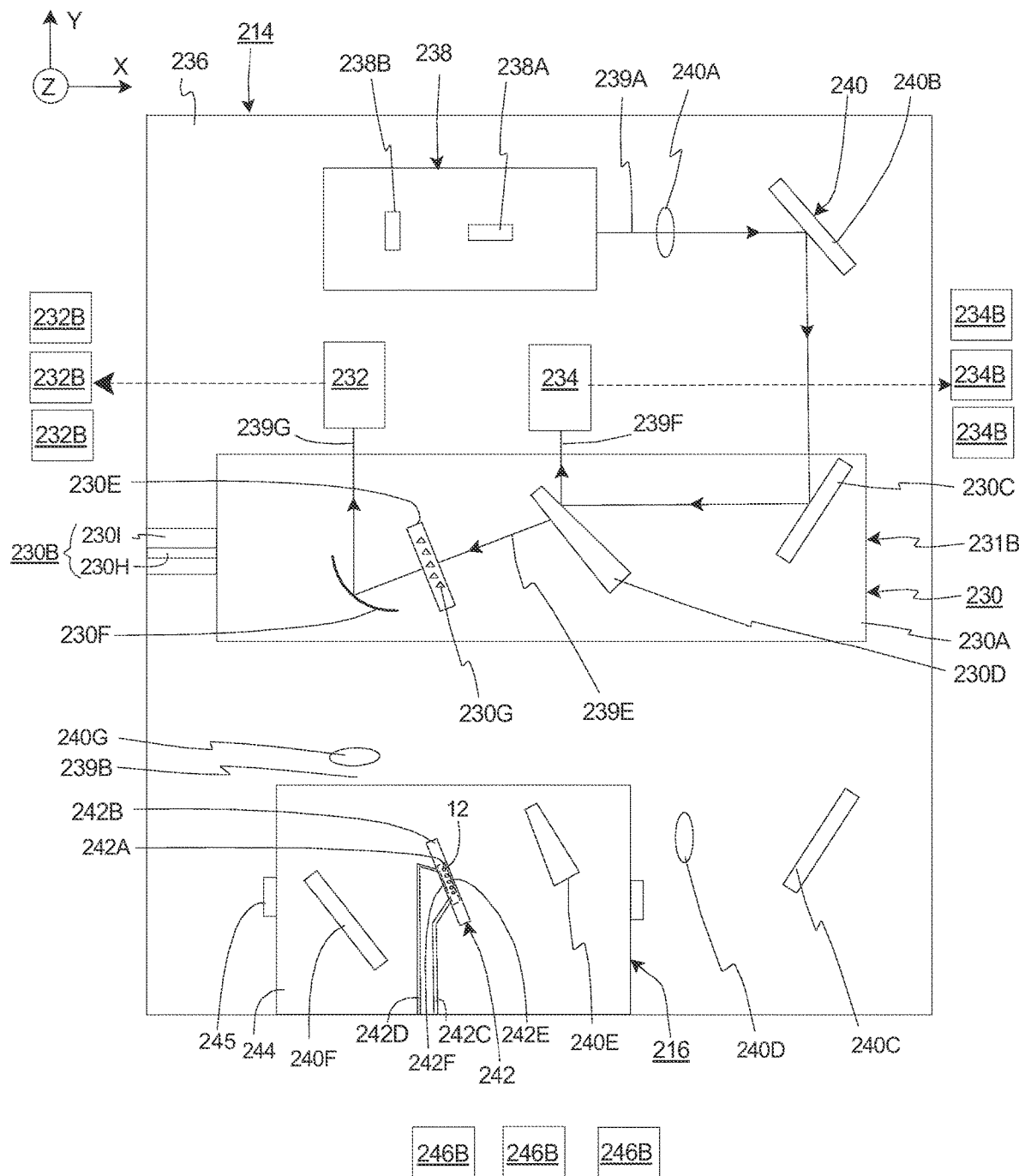

FIGS. 2A and 2B are alternative simplified, top schematics of one implementation of the fluid analyzer 214 including (i) an analyzer frame 236, (ii) a laser assembly 238 that generates an output laser beam 239A, (iii) a beam director assembly 240, (iv) the test cell module 216 having a test cell assembly 242 that retains the sample 12 (illustrated with small circles), (v) the signal detector assembly 232, (vi) a reference detector assembly 234, and (vii) the self-check assembly 230. The design and orientation of each of these components can be varied. Further, the fluid analyzer 214 can include more or fewer components than illustrated in FIGS. 2A and 2B. For example, the fluid analyzer 214 can be designed without the reference detector assembly 234.

In FIG. 2A, the self-check assembly 230 is illustrated in a stand-by position 231A in which the self-check assembly 230 is moved out of the way such that it does not intercept a significant portion (or any) of the laser beam 239A. The stand-by position 231A can also be referred to as "test position" or "test mode", because the fluid analyzer 214 can be used to spectrally analyze the sample 12 in the test cell assembly 242 at this time. Alternatively, in FIG. 2B, the self-check assembly 230 is illustrated in a self-check position 231B in which self-check assembly 230 is used to selectively evaluate the performance of the fluid analyzer 214 to determine if it has deviated outside of specified acceptable limits. The self-check position 231B can also be referred to at the "self-check mode", because the fluid analyzer 214 analyzes its own performance, and not the sample 12 at this time.

The analyzer frame 236 retains the components of the fluid analyzer 214. In this simplified schematic of FIGS. 2A and 2B, the analyzer frame 236 is illustrated as a flat plate. Alternatively, the analyzer frame 236 can be box shaped and form a frame cavity (not shown) that encloses the other components of the fluid analyzer 214.

The laser assembly 238 generates the collimated laser beam 239A. As illustrated in FIG. 2A, with the self-check assembly 230 in the stand-by position 231A, at least a portion of the laser beam 239A is directed by the beam directing assembly 240 through the test cell assembly 242. Subsequently, a test signal light 239B exiting the test cell assembly 242 is directed by the beam directing assembly 240 at the signal detector assembly 232. With this design, the laser assembly 238 generates the laser beam 239A that interrogates the sample 12 in the test cell assembly 242.

As a non-exclusive example, the laser assembly 238 can be a tunable laser that directly generates and emits a substantially temporally coherent laser beam 239A. For example, the laser assembly 238 can be an external cavity, Littrow configuration, tunable laser that generates the laser beam 239A that is tunable over a wavelength range, referred to herein as "a tunable range". In one specific example, the laser assembly 238 is a tunable mid-infrared ("MIR") laser, and the tunable range is a portion or all of a mid-infrared range. The term "MIR range" shall mean and include the spectral region or spectral band of between approximately five thousand to five hundred wavenumbers (5000-500 $cm^{-1}$), or approximately two and twenty micrometers (2-20 µm) in wavelength. With this design, the laser assembly 238 is tuned to different center wavelengths in the MIR range over time to interrogate the sample 12 at the different wavelengths. The MIR range is particularly useful to spectroscopically interrogate the sample 12 since many samples 12 are comprised of molecules or groups of molecules that have fundamental vibrational modes in the MIR range, and thus present strong, unique absorption signatures within the MIR range.

Alternatively, the laser assembly 238 can be designed to generate the laser beam 239A having a center wavelength that is varied over time outside the mid-infrared range, e.g. another portion of the infrared range or in the visible or ultra-violet range.

In alternative, non-exclusive examples, the size of the tunable (wavelength) range can be at least approximately 2, 3, 4, 5, 8, 10, 15, 18, 20 or 25 micrometers. In additional, alternative, non-exclusive examples, the size of the tunable (wavenumber) range can be at least approximately 50, 100, 200, 300, 400, 500, 1000, 2000, 3000, 4000, 4500, or 5000 cm-1 wavenumbers. However, the size of the tunable range can larger or smaller than these amounts.

As a non-exclusive example, the laser assembly 238 can include a Quantum Cascade gain medium 238A (illustrated as a box) and a wavelength selective feedback element 238B (illustrated as a box)(e.g. a diffraction grating) that can be adjusted to select (tune) the center wavelength of the laser beam 239A over time. With this design, the control and analysis system 24 (illustrated in FIG. 1A) can control the current to the gain medium 238A and the wavelength selective feedback element 238B to control the center wavelength of the laser beam 239A. Stated in another fashion, the control and analysis system 24 can control the wavelength selective feedback element 238B so that the center wavelength of the laser beam 239A is varied over time over the tunable range. For example, the laser assembly 238 can be tuned, and one or more pulses can be generated having approximately the same first center wavelength ("first target wavelength"). Subsequently, the laser assembly 238 can be tuned, and one or more pulses can be generated having approximately the same second center wavelength ("second target wavelength") that is different from the first center wavelength. Next, the laser assembly 238 can be tuned, and one or more pulses can be generated having approximately the same third center wavelength ("third target wavelength") that is different from the first and second target wavelengths. This process can be repeated to a plurality of additional target wavelengths throughout a portion or the entire tunable range. As non-exclusive examples, the number of pulses at each discrete target wavelength can be 1, 5, 10, 50, 100, 200, 500, 1000, 10,000 or more.

The number of discrete target wavelengths in the set used to analyze the sample 12 can also vary according to the sample 12. As non-exclusive examples, the number of discrete target wavelengths utilized can be approximately 1, 2, 3, 4, 5, 6, 7, 8, 9, 10, 15, 20, 25, 40, 200, 226, 400, 552 or 4000 within the tunable range.

As non-exclusive examples, the control and analysis system 24 can control the laser assembly 238 so that the sweep rates across the entire tunable range is less than 1 millisecond, 10 millisecond, 100 millisecond, 1 second, 10 seconds, or 100 seconds.

In FIGS. 2A and 2B, the tunable laser assembly 238 is illustrated as a single, tunable laser. Alternatively, the laser assembly 238 can include multiple individually tunable lasers that span a portion or all of a desired spectral range. For example, when multiple tunable lasers (not shown) are used, each laser can generate a different portion of the desired spectral range, with slight overlapping of the wavelengths generated to allow for calibration of the laser assemblies and better fidelity. A description of a system that includes multiple individual laser assemblies is described in U.S. Pat. No. 9,086,375, entitled "Laser Source With A Large Spectral Range". As far as permitted, the contents of U.S. Pat. No. 9,086,375 are incorporated herein by reference.

In certain non-exclusive embodiments, the laser beam 239A is focused and has a beam diameter that is less than 0.1 centimeters. This relatively small diameter of the laser beam 239A allows for the use of a relatively small sized test cell chamber 242A (illustrated in phantom) for the test cell assembly 242.

With the self-check assembly 230 in the stand-by position 231A illustrated in FIG. 2A, the beam director assembly 240 directs the laser beam 238A through the test cell assembly 242 while the sample 12 and/or the solvent(s) 18 (illustrated in FIG. 1A) in the test cell assembly 242 to create a test signal light 239B. Subsequently, the beam director assembly 240 directs the test signal light 239B to the signal detector assembly 232. The design, number and location of the elements of the beam director assembly 240 can be varied to suit the arrangement of the other components in the fluid analyzer 214. In the non-exclusive embodiment illustrated in FIGS. 2A and 2B, the beam director assembly 240 includes (i) a first lens 240A, a first director 240B, a second director 240C, a second lens 240D, and a splitter element 240E that cooperate to direct a split laser beam 239C at the test cell assembly 242 and a reference beam 239D at the reference detector assembly 234; and (ii) a third director 240F and a third lens 240G that cooperate to collect the test signal light 239B that has been transmitted through the test cell assembly 242 and direct the test signal light 239B at the signal detector assembly 232. It should be noted that any of the first lens 240A, the first director 240B, the second director 240C, the second lens 240D, the splitter element 240E, the third director 240F and/or the third lens 240G can be referred to as a director element, a first director element, or a second director element. Alternatively, for example, the first lens 240A can be incorporated into and be a part of the laser assembly 238.

In the embodiment illustrated in FIGS. 2A and 2B, (i) the first lens 240A collimates the output laser beam 239A and directs the output laser beam 239A at the first director 240B; (ii) the first director 240B redirects the output laser beam 239A approximately ninety degrees at the second director 240C; (iii) the second director 240C redirects the output laser beam 239A approximately ninety degrees at the second lens 240D; (iv) the second lens 240D focuses the output laser beam 239A on the splitter element 240E; and (v) the splitter element 240E splits the output laser beam 239A into the split laser beam 239C directed at the test cell assembly 242 and the reference beam 239D directed at the reference detector assembly 234. Further, (i) the third director 240F redirects the test signal light 239B at the third lens 240G, and (ii) the third lens 240G collects and directs the signal light 239B at the signal detector assembly 232.

In one, non-exclusive embodiment, the splitter element 240E is an anti-reflective coated wedge element that splits the output laser beam 239A into the split laser beam 239C, and the reference beam 239D. For example, the splitter element 240E can be made of zinc selenide. As non-exclusive examples, the splitter element 240E can split approximately one, two, three, four, or five percent of the output laser beam 239A to create the reference beam 239D. Alternatively, for example, the fluid analyzer 214 can be designed without the reference detector assembly 234 and without the splitter element 240E.

Each director element 240A-240G of the beam director assembly 240 is operable in the wavelength range of the fluid analyzer 214. For example, for a MIR range fluid analyzer 214, (i) the lenses 240A, 240D, 240G can made of germanium or another suitable material, and (ii) the directors 240B, 240C, 240F can each be a fold mirror operable in the mid-infrared range. In one specific example, (i) the first lens 240A is a collimation lens, and (ii) the second and third lenses 240D, 240G are plano-convex and have an anti-reflective coating.

In the non-exclusive embodiment illustrated in FIGS. 2A and 2B, (i) the first lens 240A, the first director 240B, the second director 240C, a second lens 240D, and the third lens 240G are secured to the analyzer frame 236, and (ii) the splitter element 240E and the third director 240C are secured to the test cell module 216, which is selectively secured to the analyzer frame 236. Alternatively, for example, all of the components 240A-240G of the beam director assembly 240 can be secured directly to the analyzer frame 236.

The test cell module 216 includes the test cell assembly 242 that retains the sample 12 during the spectral analysis. In the non-exclusive embodiment illustrated in FIGS. 2A and 2B, the test cell module 216 includes a module frame 244 and the test cell assembly 242.

The module frame 244 is rigid and supports test cell assembly 242, and in certain embodiments also supports the splitter element 240E and the third director 240C. In one embodiment, a coupler assembly 245 (illustrated with a pair of boxes) selectively couples the module frame 244 to the analyzer frame 236 in a repeatable fashion, and allows the module frame 244 to be selectively uncoupled and moved relative to the analyzer frame 236. As alternative, non-exclusive examples, the coupler assembly 245 can include one or more fasteners, guides, clamps, clips, or actuators.

The test cell assembly 242 retains the sample 12 during spectral analysis. For example, the sample 12 can be flowing through the test cell assembly 242 (e.g. a flow cell) during the spectral analysis. Alternatively, the sample 12 can be stationary in the test cell assembly 242. Still alternatively, the sample 12 flow into the test cell assembly 242 and subsequently, the flow can be reversed.

A number of alternative test cell assemblies 242 are disclosed herein. In one non-exclusive embodiment, the test cell assembly 242 includes (i) a test cell assembly housing 242B that defines the test cell chamber 242A, (ii) a sample inlet conduit 242C that allows the sample 12 to enter the test cell chamber 242A; (iii) a sample outlet conduit 242D that allows the sample 12 to exit the test cell chamber 242A; (iv) an inlet window 242E (illustrated in phantom) that allows the split laser beam 239C to enter the test cell chamber 242A; and (v) an outlet window 242F that allows the test signal light 239B to exit the test cell chamber 242A. For example, each window 242E, 242F can transmit light in the range of the output laser beam 239A.

It should be noted that the orientation of the conduits 242C, 242D can be changed or reversed. Further, the sample 12 can be analyzed while flowing through the test cell chamber 242A or stationary in the test cell chamber 242A.

The signal detector assembly 232 collects the test signal light 239B for evaluating the sample 12 at a plurality of different wavelengths over time. The design of the signal detector assembly 232 can be varied to suit the wavelength of the laser beam 239A. As a non-exclusive example, the signal detector assembly 232 can include a thermoelectrically cooled, photoconductive, InAsSb (indium arsenide antimonide) detector. Alternatively, another type of signal detector assembly 232 can be utilized.

In one embodiment, the signal detector assembly 232 includes a two-dimensional array of sensors to generate a two-dimensional array of information. Each separate two-dimensional array of information can be referred to as a signal image 232A. In FIG. 2A, three separate signal images 232A are illustrated with boxes. In this example, each signal image 232A can represent the two-dimensional array of information collected by the signal detector assembly 232 at a different center wavelength. As provided herein, one or more separate signal images 232A can be generated for each target center wavelength.

The term "image" as used herein shall mean and include a two-dimensional photograph or screen display, or a two-dimensional array of data.

With this design, with the sample 12 in the test cell chamber 242A, the laser assembly 238 is tunable to generate a set of discrete, different center wavelengths, and the signal detector assembly 232 is controlled to construct one or more separate, two-dimensional signal images 232A at each discrete center wavelength.

The reference detector assembly 234 collects the reference beam 239D at a plurality of different center wavelengths over time. The design of the reference detector assembly 234 can be varied to suit the wavelength of the reference beam 239D. For example, the reference detector assembly 234 can be similar in design to the signal detector assembly 232.

In one embodiment, the reference detector assembly 234 includes a two-dimensional array of sensors to generate a two-dimensional array of information. Each separate two-dimensional array of information can be referred to as a reference image 234A. In FIG. 2A, three separate reference images 234A are illustrated with boxes. In this example, each reference image 234A can represent the two-dimensional array of information collected by the reference detector assembly 234 at a different center wavelength. As provided herein, one or more separate reference images 234A can be generated for each target center wavelength.

With this design, for each center wavelength, the control and analysis system 24 (illustrated in FIG. 1A) can compare the signal image 232A to the corresponding reference image 234A to generate a separate output image 246A. In FIGS. 2A, three separate output images 246A are illustrated with boxes. In this example, a separate output image 246A is generated for each target wavelength.

As provided above, the self-check assembly 230 is selectively movable between the stand-by position 231A illustrated in FIG. 2A, the self-check position 231B illustrated in FIG. 2B. The design of the self-check assembly 230 can be varied. In one non-exclusive embodiment, the self-check assembly 230 includes a check frame 230A, a check frame mover 230B (illustrated as a box), a first check director 230C, a check splitter element 230D, a check substance 230E (illustrated as a box), and a second check director 230F.

The check frame 230A is rigid and retains the first check director 230C, the check splitter element 230D, the check substance 230E, and the second check director 230F in a fixed arrangement.

The check frame mover 230B is controlled by the control and analysis system 24 (illustrated in FIG. 1A) to selectively move the check frame 230A and the check directors 230C, 230F, the check splitter element 230D, and the check test cell assembly 230E between the standby position 231A (illustrated in FIG. 2A) and the self-check position 231B (illustrated in FIG. 2B). For example, the frame mover 230B can include one or more guides 230H (e.g. linear guides) that guide the motion (e.g. along a guide axis), and one or more actuators 230I.

As illustrated in FIG. 2B, in the self-check position 231B, the first check director 230C is moved in between the first director 240B and the second director 240C of the beam director assembly 240. In this position, the first check director 230C directs the output laser beam 239A approximately ninety degrees at the check splitter element 230D. The first check director 230C can be similar in design to the first director 240B described above.

The check splitter element 230D splits the output laser beam 239A into a check split laser beam 239E that is directed at the check substance 230E, and a check reference beam 239F that is directed at the reference detector assembly 234. The check splitter element 230D can be somewhat similar to the splitter element 240E described above.

The check substance 230E can be a substance with known spectral data for at least some of the wavelengths used with the fluid analyzer 14. For example, the check substance 230E can be a polystyrene target. Alternatively, the check substance 230E can be a fluid or material retained in a test cell assembly (not shown).

The second check director 230F collects and redirects a check signal light 239G that has been transmitted through the check substance 230E at the signal detector assembly 232. In one, non-exclusive embodiment, the second check director 230F is a spherical mirror (e.g. one with f=twelve millimeters).

With reference to FIG. 2B, in the self-check position 231B, (i) the laser assembly 238 is tunable to generate a set of discrete, different center wavelengths; (ii) the signal detector assembly 232 is controlled to construct one or more separate, two dimensional check signal images 232B at each discrete center wavelength; and (iii) the reference detector assembly 234 is controlled to construct one or more separate, two dimensional, check detector signal images 234B at each discrete center wavelength.

With this design, for each target center wavelength, the control and analysis system 24 (illustrated in FIG. 1A) can compare the check signal image 232B to the corresponding check reference image 234B to generate a separate, check output image 246B. In FIGS. 2B, three separate check output images 246B are illustrated with boxes. Further, the check output images 246B can be compared to the known spectral data of the check substance 230E to evaluate the performance of the fluid analyzer 16 to determine if it has deviated outside of specified acceptable limits.

In certain embodiments, if the fluid analyzer 16 is out of specification, the tuning of the laser assembly 238 can be recalibrated.

It should be noted that the fluid analyzer 16 can include one or more features that will further enhance that accuracy of the spectral data generated. For example, the control and analysis system 24 can dynamically adjust a laser drive to the gain medium 238A so that the test signal light 239B on the signal detector assembly 232 has a substantially constant optical power while the tunable laser assembly 238 is tuned over at least a portion (or all) of the tunable range.

In alternative, non-exclusive examples, the laser drive is dynamically adjusted so that the test signal light 239B has a substantially constant optical power at the signal detector assembly 232 while the tunable laser assembly is tuned over at least sixty, seventy percent, eighty percent, ninety or ninety-five percent of the tunable range.

In alternative, non-exclusive embodiments, the term "substantially constant optical power" shall mean varying less than one, two, three, five, ten, fifteen, or twenty percent of the optical power.

As used herein, the term "laser drive" shall mean and include a drive current and/or a drive voltage that is directed to the gain medium. For example, the magnitude of the drive current can be adjusted, the duration of each pulse can be adjusted, and/or spacing between each pulse can be adjusted. Thus, the phrase "dynamically adjusts a laser drive" shall mean and include "dynamically adjusting a drive current" that is directed to the gain medium and/or "dynamically adjusting a drive voltage" that is directed to the gain medium.

As provided herein, the sample 12 and/or the solvent 18 (illustrated in FIG. 1A) will have different absorptions at different wavenumbers. With the present design, the laser drive to the gain medium 238A can be dynamically adjusted to provide (i) more laser drive for wavelengths (or wavenumbers) with high absorptions, and (ii) less laser drive for wavelengths (or wavenumbers) with low absorptions while the tunable laser assembly 238 is tuned. With this design, the laser drive can be dynamically adjusted to compensate for light absorption of the laser beam at certain wavelengths.

Stated in another fashion, (i) each different solvent 18 will have a different solvent absorption profile, and (ii) each different sample 12 will have a different sample absorption profile. With the present design, the laser drive to the gain medium 238A can be dynamically adjusted while the tunable laser assembly 238 is tuned in view of the solvent absorption profile and/or the sample absorption profile.

Alternatively, for example, the control and analysis system 24 can dynamically adjust a laser drive to the gain medium 238A so that the laser beam 239C on the test cell assembly 242 has a substantially constant optical power while the tunable laser assembly 238 is tuned over at least a portion of the tunable range.

A more complete discuss of this dynamic power adjustment is contained in U.S. Pat. No. 10,483,717, issued on Nov. 19, 2019 to Weida, et. al. As far as permitted, the contents of U.S. Pat. No. 10,483,717 are incorporated herein by reference.

Additionally, or alternatively, in certain implementations, the control and analysis system 24 can dynamically adjust a gain of the signal detector assembly 232 and/or a gain of the reference detector assembly 234 as a function of center wavelength (or wavenumber) of the output laser beam 239A while the tunable laser assembly 238 is tuned over at least a portion of the tunable range. It should be noted that each time the tunable laser assembly 238 is tuned over a portion or the entire tunable range this event can be referred to as a laser sweep.

In one embodiment, the control and analysis system 24 dynamically (i) adjusts the gain of the signal detector assembly 232 so that the gain of the signal detector assembly 232 is optimized for the magnitude of the test signal light 239B that is expected to be received by the signal detector assembly 232 as the laser assembly 238 is tuned over a portion or the entire tunable range; and/or (ii) adjusts the gain of the reference detector assembly 234 so that the gain of the reference detector assembly 234 is optimized for the magnitude of the reference beam 239D that is expected to be received by the reference detector assembly 234 as the laser assembly 238 is tuned over a portion or the entire tunable range. The gain of the signal detector assembly 232 can be adjusted independently to be the same or different from the gain of the reference detector assembly 234.

In alternative, non-exclusive examples, the gain of the signal detector assembly 232 and/or the reference detector assembly 234 can be adjusted while the laser assembly 238 is tuned over at least sixty, seventy percent, eighty percent, ninety or ninety-five percent of the tunable range.

Stated in a different fashion, the sample 12 and/or the solvent 18 will have different absorptions at different wavelengths. With the present design, the gain for the signal detector assembly 232 and/or the reference detector assembly 234 can be dynamically adjusted as a function of wavelength (wavenumber) of the laser beam 239A. For example, the signal detector assembly 232 and/or the reference detector assembly 234 are individually, dynamically adjusted while the tunable laser assembly 238 is tuned to have (i) more gain for wavelengths with high absorptions, and (ii) less gain for wavelengths with low absorptions. Stated in another fashion, the gain of the signal detector assembly 232 and/or the reference detector assembly 234 can be dynamically adjusted while the tunable laser assembly 238 is tuned in view of the solvent absorption profile and/or the sample absorption profile. Thus, the gain of the signal detector assembly 232 and/or the reference detector assembly 234 can be varied as a function of wavelength.

Stated alternatively, the control and analysis system 24 (illustrated in FIG. 1A) can (i) control the signal detector assembly 232 to adjust the signal gain setting during at least a portion of a spectral sweep; and/or (ii) control the reference detector assembly 234 to adjust the reference gain settings during at least a portion of a spectral sweep. As provided herein, to mitigate the problem of strongly absorbing solvents 18 (illustrated in FIG. 1A) and/or sample 12 (illustrated in FIG. 1A) lowering the dynamic range and signal-to-noise ratio ("SNR") of the system, the present design can selectively and individually adjust the gain of the signal detector assembly 232 and the reference detector assembly 234. For example, in the case of a strongly absorbing solvent 18 and/or sample 12 (illustrated in FIG. 1A), there are wavelength regions (or wavelengths) where the gain settings of the detectors 232, 234 needs to be increased such that the SNR of the data detected in those wavelength regions is acceptable. However, at wavelengths away from those absorbing regions, the same gain settings would result in a saturated detector 232, 234. Stated alternatively, the signal from each of the detectors 232, 234 needs to be both above a noise threshold and below a saturation threshold. For fixed gain transmission through an absorbing medium, the detector signal would be in the acceptable operating region at strongly absorbing wavelengths but saturated at weakly absorbing wavelengths. The converse may also be true: for fixed gain settings the detector signal would below the noise threshold at strongly absorbing wavelengths but in the acceptable operating region at weakly absorbing wavelengths.

The dynamic power adjustments to the laser assembly 238 during tuning discussed above will also help this problem. However, if the difference in absorption as a function of wavelength is so great that even a laser operating near threshold at low-absorbing frequencies will still saturate the detector 232, 234 at a given gain setting, then the dynamic adjustment of the gain settings for detector assemblies 232, 234 can be utilized. Thus, the dynamical adjustment of the gain settings of the detectors 232, 234 as a function of wavelength will improve performance.

As a non-exclusive example, at wavelengths where the sample 12 absorption is low, (i) a signal gain setting of the signal detector assembly 232 is set low (e.g. at a first signal gain value); (ii) a reference gain setting of the reference detector assembly 234 is set high (e.g. at a first reference gain value); and (iii) the first signal gain value is less than the first reference gain value. Alternatively, at wavelengths where the sample 12 absorption is high, (i) the signal gain setting of the signal detector assembly 232 is set high (e.g. at a second signal gain value); (ii) the reference gain setting of the reference detector assembly 234 is set low (e.g. at a second reference gain value); (iii) the second signal gain value is greater than the second reference gain value; (iv) the second signal gain value is greater than the first signal gain value; and (iv) the first reference signal gain value is greater than the second reference gain value. Thus, as provided herein, during tuning of the laser assembly 238, the wavelength of the output laser beam 239A changes corresponding. As provided herein, as the wavelength is changed (laser sweep), the signal gain setting of the signal detector assembly 232 and the reference gain setting of the reference detector assembly 234 can be individually and dynamically adjusted based on the absorption of the solvent 18 and/or the sample 12, for example.

In one embodiment, the laser power can be increased for wavelengths with high absorbance. In this embodiment, the gain of the reference detector assembly 234 can be decreased to inhibit saturation of the reference detector assembly 234 because of the increased power.

With this design, the gain of the signal detector assembly 232 can be optimized to ensure that the incident test signal light 239B on the signal detector assembly 232 for a portion (or all) wavelengths in the tunable range is near an upper bound of a linear region of the signal detector assembly 232 throughout the laser sweep.

Figure 3:
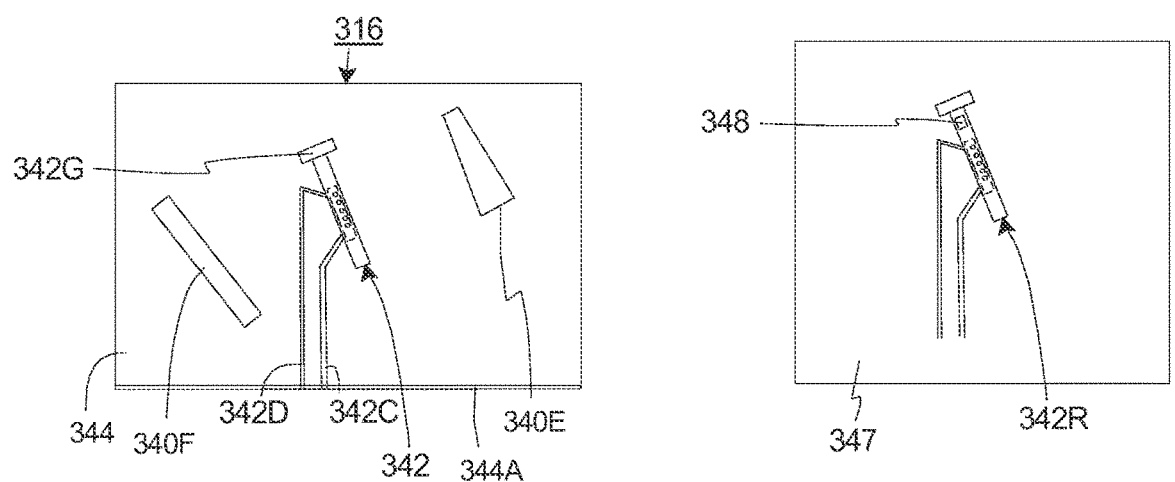
FIG. 3 is a simplified illustration of the test cell module and a replacement test cell assembly.

FIG. 3 is a simplified illustration of the test cell module 316. In this embodiment, the test cell module 316 includes the module frame 344, the splitter element 340E, the third director 340F, and the test cell assembly 342 which are somewhat similar to the corresponding components described above. However, in this embodiment, the test cell assembly 342 is selectively attachable to the module frame 344. For example, the test cell assembly 342 and/or the module frame 344 can include a cell coupler assembly 342G (illustrated with a box) that allows the test cell assembly 342 to be selectively secured to the module frame 344 in a repeatable fashion. As alternative, non-exclusive examples, the cell attacher 342G can include one or more fasteners, slots, snaps, guides, clamps.

With this design, the test cell assembly 342 can be easily replaced. As a result thereof, the test cell assembly 342 can be a "disposable" or "single use" test cell assembly 342. As used herein, "disposable" or "single use" shall mean that the test cell assembly 342 can be used to analyze one or more samples (typically a limited number of samples), and it is thrown away when it becomes fouled.

FIG. 3 also includes a simplified top illustration of a replacement test cell assembly 342R that can be selectively inserted into the test cell module 316. In this embodiment, the replacement test cell assembly 342R can be contained is a protective package 347 (e.g. a plastic clamshell package) and can include an identifying label 348.

In one embodiment, the test cell assembly 342R, the protective package 347, and the identifying label 348 can be gamma radiation compatible. With this design, the test cell assembly 342R, the identifying label 348, and the protective package 347 can be sterilized with gamma radiation.

The identifying label 348 can include information such as (i) test cell assembly identification ("ID"); (ii) test cell assembly serial number; (iii) calibration data of the test cell assembly; (iv) usage logs for the test cell assembly. In one embodiment, the identifying label 348 is a gamma radiation proof, radio-frequency identification tag ("RF ID tag") that can be read by a RF reader to obtain the information regarding the replacement test cell assembly 342R. We reference back to FIG. 1, the fluid analyzer 14 can include a radio-frequency reader 14B (illustrated as a box) that reads (senses) the RF ID tag to obtain the information regarding the replacement test cell assembly 342R. This ensures electronic records and electronic signatures are considered trustworthy, reliable, and equivalent to paper records.

In one embodiment, referring back to FIG. 3, the test cell assembly 342, 342R includes the sample inlet conduit 342C and the sample outlet conduit 342D that extends through a front panel 344A of the module frame 344. The sample inlet conduit 342C and the sample outlet conduit 342D can be capped in the replacement test cell assembly 342R for packaging for sterility.

Figure 4:
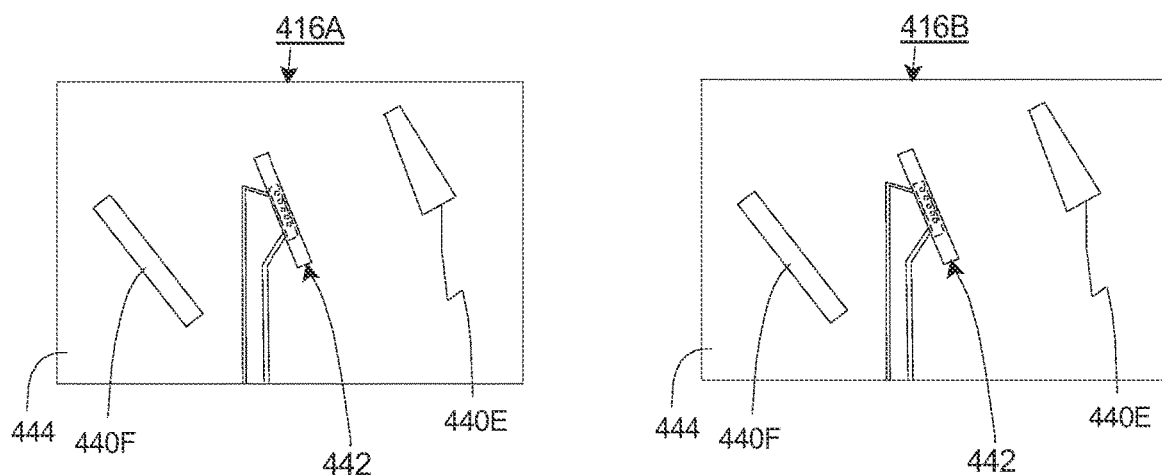
FIG. 4 is a simplified illustration of two alternative test cell modules.

FIG. 4 is a simplified top illustration of a first test cell module 416A and a second test cell module 416B. In this embodiment, each test cell module 416A, 416B includes the module frame 444, the splitter element 440E, the third director 440F, and the test cell assembly 442 which are similar to the corresponding components described above. However, in this embodiment, the test cell assembly 442 of the first test cell module 416A is built to have a different path length than the test cell assembly 442 of the second test cell module 416B. With this design, a path length of the fluid analyzer 14 (illustrated in FIGS. 2A and 2B) can be changed by changing the test cell module 416A, 416B.

Figure 5A:
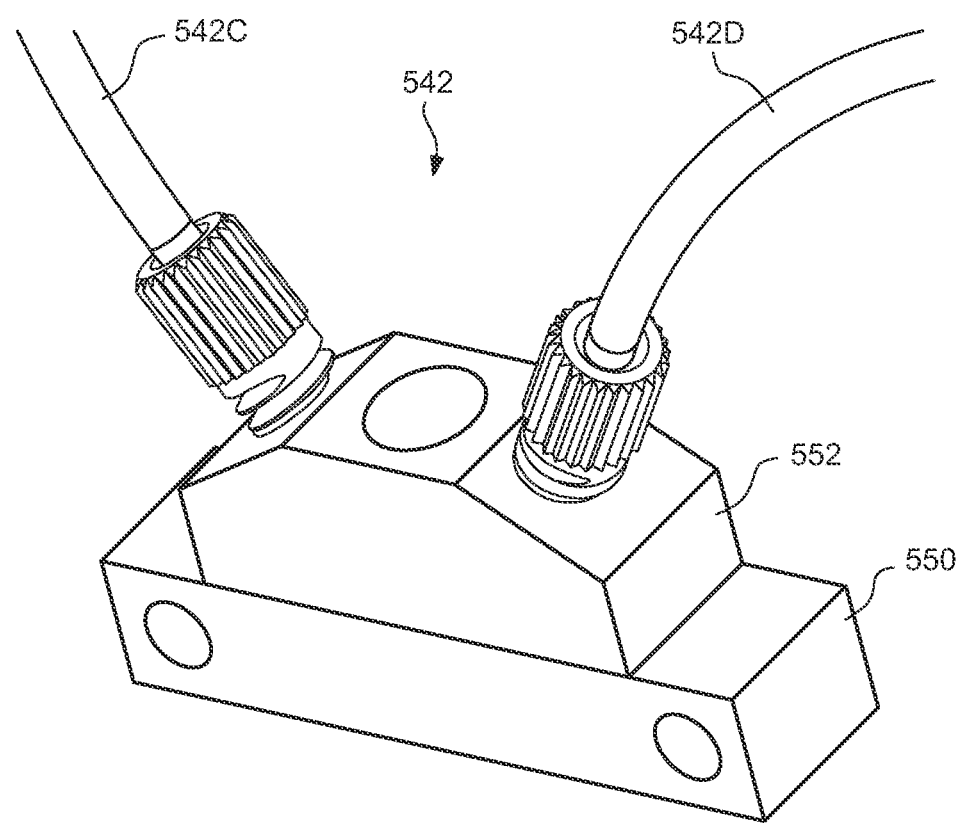
FIGS. 5A and 5B are alternative perspective views of a test cell assembly from the fluid analyzer of FIG. 1A.
Figure 5B:
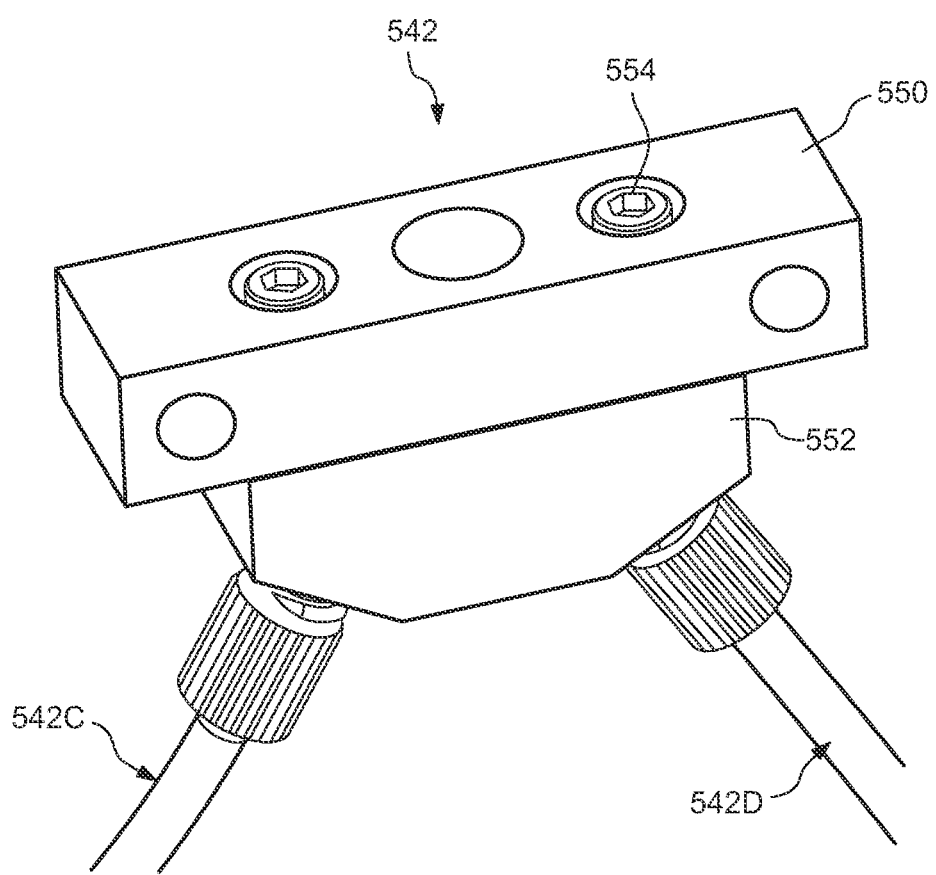

FIGS. 5A and 5B are alternative perspective views of a test cell assembly 542 for the fluid analyzer 14 (illustrated in FIG. 2A). In this embodiment, the test cell assembly 542 includes a base 550, a cap 552, a fastener assembly 554, a portion of the inlet conduit 542C, and a portion of the outlet conduit 542D of the test cell assembly 542 are illustrated.

Figure 5C:
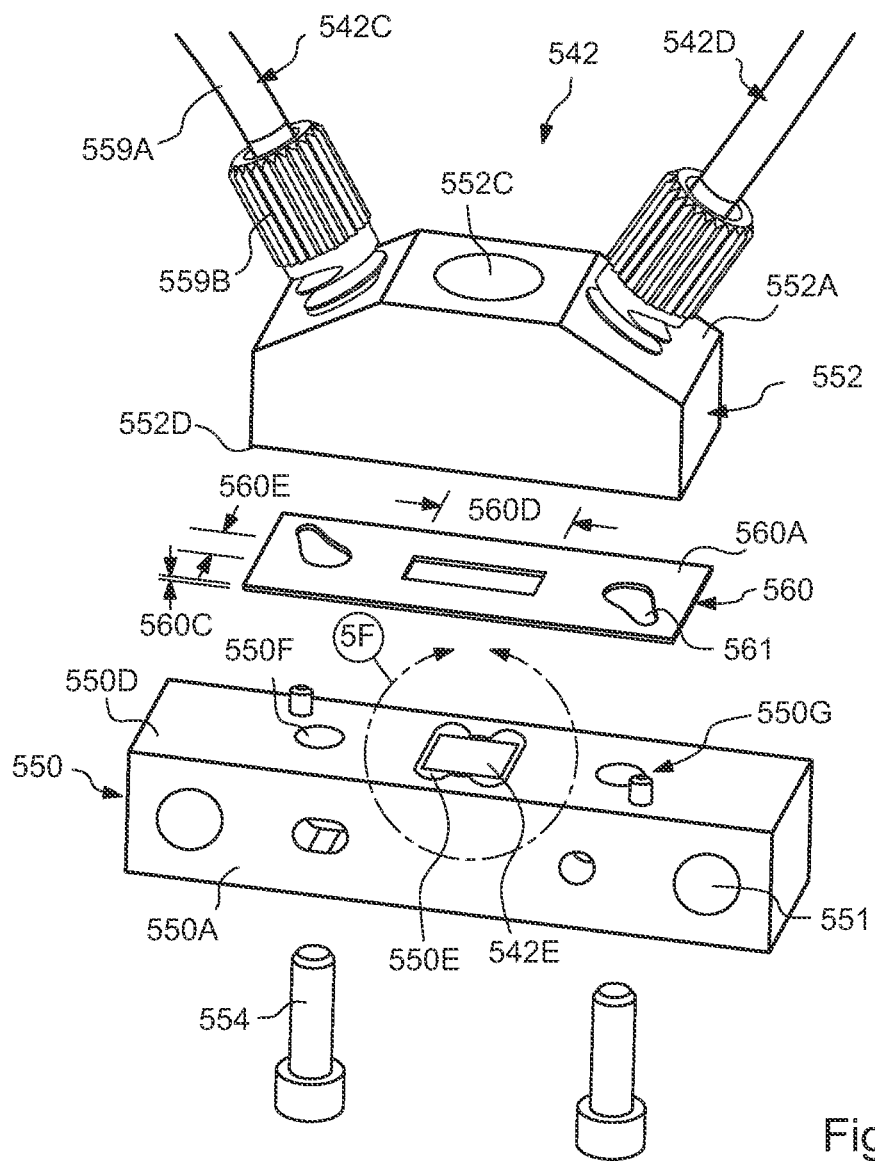
FIGS. 5C and 5D are alternative, exploded perspective views of the test cell assembly.
Figure 5F:
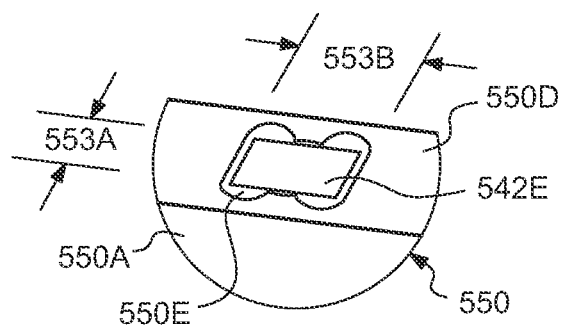
FIG. 5F is an enlarged cut-away view from FIG. 5C.
Figure 5D:
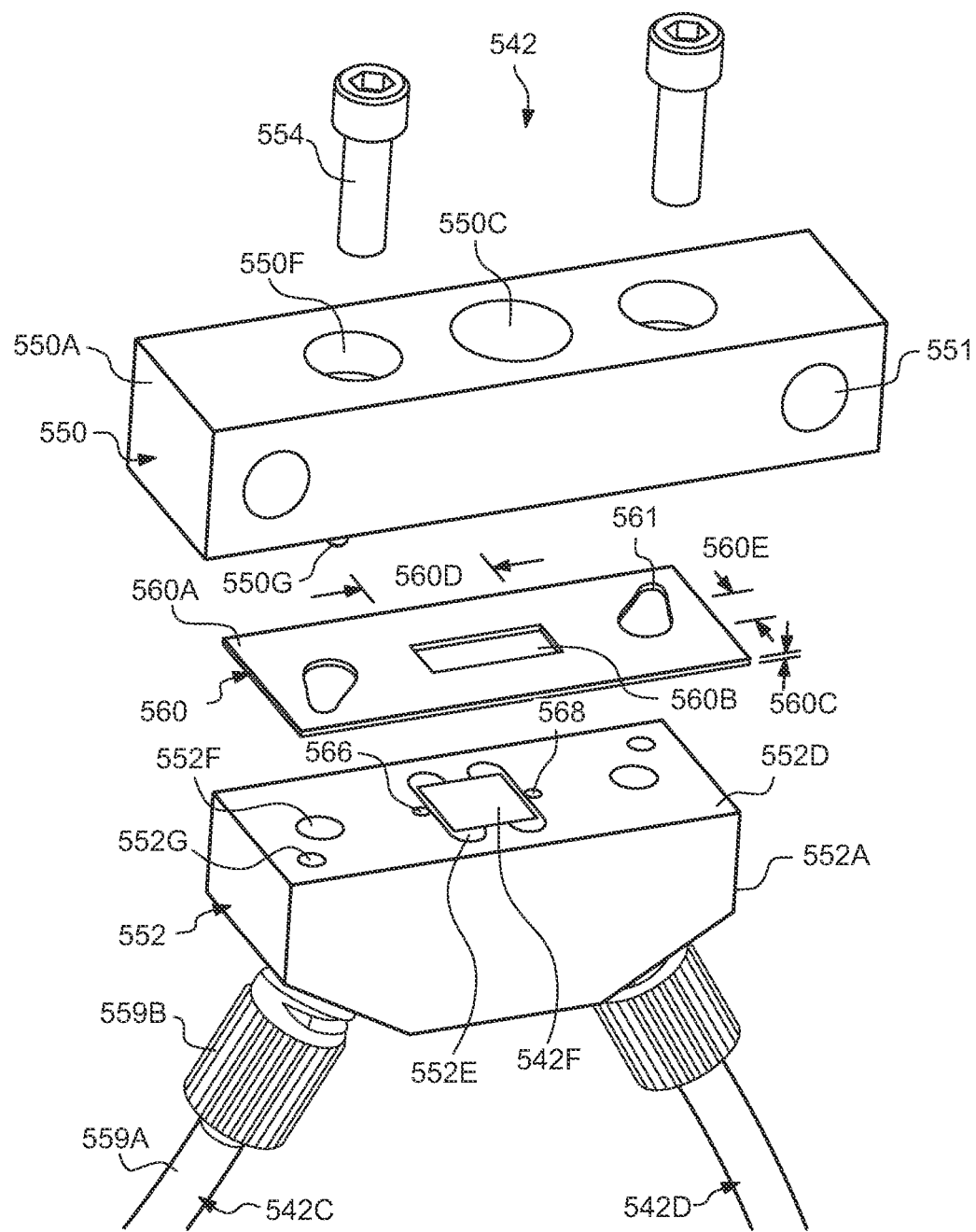
Figures 5E, 5G:
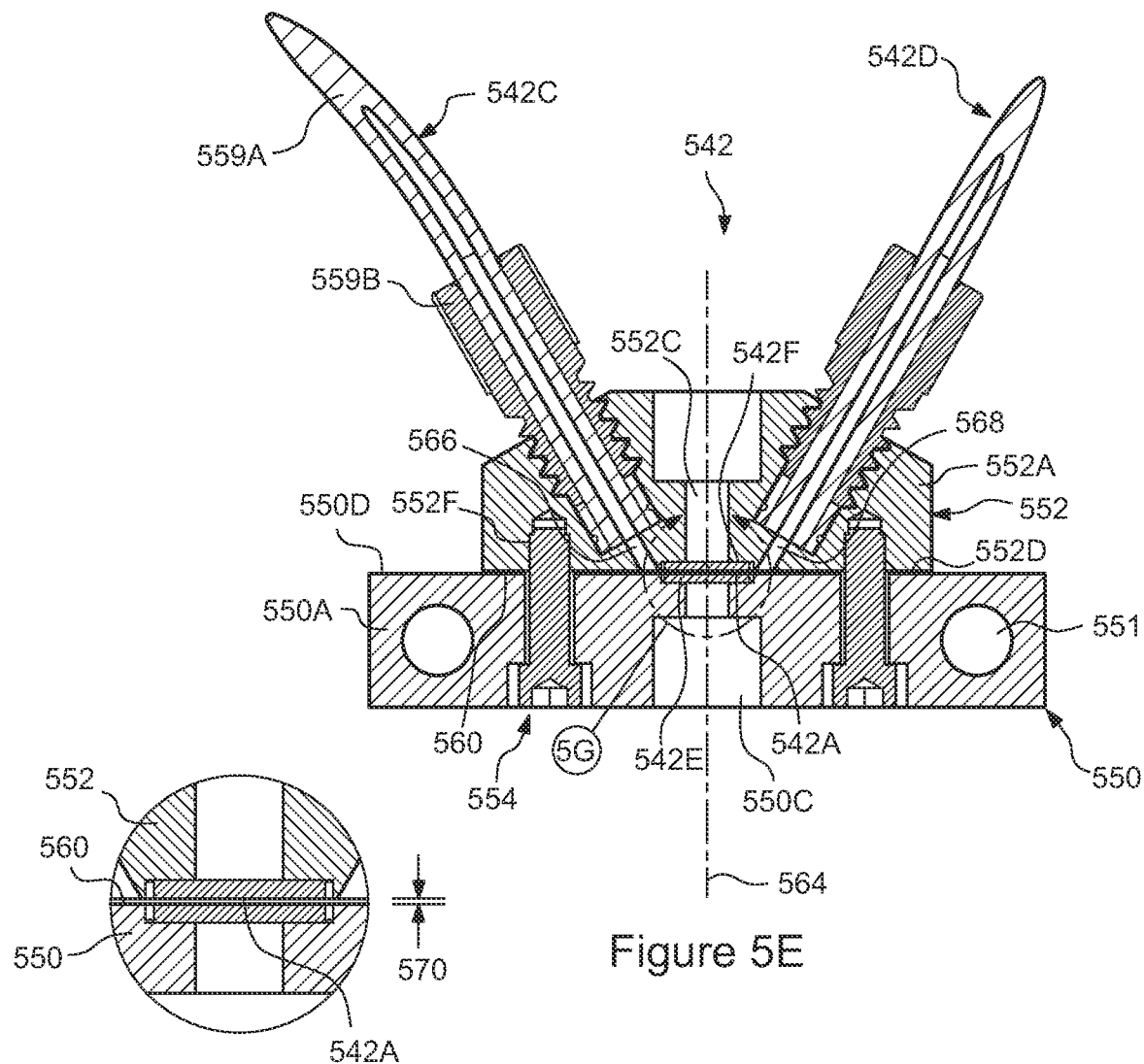
FIG. 5E is a cut-away view of the test cell module.
FIG. 5G is an enlarged cut-away view of the cap, gasket and base taken from FIG. 5E.

FIGS. 5C and 5D are alternative, exploded perspective views and FIG. 5E is a cut-away view of the test cell assembly 542 of FIGS. 5A and 5B. Further, FIG. 5F is an enlarged cut-away view of the base 550 taken from FIG. 5C. In FIGS. 5C, 5D and 5E, a gasket 560 is also visible, in addition to the base 550, the cap 552, the fastener assembly 554, the portion of the inlet conduit 542C, and the portion of the outlet conduit 542D of the test cell assembly 542. In this embodiment, the gasket 560, the base 550, and the cap 552 cooperate to define the test cell chamber 542A (illustrated in FIGS. 5E and 5G). The size, shape and design of each of these components can be varied according to the teachings provided herein.

In the non-exclusive embodiment illustrated in these Figures, the base 550 includes a rigid, generally rectangular shaped base body 550A, an inlet window 542E that is secured to the base body 550A, and a base aperture 550C that extends through the base body 550A. In this embodiment, the base aperture 550C is aligned with the inlet window 542E along a window axis 564. In this non-exclusive embodiment, the base aperture 550C is generally cylindrical shaped, and as illustrated in FIG. 5F, the inlet window 542E is generally rectangular shaped and positioned substantially flush with a base interface surface 550D of the base body 550A. For example, an adhesive 550E can be used to secure the inlet window 542E to the base body 550A. Alternatively, the base aperture 550C and the inlet window 542E can have another shape, and/or the inlet window 542E can be secured to the base body 550A in another fashion.

Additionally, the base body 550A can include one or more spaced apart, base fastener apertures 550F (two are illustrated) that extend through the base body 550A and that receive the fastener assembly 554. Moreover, the base body 550A can include one or more attachment apertures 551 (two are illustrated) that can be used to selectively secure the test cell assembly 542 to the module frame 344 (illustrated in FIG. 3).

Moreover, the base body 550A can include an alignment assembly 550G, e.g. one or more alignment pins (two spaced apart pins are illustrated) that extend upward (in FIG. 5C) and are used to align the base 550, the cap 552 and the gasket 560. Alternatively, the alignment pins 550G can be fixedly secured to the cap 552.

In one, non-exclusive embodiment, the base body 550A is made of stainless steel or other suitable material.

Somewhat similarly, in the non-exclusive embodiment illustrated in these Figures, the cap 552 includes a rigid, cap body 552A, an outlet window 542F that is secured to the cap body 552A, and a cap aperture 552C that extends through the cap body 552A. In this embodiment, the cap aperture 552C is aligned with the outlet window 542F along the window axis 564. In this non-exclusive embodiment, the cap aperture 552C is generally cylindrical shaped, and the outlet window 542F is generally rectangular shaped and positioned substantially flush with a cap interface surface 552D. For example, an adhesive 552E can be used to secure the cap window 552D to the cap body 552A. Alternatively, the cap aperture 552C and the outlet window 542F can have another shape, and/or the base window 552B can be secured to the base body 552A in another fashion.

Additionally, the cap body 552A can include one or more cap fastener internally threaded apertures 552F (two are illustrated) that receive a portion of the fastener assembly 554 to secure the base 550 to the cap 552 with the gasket 560 therebetween.

Moreover, the cap body 552A can include one or more alignment pin apertures 552G (two are illustrated) that are sized and shaped to receive the alignment pins 550G of the base 550 to align the base 550, the cap 552 and the gasket 560.

In one embodiment, the cap body 552A is made of stainless steel or other suitable material.

Each window 542E, 542F can be made of AR coated diamond (or other suitable material) and is relatively small. Alternatively, for example, one or both windows 542E, 542F can be made from other mid-infrared transmissive materials, even polymers and plastics to reduce costs.

As a non-exclusive example, with reference to FIG. 5F, the inlet window 542E is square shaped and can have a window width 553A of approximately three millimeters, a window length 553B of approximately three millimeters, and a thickness of approximately 0.3 millimeters. The outlet window 542F can be similarly designed. The diamond windows 550B, 552B are very durable. Alternatively, the size and shape of the windows 550B, 552B can be different than the example provided above.

The inlet conduit 542C delivers the sample 12 (illustrated in FIG. 1A) to the test cell assembly 542, and the outlet conduit 542D allows for the sample 12 to exit the test cell assembly 542. In one embodiment, the inlet conduit 542C and the outlet conduit 542D are in fluid communication with the cap 552 and extend through the cap 552. For example, each conduit 542C, 542D can include a flexible fluid tube 559A that is secured to the cap 552 using a fitting 559B, e.g. a zero volume fitting, that is threaded directly into the cap 552. In one embodiment, inlet conduit 542C and the outlet conduit 542D are at an angle relative to the window axis 564 and the test cell chamber 542A. For example, the inlet conduit 542C and/or the outlet conduit 542D can be at an angle of between approximately 20 to 70 degrees relative to the window axis 564.

Further, in this embodiment, the cap 552 includes an inlet passageway 566 that extends through the cap 552 into the test cell chamber 542A that allows the sample 12 to be directed into the test cell chamber 542A; and an outlet passageway 568 that extends through the cap 552 into the test cell chamber 542A to allow the sample 12 to exit the test cell chamber 542A. Moreover, in one embodiment, the inlet passageway 542C and the outlet passageway 542D are at an angle relative to the window axis 564 and the test cell chamber 542A. For example, the inlet passageway 566 and/or the outlet passageway 568 can be at an angle of between approximately 20 to 70 degrees relative to the window axis 564.

In one embodiment, (i) the inlet conduit 542C has an inlet conduit cross-sectional area; (ii) the outlet conduit 542D has an outlet conduit cross-sectional area; (iii) the inlet passageway 566 has an inlet passageway cross-sectional area; (iv) the outlet passageway 568 has an outlet passageway cross-sectional area; and (v) the test cell chamber 542A has a chamber cross-sectional area. In one embodiment, the chamber cross-sectional area is approximately equal to one or more (e.g. all) of (i) the inlet conduit cross-sectional area; (ii) the outlet conduit cross-sectional area; (iii) the inlet passageway cross-sectional area; (iv) the outlet passageway cross-sectional area. In alternative, non-exclusive examples, the chamber cross-sectional area is within approximately 1, 2, 5, 10, 20, 25, 50, 75, 100, 200, or 500 percent, of one or more (e.g. all) of (i) the inlet conduit cross-sectional area; (ii) the outlet conduit cross-sectional area; (iii) the inlet passageway cross-sectional area; (iv) the outlet passageway cross-sectional area. This minimizes dead volume and mixing of the sample 12 during the analysis in the test cell chamber 542A.

Stated in a different fashion, as alternative, non-exclusive examples, the test cell chamber 542A can be generally rectangular shaped and can have a chamber cross-section area that is approximately 1, 2, 5, 10, 20, 25, 50, 75, 100, 200, or 500 percent of the inlet conduit cross-sectional area and the inlet passageway cross-sectional area. Further, as a non-exclusive examples, the test cell chamber 542A can have a volume of less than 0.5, 1, 1.5, 2, 3, or 5 micro-liters. This results in a short test cell assembly length for the liquid to traverse during the analysis.

The gasket 560 is secured to and positioned between the base 550 and the cap 552. In one embodiment, the gasket 560 includes a gasket body 560A having a gasket opening 560B. Further, the gasket 560 can include one or more gasket apertures 561 (two are illustrated) that allow for the alignment pins 550G and the fasteners of the fastener assembly 554 to extend through gasket 560. In one embodiment, each gasket aperture 561 is somewhat tear-dropped shaped. Alternatively, each gasket aperture 561 can have a different configuration.

The gasket 560 can be made of a resilient material to form a seal between the base 550 and the cap 552, and seal between the windows 542E, 542F to define the test cell chamber 542A. Non-exclusive examples of suitable materials for the gasket 560 include Teflon (PTFE), rubber (Viton), metals (e.g. copper), or other plastic and rubber polymers.

With reference to FIGS. 5C and 5D, in one non-exclusive embodiment, the gasket body 560A is generally rectangular shaped, has a gasket thickness 560C, and the gasket opening 560B has an opening length 560D and an opening width 560E. As a non-exclusive example, the gasket opening 560B is rectangular shaped and has an opening length 560D of approximately 4.75 millimeters, and an opening width 560E of approximately 1.01 millimeters, and the gasket thickness 560C is approximately 0.15 millimeters. Alternatively, (i) one or more of the opening length 560D, opening width 560E, and gasket thickness 560C can be changed to change the volume of the test cell chamber 542A; (ii) one or more of the opening width 560E, and gasket thickness 560C can be changed to change the cross-sectional area of the test cell chamber 542A; and (iii) the gasket thickness 560C can be changed to change the path length 570 of the test cell chamber 562. Thus, the gasket 560 can be designed to achieve the desired volume, cross-sectional area, and path length 570 of the test cell chamber 562.

As non-exclusive embodiments, the gasket thickness 560C can be approximately 0.01, 0.025, 0.05, 0.075, 0.1, 0.125, 0.15, 0.2, 0.5, 1.0, 1.5, 2, 2.2, 2.4, 2.5, or 3 millimeters.

FIG. 5G is an enlarged cut-away view of the cap 552, the gasket 560, and the base 550 taken from FIG. 5E. FIG. 5G also illustrates the test cell chamber 542A.

With reference to FIGS. 5C, 5D, 5E, and 5G, as provided above, the gasket 560, the base 550, and the cap 552 cooperate to define the test cell chamber 542A. Further, the inlet window 542E and the outlet window 542F define a portion the test cell chamber 542A, and are positioned on opposite sides of the test cell chamber 542A.

In certain embodiments, (i) the gasket 560 allows fluid to pass between windows 542E, 542F without leaking out; (ii) the gasket thickness 560C sets the absorption path length 570 (referenced in FIG. 3G) of the beam that travels through the test cell chamber 542A and the sample 12, and the corresponding distance between the windows 542E, 542F; and (iii) the fluid path along gasket plane is minimized to reduce dead fluid volume.

Stated in another fashion, in certain embodiments, a path length 570 of the illumination beam through the test cell chamber 542A between the windows 542E, 542F is defined by the gasket thickness 560C. Alternative, non-exclusive embodiments, the path length 570 can be approximately 0.01, 0.025, 0.05, 0.075, 0.1, 0.125, 0.15, 0.2, 0.5, 1.0, 1.5, 2, 2.2, 2.4, 2.5, or 3 millimeters. With this design, the gasket thickness 360C can be changed to change the path length 570. It should be noted that in certain embodiments, the gasket 560 is slightly compressible. With this design the amount of torque applied to the fastener assembly 554 can also influence the final path length 570. In this design, the fastener assembly 554 is tightened so that the path length 570 is within approximately 1, 5, 10, or 25 percent of the gasket thickness 560C.

Further, the size and shape of the gasket opening 560B of the gasket 560 can be changed to adjust the cell cross-sectional area of the test cell chamber 562, and a volume of the test cell chamber 562.

The fastener assembly 554 selectively attaches the cap 552 to the base 550 with the gasket 560 therebetween and with the windows 542E, 542F aligned along the window axis 564 and spaced apart the path length 570 through the test cell chamber 542A. In one embodiment, fastener assembly 554 includes a pair of threaded bolts. However, other types of fasteners can be utilized.

Figure 6:
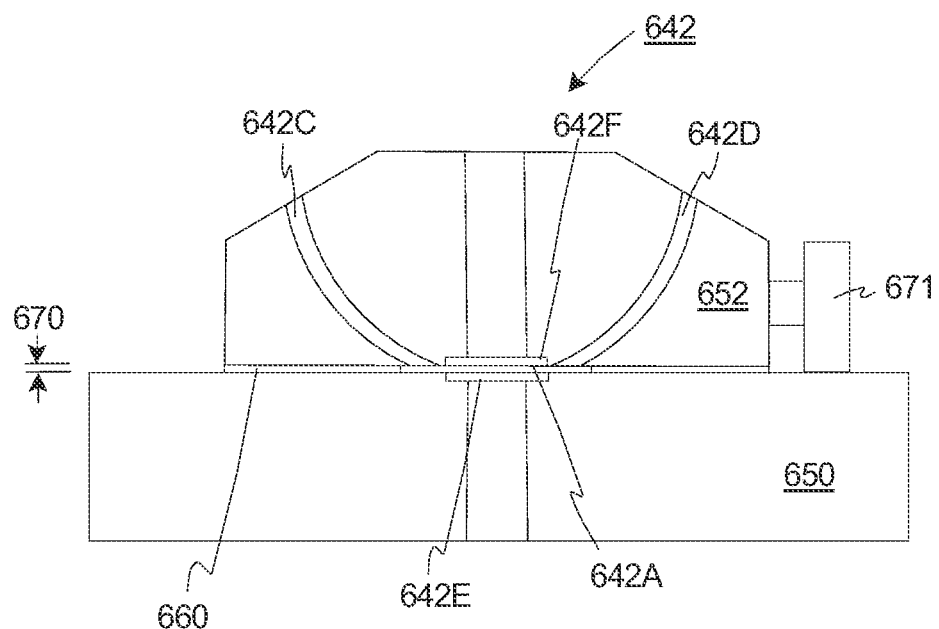
FIG. 6 is a simplified cut-away view of another embodiment of the test cell assembly.

FIG. 6 is a simplified cross-section view of another a test cell assembly 642 that can be used in the fluid analyzer 14 (illustrated in FIG. 2A). In this embodiment, the test cell assembly 642 includes a base 650, a cap 652, a gasket 660, an inlet conduit 642C, an outlet conduit 642D, an inlet window 642E, and an outlet window 642F that are somewhat similar of the corresponding components described above and illustrated in FIGS. 5A-5G. In this embodiment, these components define the test cell chamber 642A, and the distance between the windows 642E, 642F again defines the path length 670 of the laser beam 239A (not shown in FIG. 6) through the sample 12 (not shown in FIG. 6).

However, in the embodiment illustrated in FIG. 6, the gasket 660 is very compressible, and the test cell assembly 642 includes a path length adjuster 671 that selectively adjusts the path length 670. For example, the path length adjuster 671 can include one or more actuators and/or linear guides, that can be controlled to result in relative movement between the base 650 (with the inlet window 642E) and the cap 652 (with the outlet window 642F) to selective expand and contract the gasket 660 and selectively adjust the path length 670. This can be done in real time, for example, by changing the path length 670 twice a second. The path length adjuster 671 can include one or more piezoelectric elements (or other actuators), for example, and that causes relative movement between the base 650 and the cap 652 to compress and/or allow for re-expansion of the gasket 660 to change the path length 670. For example, the piezo-electric elements can selectively rotate one or more fasteners to selectively change the path length 670. Stated in another fashion, piezo-electric actuation of a leadscrew the controls the path length 670 is possible. Alternatively, for example, a direct push/pull piezo-electric actuator can be used to control the path length 670.

With this design, the path length adjuster 671 can selectively adjust the thickness (compression) of the gasket 660 to adjust the path length 670 over time. As alternative, non-exclusive embodiments, the path length 670 can be adjusted to be approximately 0.01, 0.025, 0.05, 0.075, 0.1, 0.125, 0.15, 0.2, 0.5, 1.0, 1.5, 2, 2.2, 2.4, 2.5, or 3 millimeters.

For example, certain solvents 18 or samples 12 have higher absorptions than others. With this design, the path length 670 can be selectively adjusted to correspond to the absorptions of the solvents 18 or samples 12. For example, for water, it is possible to obtain high quality data with a one hundred micrometer path length 670 from an input laser beam having a center wavelength of 6.2 to 10.0 micrometers. However, for an input laser beam having a center wavelength of between 5.9 and 6.2 micrometers, there is a very strong water absorption, and the path length 670 of the test cell assembly 642 needs to be shortened to twenty-five micrometers to get data. Thus, as provided herein, in certain embodiments, the path length 670 of the test cell assembly can be modulated (e.g. by tens of micrometers) in real time to first allow a scan at the longer path length 670, then allow a scan at the shorter path length 670. In this way, the complete spectrum can be complied together for the whole spectral range including high absorption spectral regions.

Moreover, in FIG. 6, the design of the inlet conduit 642C and the outlet conduit 642D is slightly different. More specifically, in this embodiment, the conduits 642C, 642D are curved and shaped to introduce and allow for efficient removal of the sample 12 and the solvents 18 in the test cell chamber 642A with smooth, laminar flow (Reynold number below 2300) having little to no mixing in the test cell chamber 642A.

It should be noted that either conduit 642C, 642D can have a different shape than illustrated in FIG. 6, to achieve the desired laminar flow in the test cell chamber 642A. For example, the cap 652 can be three dimensional printed to achieve the desired shapes of the conduits 642C, 642D to achieve laminar flow in the test cell assembly.

Figure 7:
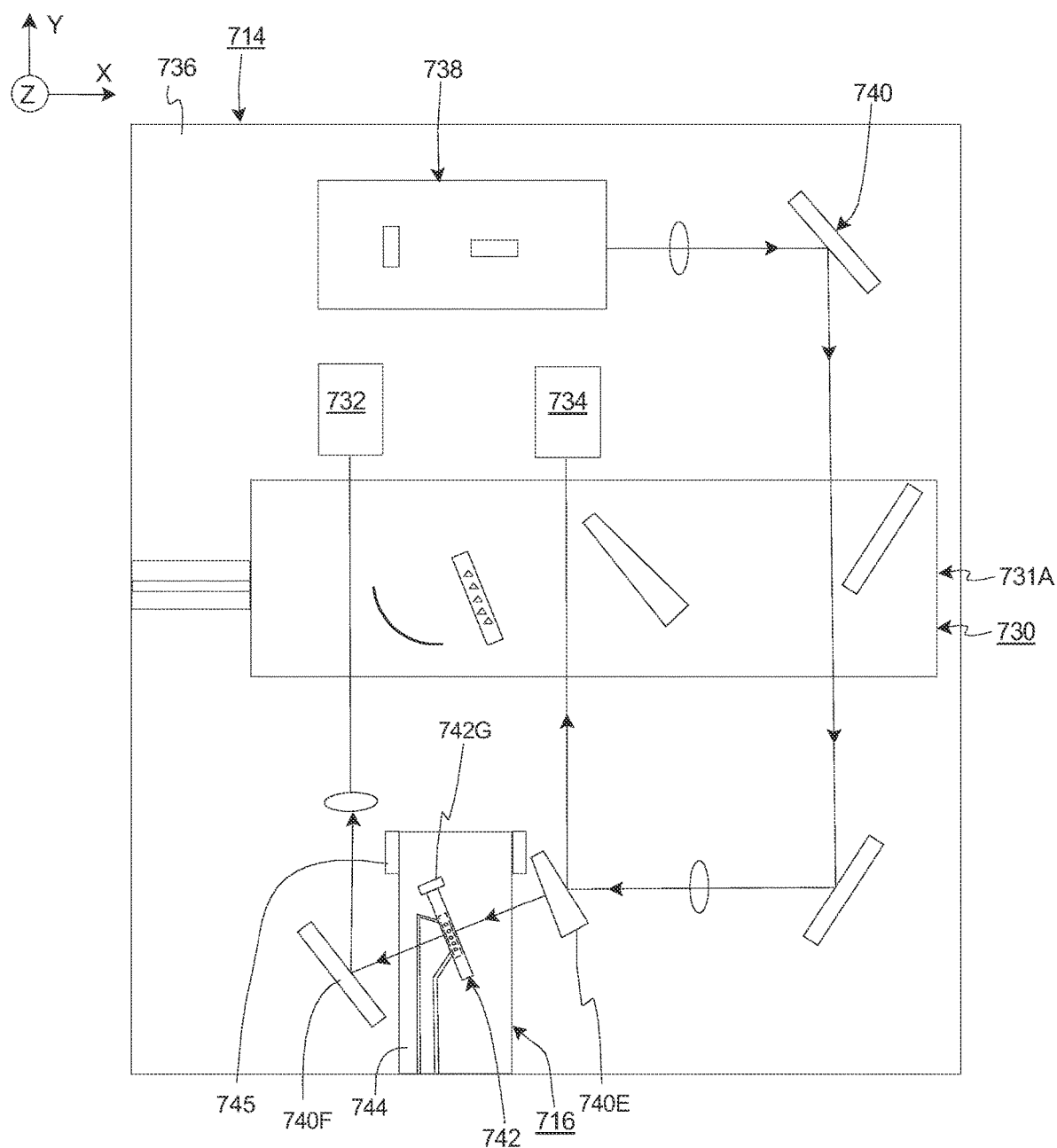
FIG. 7 is a simplified, top schematic illustration of another implementation of a fluid analyzer.

FIG. 7 is a simplified, top illustration of another of the fluid analyzer 714 including (i) an analyzer frame 736, (ii) the laser assembly 738, (iii) the beam director assembly 740, (iv) the test cell module 716 with the test cell assembly 742, (v) the signal detector assembly 732, (vi) the reference detector assembly 734, and (vii) the self-check assembly 730. In this embodiment, these components are somewhat similar to the corresponding components described above and illustrated in FIGS. 2A and 2B.

However, in the embodiment illustrated in FIG. 7, the test cell module 716 is slightly different. More specifically, in this embodiment, the test cell module 716 again includes the module frame 744 that retains the test cell assembly 742. Further, the module frame 744 can be repeatably attached to the analyzer frame 736 with the coupler assembly 745. However, in FIG. 7, the splitter element 740E and the third director 740F of the beam director assembly 740 are coupled (fixedly secured) to the analyzer frame 736 instead of the module frame 744. With this design, the test cell module 716 can be moved without moving the splitter element 740E and the third director 740F.

Additionally, in this embodiment, the test cell assembly 742 can be selectively attachable to the module frame 744. For example, the test cell assembly 742 and/or the module frame 744 can include a cell coupler assembly 742G (illustrated with a box) that allows the test cell assembly 742 to be selectively secured to the module frame 744 in a repeatable fashion. As alternative, non-exclusive examples, the cell coupler assembly 742G can include one or more fasteners, slots, snaps, guides, clamps.

With this design, the test cell assembly 742 of FIG. 7 can be easily replaced with the replacement test cell assembly 342R illustrated in FIG. 3.

Figure 8:
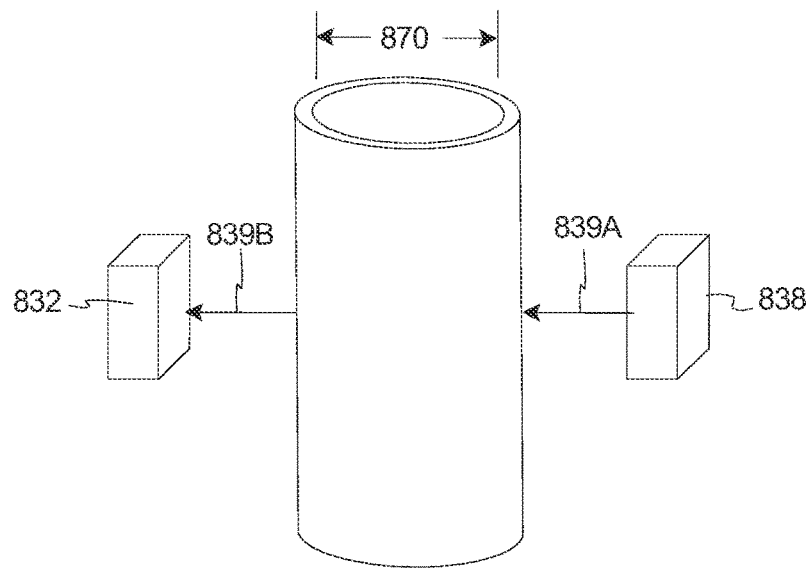
FIG. 8 is a simplified, top schematic illustration of yet another implementation of a fluid analyzer.

FIG. 8 is a simplified, top schematic illustration of yet another implementation of a fluid analyzer 814. In FIG. 8, only (i) the laser assembly 838, (ii) the test cell assembly 842, and (iii) the signal detector assembly 832 are illustrated for simplicity. In this embodiment, the test cell assembly 842 is cylindrical tube shaped (e.g. glass or plastic) with the inner diameter of the tube defining the path length 870. In this embodiment, the laser beam 839A is directed at the test cell assembly 842 transverse to the tube, and the test signal light 839B that is transmitted through the test cell assembly 842 and the sample and solvent is collected by the signal detector assembly. In this design, the components of the beam director assembly 740 (illustrated in FIG. 7) can be adjusted for the tubular shaped test cell assembly 842.

Figure 9:
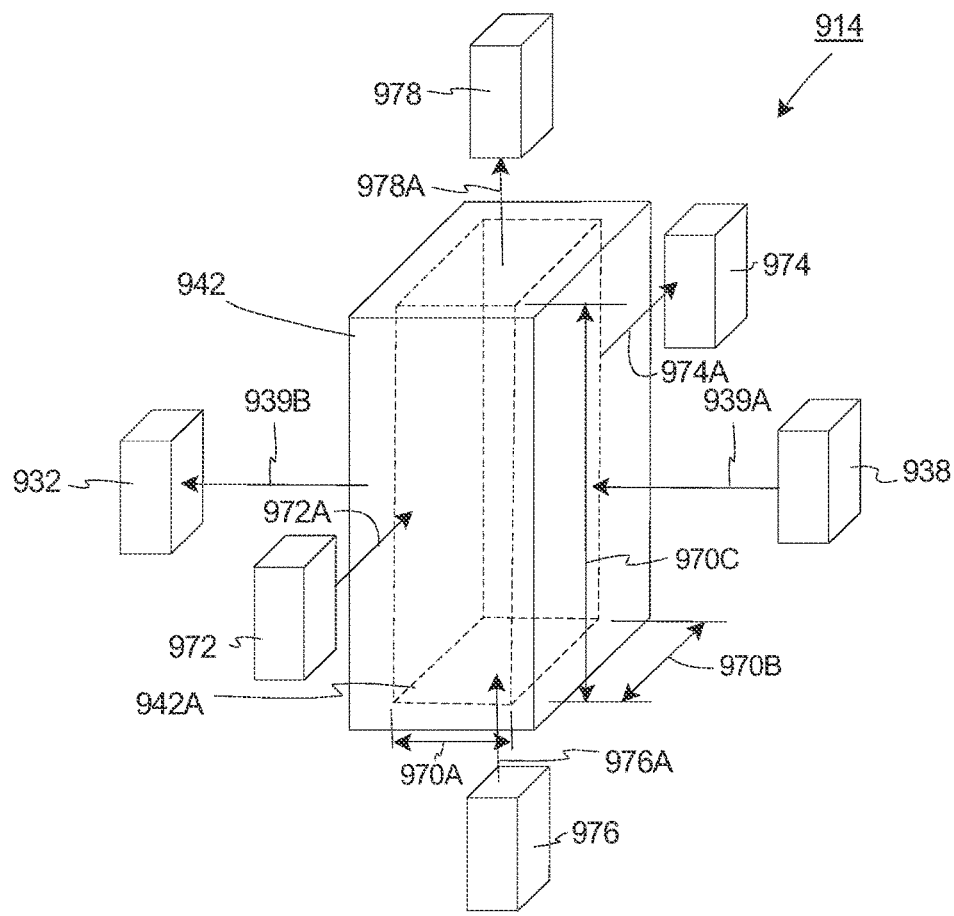
FIG. 9 is a simplified, top schematic illustration of still another implementation of a fluid analyzer.

FIG. 9 is a simplified, top schematic illustration of still another implementation of a fluid analyzer 914. In FIG. 9, the fluid analyzer 914, includes (i) the laser assembly 938; (ii) the test cell assembly 942; (iii) the signal detector assembly 832; (iv) a second laser source 972, (v) a second detector assembly 974, (vi) a third laser source 976, and (vii) a third detector assembly 978. In this embodiment, the test cell assembly 942 is rectangular box shaped and includes a box shaped test cell chamber 942A. With this design, the test cell assembly 942 can be designed to have three different path lengths including a first path length 970A, a second path length 970B that orthogonal to the first path length 970A, and a third path length 970C that is orthogonal to the first path length 970A and the second path length 970B.

In one embodiment, (i) the first laser assembly 938 directs the first laser beam 939A into the test cell assembly 942A along a first axis that is parallel to the first path length 970A and the signal detector assembly 932 collects the signal light 939B along the first axis; (ii) the second laser source 972 directs the laser beam 972A into the test cell assembly 942A along a second axis that is parallel to the second path length 970B and the signal detector assembly 974 collects the signal light 974A along the second axis; and (iii) the third laser source 976 directs the third laser beam 976A into the test cell assembly 942A along a third axis that is parallel to the third path length 970C and the third detector assembly 978 collects the signal light 978A along the third axis.

For example, the laser assembly 938 and the laser sources 972, 976 can each simultaneously spectrally analyze the sample in different wavelength ranges with different path lengths 970A-970C. For example, this arrangement can allow for simultaneous analysis using ultra-violet, near-infrared, and MIR light.

It should be noted that the test cell assembly can have other polygonal configurations to allow for additional, path lengths.

Figure 10A:
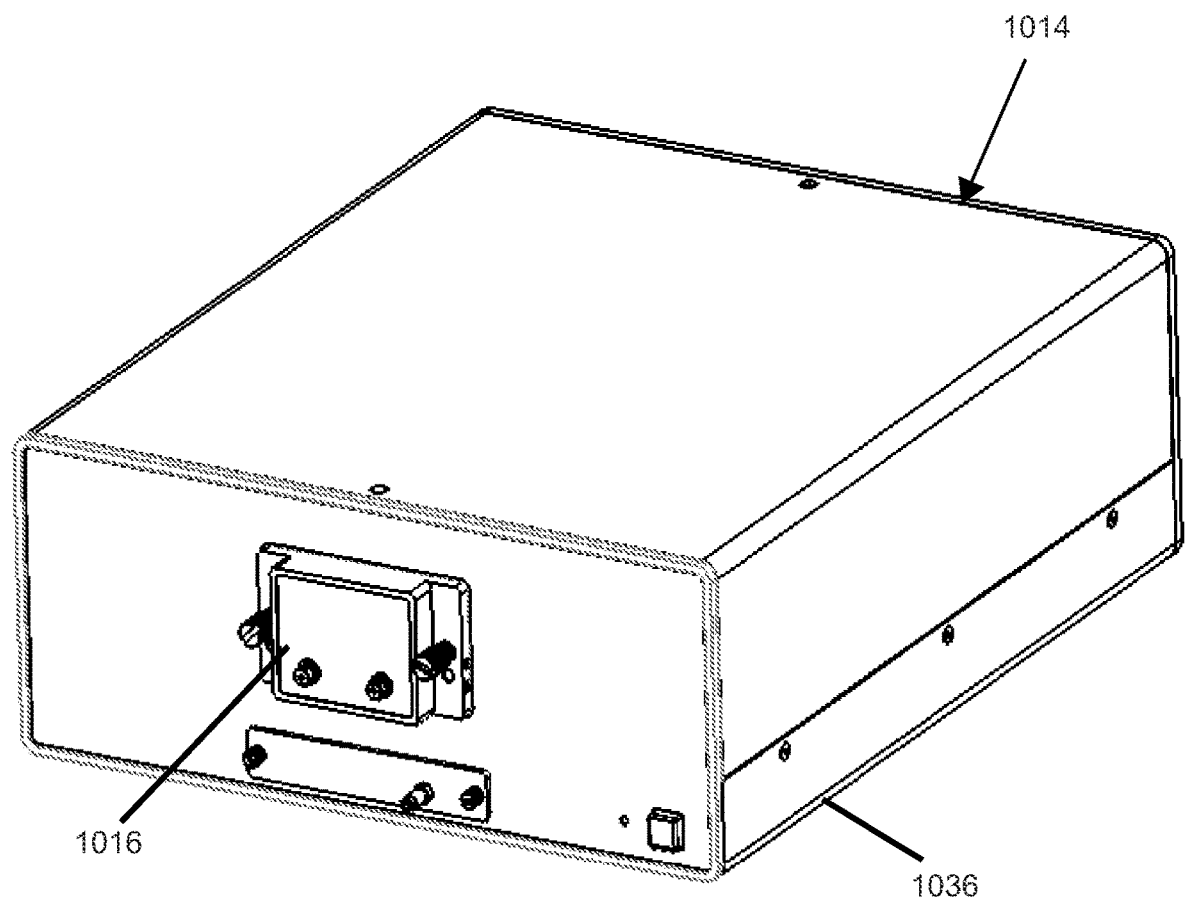
FIG. 10A is a perspective view of another implementation of the fluid analyzer.

FIG. 10A is a perspective view of another implementation of the fluid analyzer 1014 including the analyzer frame 1036, and the test cell module 1016.

Figure 10B:
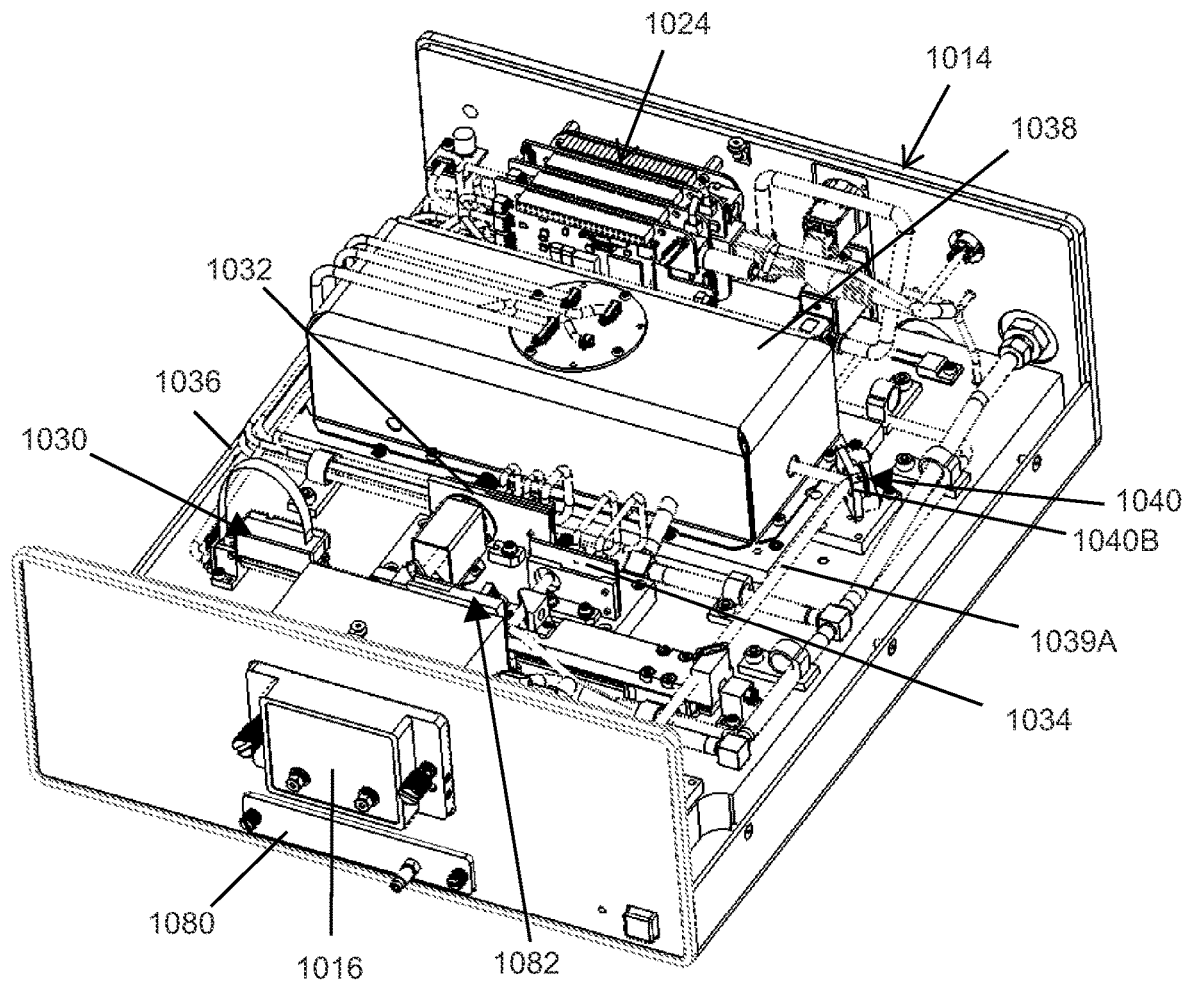
FIG. 10B is a perspective view of a portion of the fluid analyzer of FIG. 10A.

FIG. 10B is a perspective view of a portion of the fluid analyzer 1014 (without a top) of FIG. 10A, including a portion of the analyzer frame 1036 and the test cell module 1016. FIG. 10B also illustrates (i) the self-check assembly 1030; (ii) the signal detector assembly 1032; (iii) the reference detector assembly 1034; (iv) the laser assembly 1038 that generates the output laser beam 1039A; and (v) a portion of the beam director assembly 1040, namely the first director 1040B.

Additionally, as illustrated in FIG. 10B, the fluid analyzer 1014 can include a leak detection assembly 1080 that is described in more detail below. The leak detection assembly 1080 can capture any fluid that leaks from the test cell module 1016.

Further, the fluid analyzer 1014 includes a control and analysis system 1024 (e.g. one or more processors and/or storage) that control one or more of the components of the fluid analyzer 1014, such as the laser assembly 1038, the self-check assembly 1030, and the detector assemblies 1032, 1034.

Moreover, the fluid analyzer 1014 can include an analyzer electrical connector 1082 for selectively, electrically connecting the test cell module 1016 to the control and analysis system 1024.

Figure 11A:
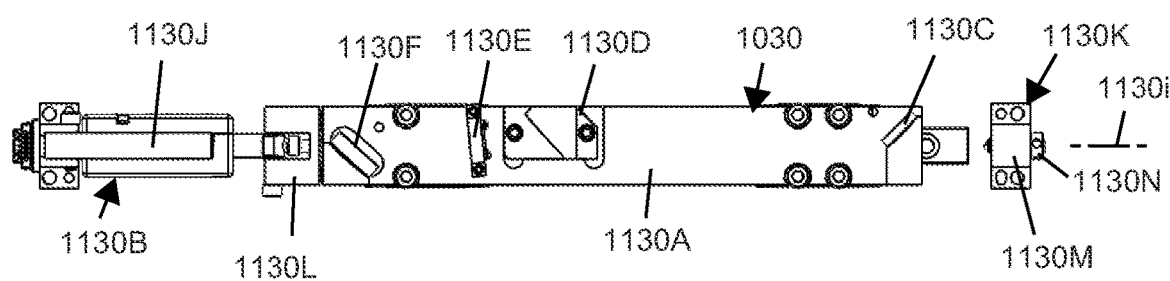
FIG. 11A is a top view of an implementation of a self-check assembly.
Figure 11B:
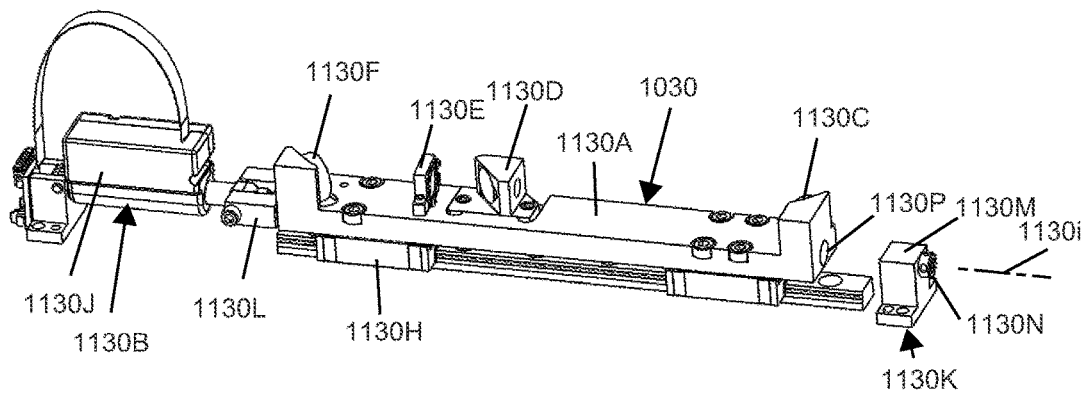
FIGS. 11B and 11C are alternatively perspective views of the self-check assembly of FIG. 11A.
Figure 11C:
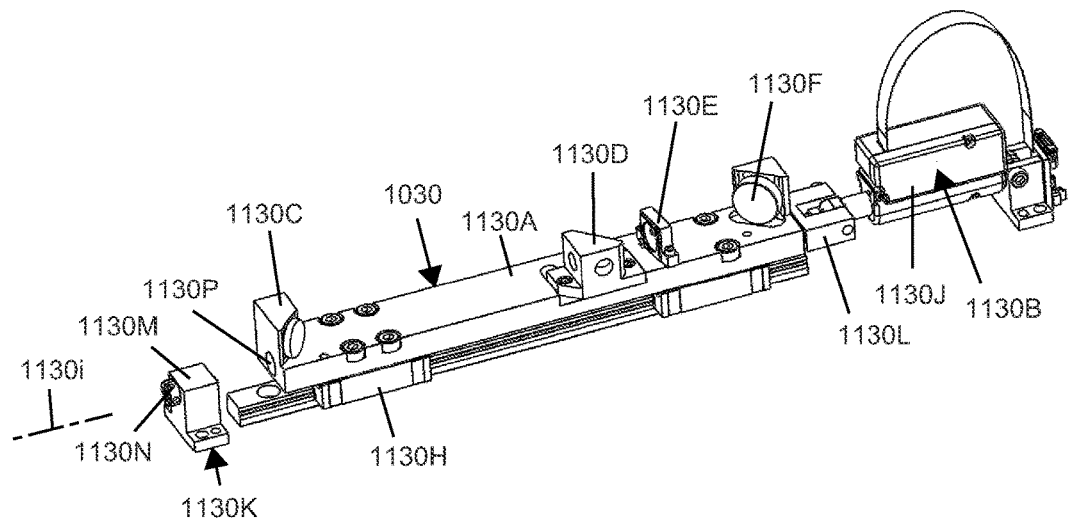

FIG. 11A is a top view, and FIGS. 11B and 11C are alternatively perspective views of the self-check assembly 1030 from FIG. 10B. In this embodiment, the self-check assembly 1030 includes the check frame 1130A, the check frame mover 1130B, the first check director 1130C, the check splitter element 1130D, the check substance 1130E, and the second check director 1130F that are somewhat similar to the corresponding component described above and illustrated in FIGS. 2A and 2B.

The check frame 1130A is rigid, generally rectangular shaped, and retains the first check director 1130C, the check splitter element 1130D, the check substance 1130E, and the second check director 1130F in a fixed arrangement.

The check frame mover 1130B is controlled by the control and analysis system 1024 (illustrated in FIG. 10B) to selectively move the check frame 1130A and the check directors 1130C, 1130F, the check splitter element 1130D, and the check substance 1130E between the standby position 231A (illustrated in FIG. 2A) and the self-check position 231B (illustrated in FIG. 2B). For example, the check frame mover 1130B can include one or more linear guides 1130H (e.g. linear guides) that guide the motion of the check frame 1130A along a check axis 1130$i$ relative to the analyzer frame 1036, and one or more linear actuators 1130J that are similar to the corresponding components described above and illustrated in FIGS. 2A and 2B.

Additionally, the frame mover 1130B can includes an adjustable stop 1130K that accurately stops the motion of the check frame 1130A in the self-check position 231B; and a flexible connector 1130L that flexibly connects the actuator 1130J to the check frame 1130A. In this design, the adjustable stop 1130K includes (i) a stop base 1130M that is fixedly secured to the analyzer frame 1036 (illustrated in FIG. 10B); and (ii) an adjustable contact 1130N (e.g. a screw) that can be selectively adjusted relative to the stop base 1130M. The adjustable contact 1130N engages a contact surface 1130P on the check frame 1130A when the check frame 1130A is in the self-check position 231B. With this design, the position of the adjustable contact 1130L can be adjusted (e.g. turn the screw) relative to the stop base 1130M along the check axis 1130$i$ to adjust the position of the check frame 1130A in the self-check position 231B.

As a result thereof, when moving from the check frame 1130A from the standby position 231A to the self-check position 231B, the actuator 1130J moves the check frame 1130A along the check axis 1130$i$ until the contact surface 1130P engages the adjustable contact 1130N. Upon engagement, the flexible connector 1130L can flex until the actuator 1130J hits an off-switch. With this design, the position of the adjustable contact 1130N can be adjusted (e.g. during system setup) along the check axis 1130$i$ to adjust the position of the check frame 1130A, the first check director 1130C, the check splitter element 1130D, the check substance 1130E, and the second check director 1130F. As a result thereof, the position of these components in the self-check position 231B can be manually set and adjusted during system setup with the adjustable stop 1130K.

Figure 12A:
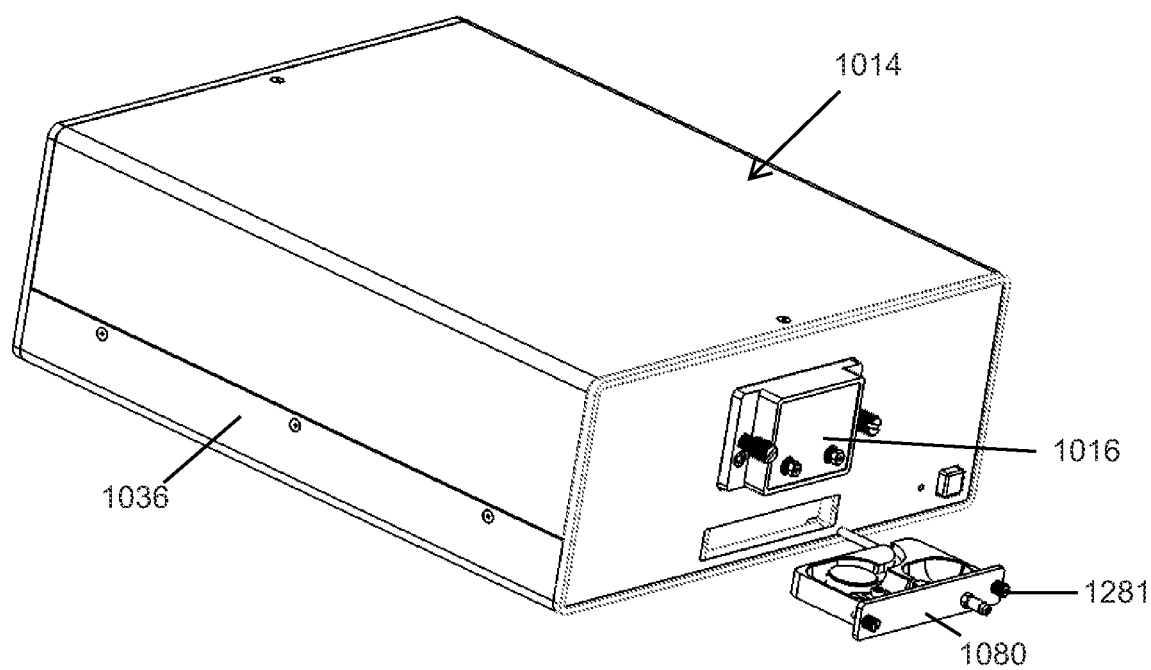
FIG. 12A is a partly exploded view of the fluid analyzer of FIG. 10A.

FIG. 12A is another partly exploded view of the fluid analyzer 1014 of FIG. 10A. In FIG. 12A, the leak detection assembly 1080 is illustrated positioned away from the analyzer frame 1036. In this non-exclusive implementation, a pair of fasteners 1281 are used to selectively attach the leak detection assembly 1080 to the analyzer frame 1036. With the present design, the leak detection assembly 1080 is positioned below the test cell module 106 to capture any fluid that leaks from the test cell module 1016. Subsequently, the leak detection assembly 1080 can be easily removed from the analyzer frame 1036 and cleaned after a leak is detected.

Figure 12B:
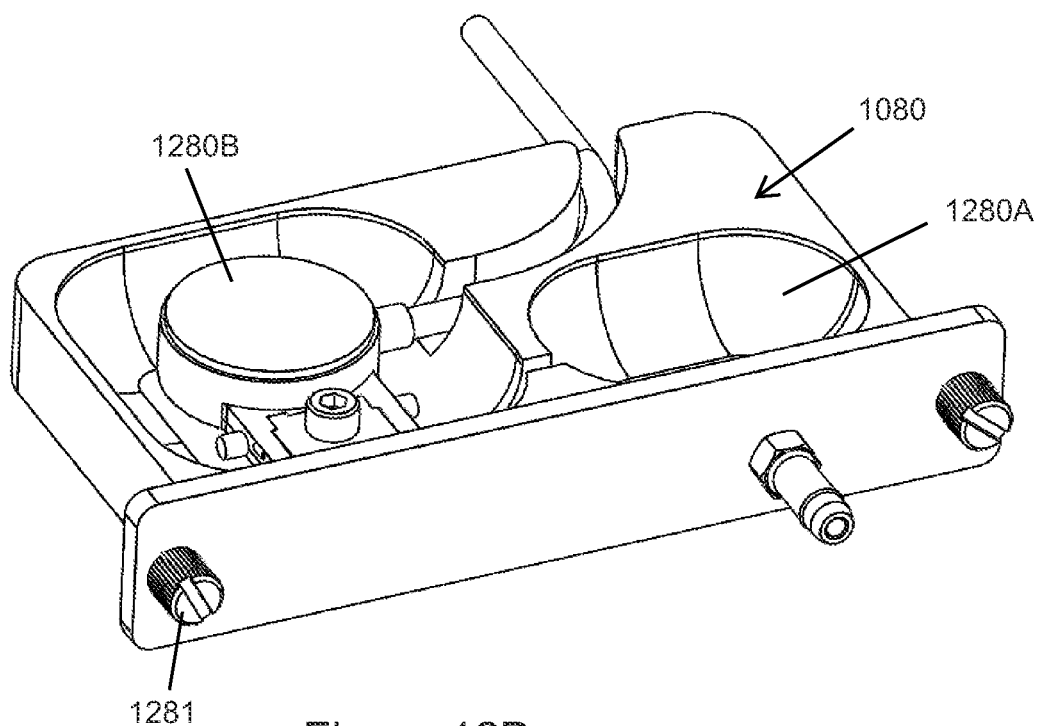
FIG. 12B is a perspective view of an implementation of a leak detection assembly.

FIG. 12B is a perspective view of a non-exclusive implementation of the leak detection assembly 1080 with the fasteners 1281. In this embodiment, the leak detection assembly 1080 includes a reservoir 1280A for capturing any leaking fluid leaking from the test cell module 1016 (illustrated in FIG. 12A), and a leak sensor 1280B that senses when a predetermined amount of fluid has leaked into the reservoir 1280A. The leak sensor 1280B can be electrically connected with the control and analysis system 1024 (illustrated in FIG. 10B). For example, the leak sensor 1280B can sense when the liquid level in the reservoir 1280A is one to two millimeters deep. In one embodiment, the leak sensor 1280B is an organic chemical sensor mounted under the exit port for the purge gas.

Figure 13A:
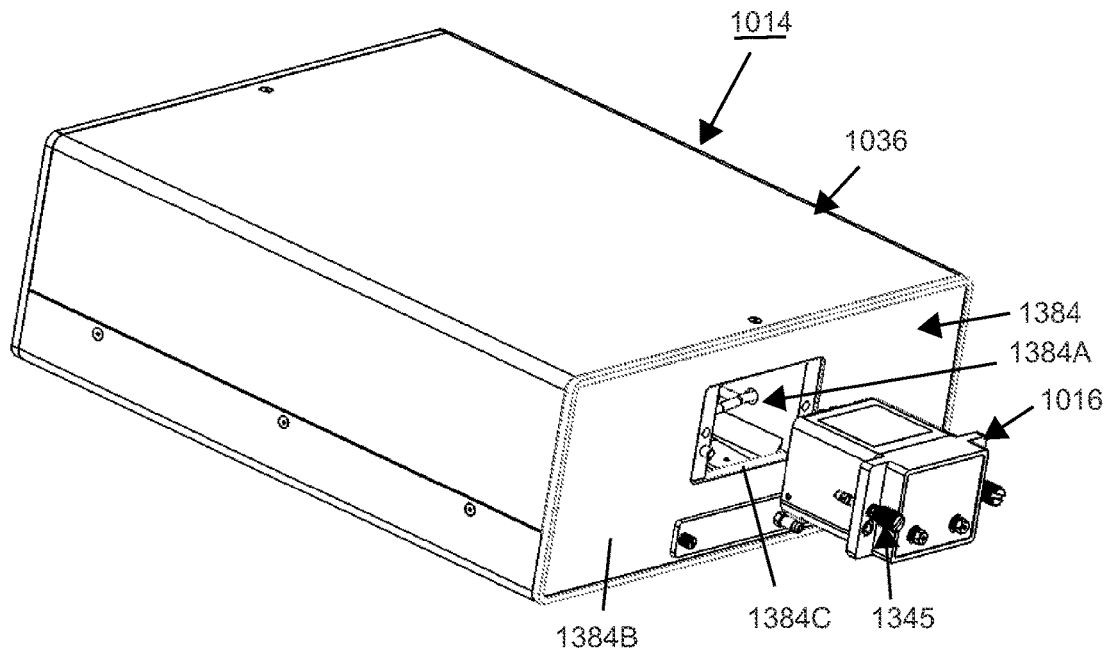
FIGS. 13A and 13B are alternative, partly exploded views of the fluid analyzer of FIG. 10A.
Figure 13B:
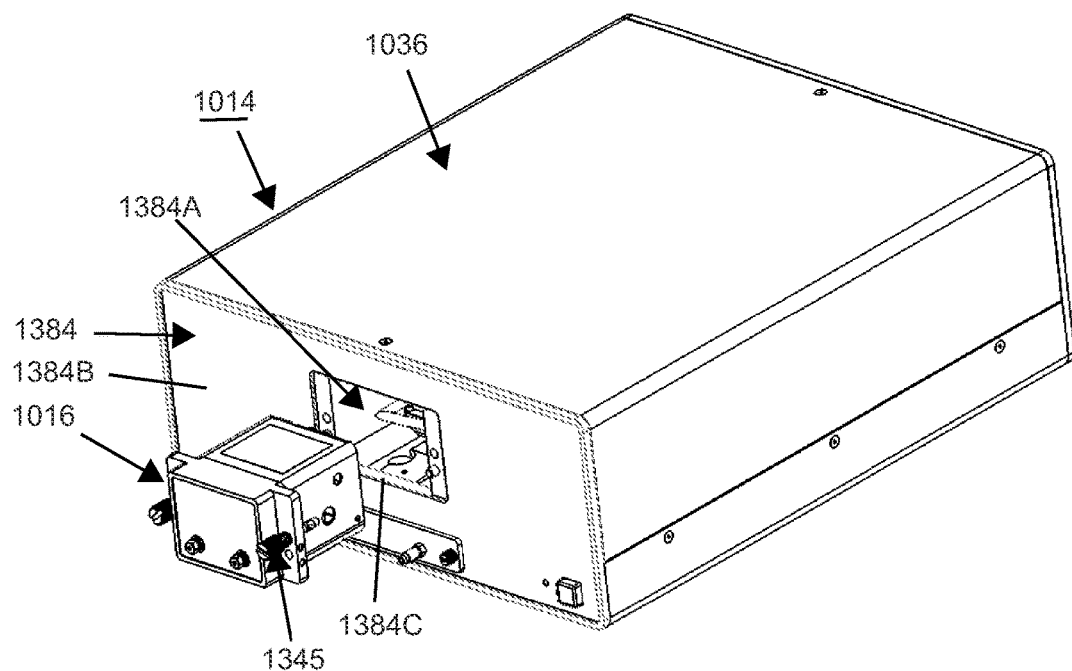

FIGS. 13A and 13B are alternative, partly exploded views of the fluid analyzer 1014 of FIG. 10A with the test cell module 1016 positioned away from the analyzer frame 1036. In this embodiment, the analyzer frame 1036 is generally rectangular box shaped, and includes a front frame wall 1384 that defines a module receiver 1384A that selectively receives the test cell module 1016. In one implementation, the front frame wall 1384 includes a front panel 1384B and a rectangular tube shaped, panel receiver 1384C that is secured to the front panel 1384B. In this design, the test cell module 1016 selectively fits within the panel receiver 1384C.

Additionally, in this embodiment, the coupler assembly 1345 allows the test cell module 1016 to be selectively coupled to the analyzer frame 1036 in a repeatable fashion, and selectively uncoupled and moved relative to the analyzer frame 1036. The design of the coupler assembly 1345 can be varied as long as it selectively couples the test cell module 1016 to the analyzer frame 1036 in a repeatable fashion.

Figure 13C:
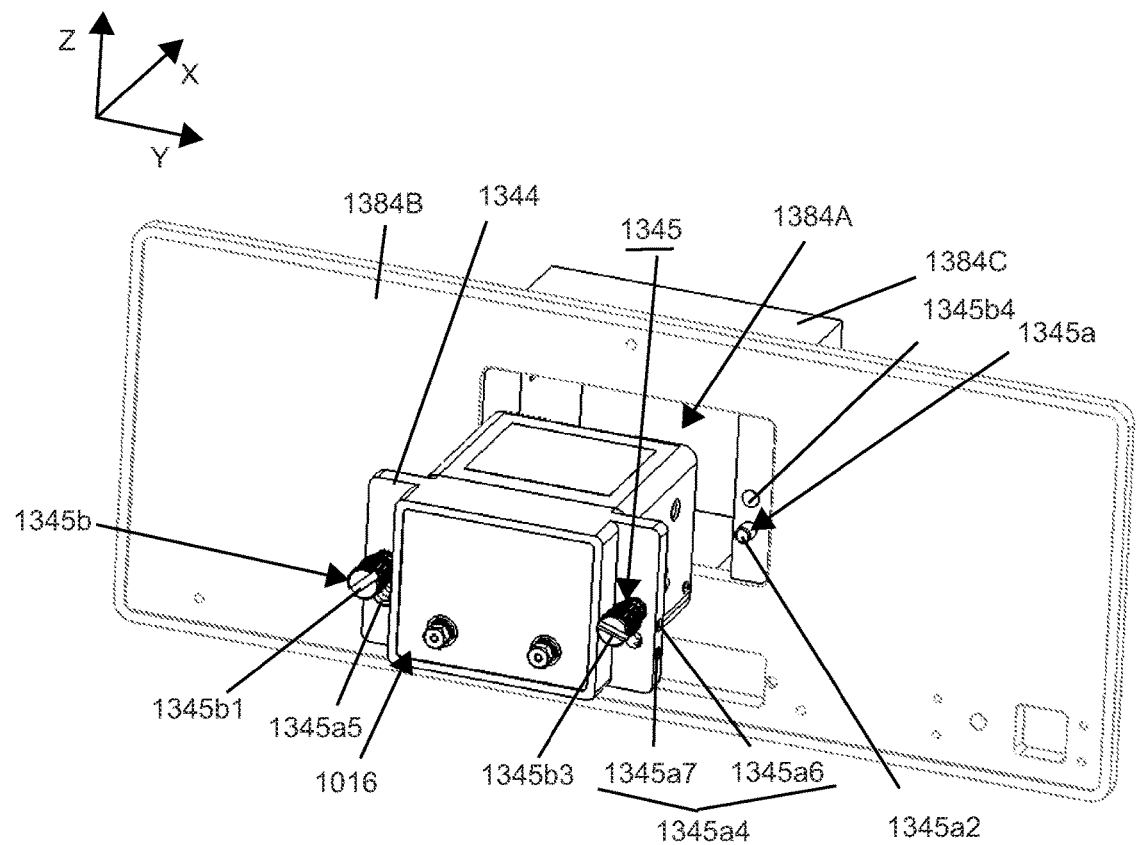
FIGS. 13C and 13D are an exploded view of a portion of the fluid analyzer of FIGS. 13A and 13B.
Figure 13D:
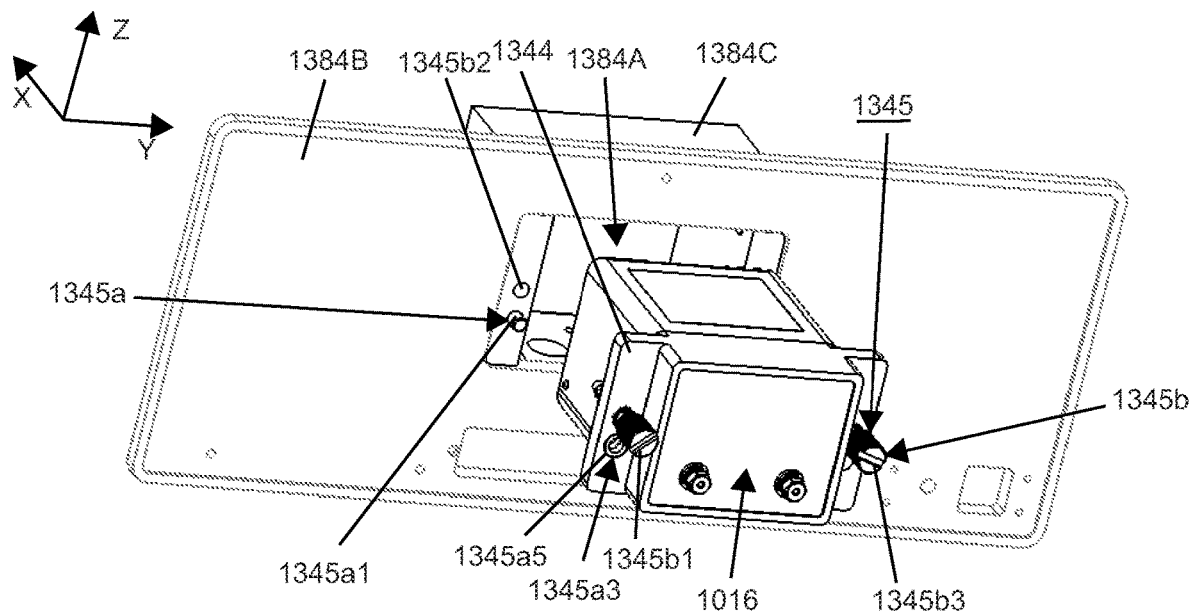

FIGS. 13C and 13D are exploded, perspective views of the test cell module 1016, the front panel 1384B, the panel receiver 1384C, and the coupler assembly 1345 from FIGS. 13A and 13B. In FIGS. 13C and 13D, the test cell module 1016 is illustrated outside of the module receiver 1384A.

FIGS. 13C and 13D include an orientation system that illustrates an X axis, a Y axis that is orthogonal to the X axis, and a Z axis that is orthogonal to the X and Y axes. It should be noted that any of these axes can also be referred to as the first, second, and/or third axes. Further, as used herein, movement with six degrees of freedom shall mean along and about the X, Y, and Z axes.

In one non-exclusive implementation, the coupler assembly 1345 selectively couples the module frame 1344 of the test cell module 1016 to the panel receiver 1384C. In this implementation, the coupler assembly 1345 includes an alignment assembly 1345a that aligns the module frame 1344 with panel receiver 1384C of the analyzer frame 1036, and a fastener assembly 1345b that fastens the module frame 1344 to the panel receiver 1384C. With this design, the coupler assembly 1345 aligns and secures the module frame 1344 to panel receiver 1384C about three axes (about the X, Y, and Z axes) and along three axes (along the X, Y, and Z axes).

In the non-exclusive implementation of FIGS. 13C and 13D, the alignment assembly 1345a includes (i) a first alignment pin 1345a1; (ii) a second alignment pin 1345a2 that is spaced apart from the first alignment pin 1345a1; (iii) an alignment aperture 1345a3 that is sized and shaped to receive the first alignment pin 1345a; and (iv) a pair of alignment surfaces 1345a4 in an aperture that are spaced apart to receive the second alignment pin 1345a2. In FIGS. 13C and 13D, (i) the alignment pins 1345a1, 1345a2 extend away from the panel receiver 1384C, and (ii) the module frame 1344 includes the alignment aperture 1345a3, and the pair of alignment surfaces 1345a4. Stated in another fashion, the alignment pins 1345a1, 1345a are coupled to and cantilever away from the panel receiver 1384C; and the module frame 1344 includes the alignment aperture 1384a3 and the alignment surfaces 1345a4. Alternatively, (i) the alignment pins 1345a1, 1345a can extend away from the module frame 1344, and (ii) the panel receiver 1384C can include the alignment aperture 1384a3, and the pair of alignment surfaces 1345a4.

In one embodiment, (i) the first alignment pin 1345a1 is a cylindrical shaped beam; (ii) the first alignment aperture 1345a3 is a cylindrical shaped aperture that is sized and shaped to snugly receive the first alignment pin 1345a1; (iii) the second alignment pin 1345a2 is a cylindrical shaped beam; and (iv) the alignment surfaces 1345a4 are spaced apart to snugly receive the second alignment pin 1345a2 therebetween.

In one implementation, (i) the first alignment aperture 1345a3 includes a tubular shaped bushing 1345a5 that extends through the module frame 1344; and (ii) an upper alignment rod 1345a6 and a spaced apart lower alignment rod 1345a7 that are secured to the module frame 1344 and that cooperate to define the alignment surfaces 1345a.

The design of the fastener assembly 1345b can also be varied. In FIGS. 13C and 13D, the fastener assembly 1345b includes (i) a first fastener 1345b1 (e.g. a bolt) that extends through the module frame 1344; (ii) a first internally treaded aperture 1345b2 in the panel receiver 1384C that receives the first fastener 1345b1; (iii) a second fastener 1345b3 (e.g. a bolt) that extends through the module frame 1344; and (iv) a second internally treaded aperture 1345b4 in the panel receiver 1384C that receives the second fastener 1345b2. However, these components can be reversed.

Figure 13E:
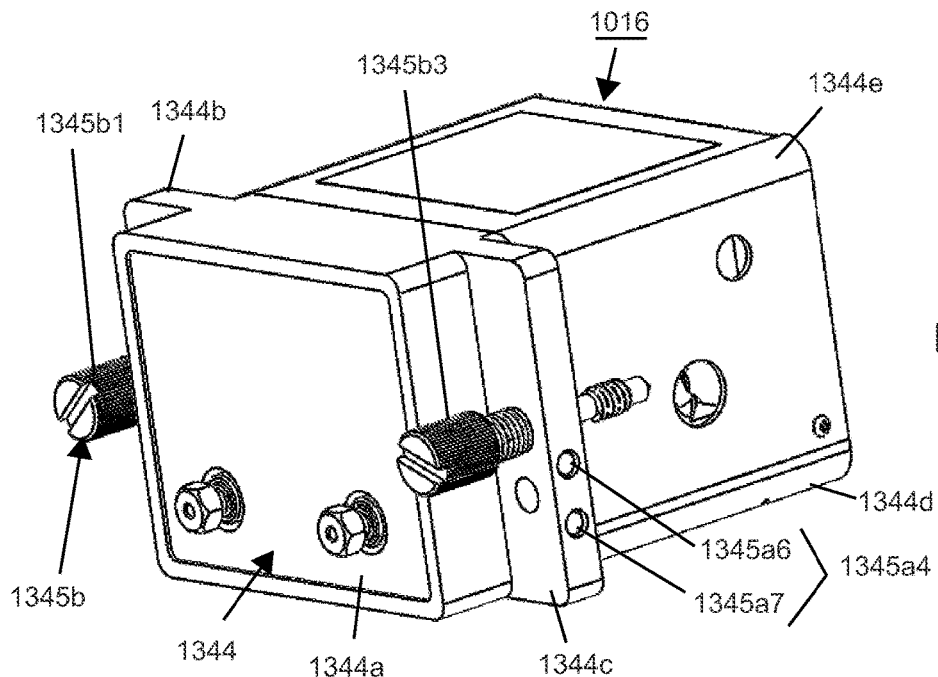
FIG. 13E is a perspective view of an implementation of a test cell module.

FIG. 13E is a perspective view of an implementation of a test cell module 1016 including (i) the module frame 1344; (ii) the alignment rods 1345a6, 1345a7 of the alignment surface 1345a4; and (iii) the fasteners 1345b1, 1345b3 of the fastener assembly 1345b.

In this non-exclusive implementation of FIG. 13E, the module frame 1344 somewhat rectangular shaped and includes (i) a generally rectangular shaped front module panel 1344a that includes a first panel tab 1344b and an opposed second panel tab 1344c; (ii) a module base 1344d; and (iii) a module cover 1344e.

Figure 13F:
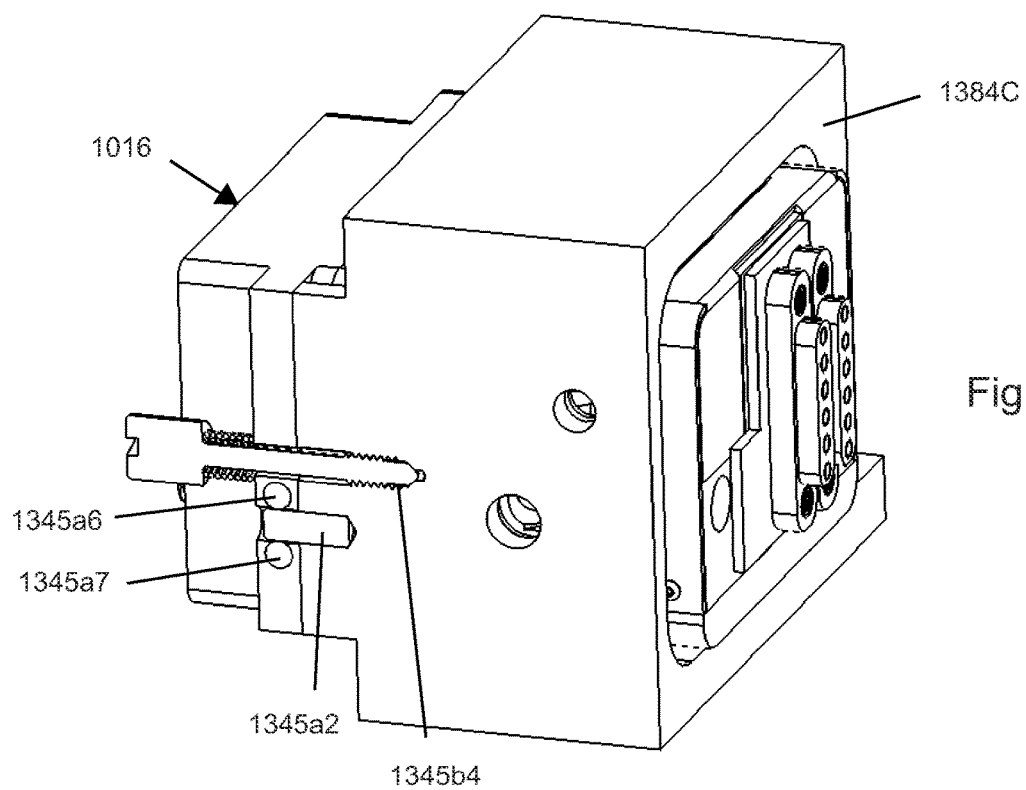
FIG. 13F is a perspective cut-away view of a portion of the fluid analyzer of FIGS. 13A and 13B.

FIG. 13F is a perspective cut-away view of (i) the test cell module 1016, (ii) the panel receiver 1384C, (iii) the second alignment pin 1345a2 retained between the alignment rods 1345a6, 1345a; and (iv) the second fastener 1345b3 threaded into the second internally threaded aperture 1345b4.

Figure 13G:
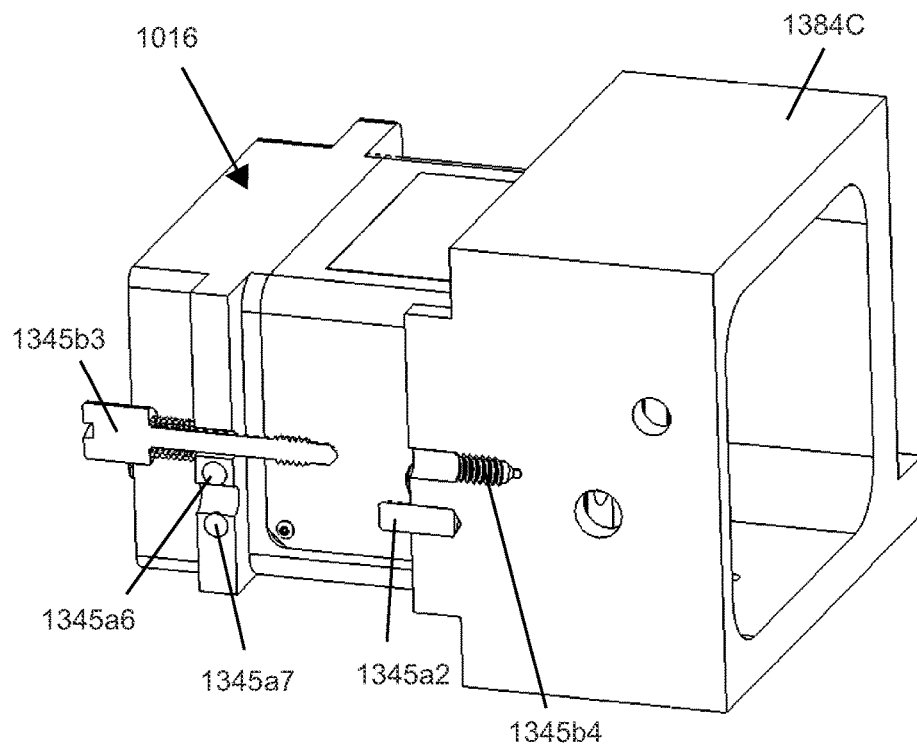
FIG. 13G is an exploded perspective cut-away view of the portion of the fluid analyzer of FIG. 13F.

FIG. 13G is an exploded view of FIG. 13F illustrating (i) the test cell module 1016, (ii) the panel receiver 1384C, (iii) the second alignment pin 1345a2 and the alignment rods 1345a6, 1345a; and (iv) the second fastener 1345b3 and the second internally threaded aperture 1345b4.

Figure 13H:
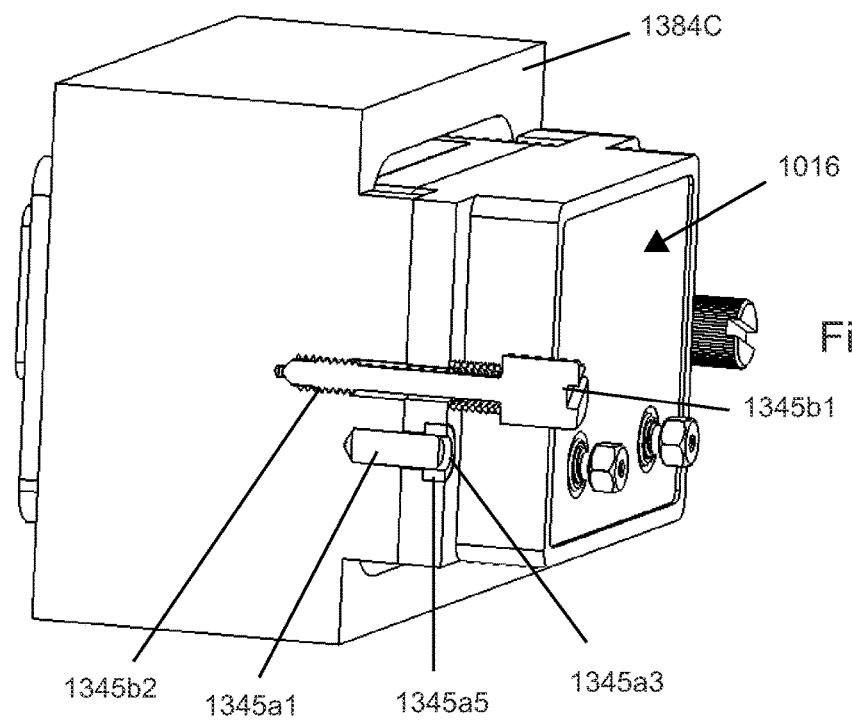
FIG. 13H is another, perspective cut-away view of a portion of the fluid analyzer of FIGS. 13A and 13B.

FIG. 13H is an alternative perspective cut-away view of (i) the test cell module 1016, (ii) the panel receiver 1384C, (iii) the first alignment pin 1345a1 positioned with the bushing 1345a5 of the alignment aperture 1345a3; and (iv) the first fastener 1345b1 and the first internally threaded aperture 1345b2.

Figure 14A:
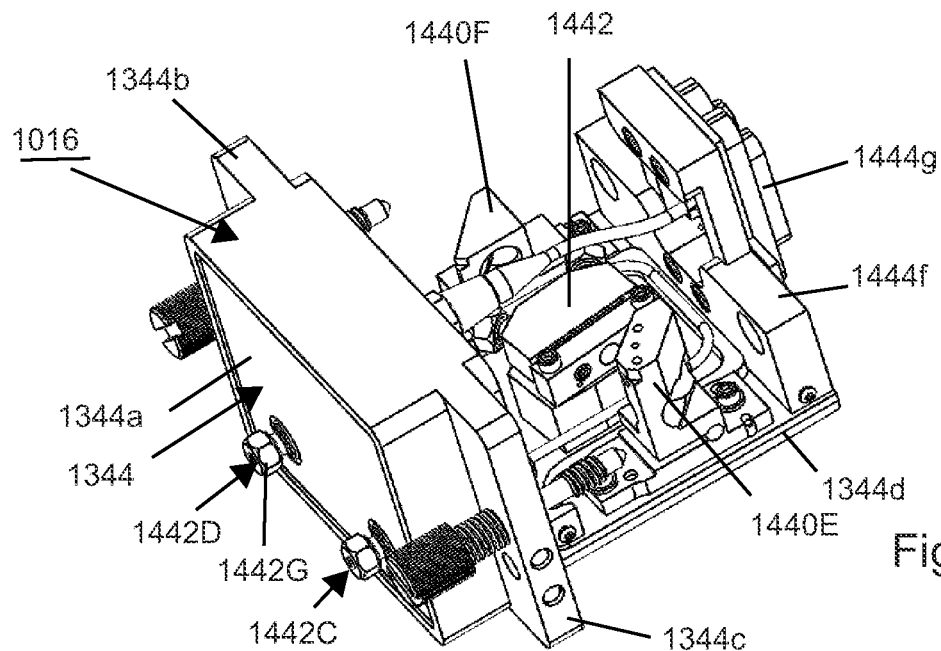
FIGS. 14A-14C are alternative perspective views of the test cell module of FIG. 13E.
Figure 14B:
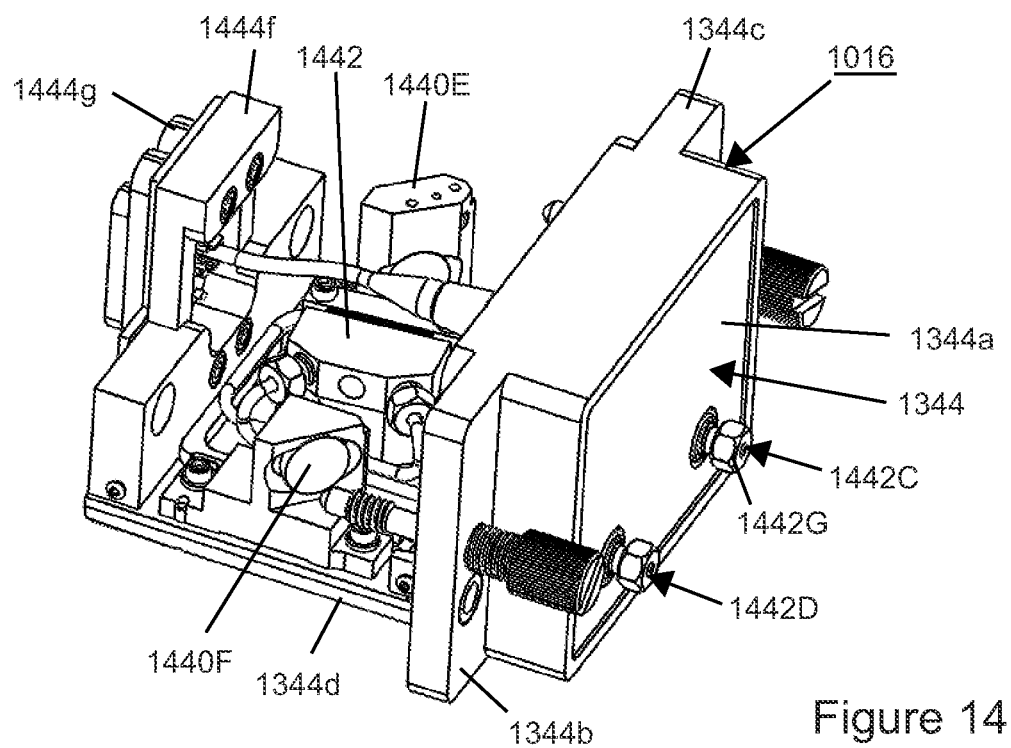
Figure 14C:
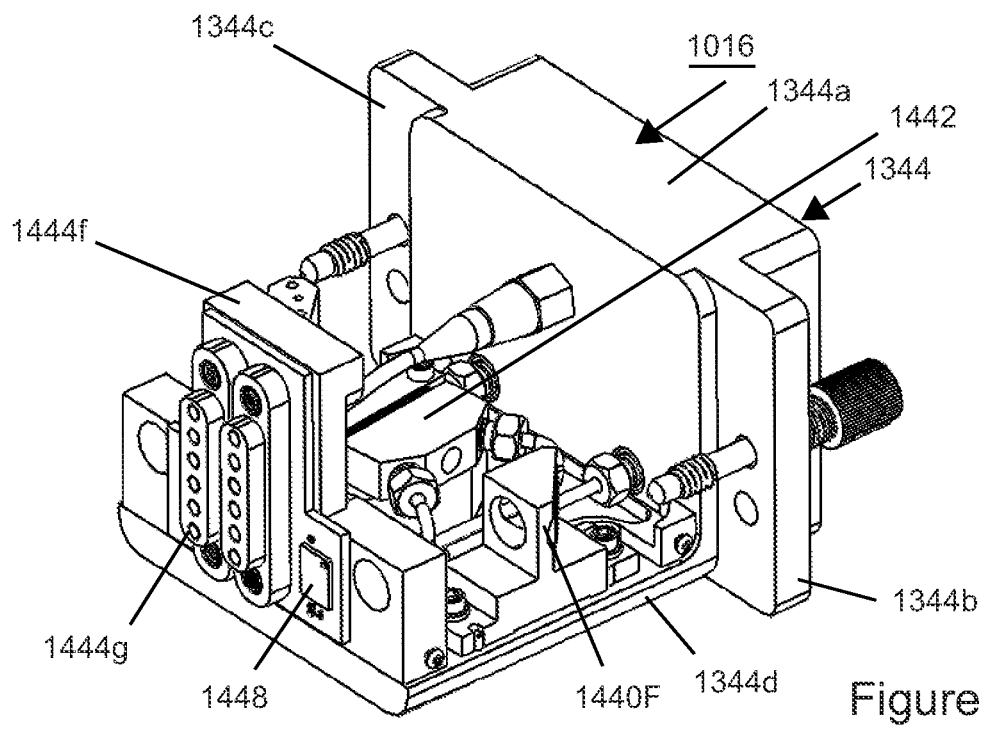
Figure 14D:
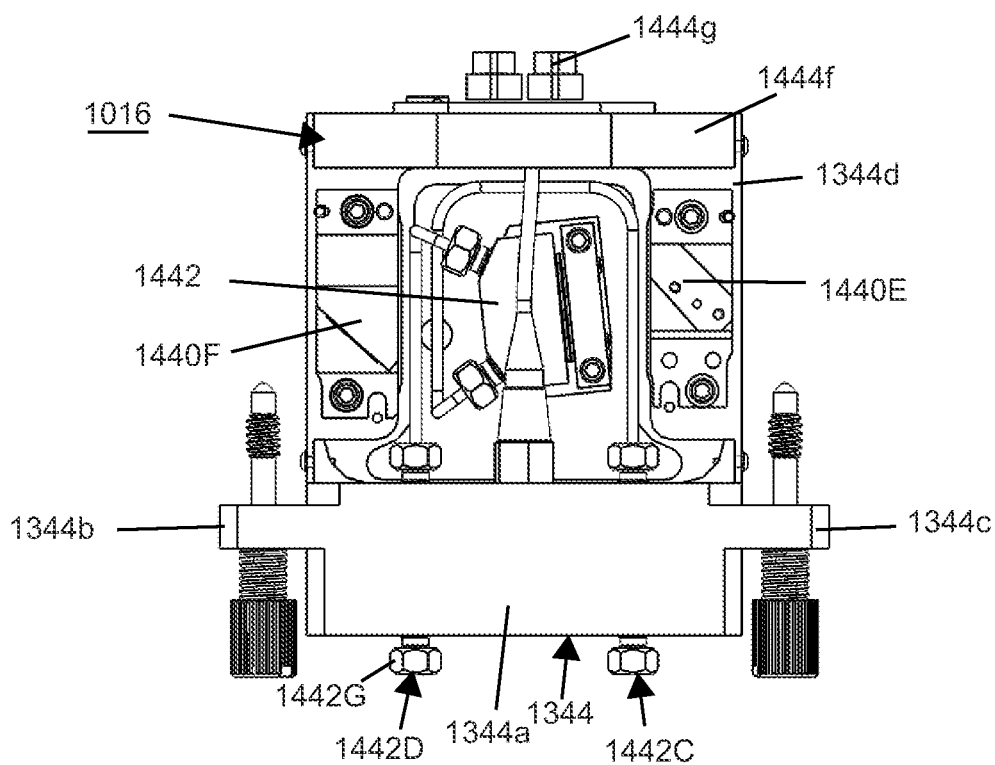
FIG. 14D is a top view of the test cell module of FIG. 13E.

FIGS. 14A-14C are alternative perspective views and FIG. 14D is a top view of the test cell module 1016 of FIG. 13E. More specifically, these Figures illustrate the module frame 1344 with (i) the front module panel 1344a and the panel tabs 1344b, 1344c; and (ii) the module base 1344d. The module cover 1344e (illustrated in FIG. 13E) is not shown in FIGS. 14A-14C to reveal the components within.

More specifically, in this embodiment, the test cell module 1016 also includes the splitter element 1440E, the third director 1440F, and the test cell assembly 1442 which are somewhat similar to the corresponding components described above. In this implementation, the splitter element 1440E, the third director 1440F, and the test cell assembly 1442 that are coupled (e.g. fixedly secured) to the module base 1444d.

Additionally, in this design, the module frame 1344 includes a module back panel 1442d that is opposite the front module panel 1344a. Moreover, the test cell module 1016 can include a module electrical connector 1444e and an identifying label 1448 that are secured to the module back panel 1442d or another location. In this design, the module electrical connector 1444e engages and electrically connects to the analyzer electrical connector 1082 (illustrated in FIG. 10B) to selectively connect the components on the test cell module 1016 to the control and analysis system 1024.

Further, the identifying label 1448 can be can include information such as (i) test cell assembly identification ("ID"); (ii) test cell assembly serial number; (iii) calibration data of the test cell assembly 1442; (iv) usage logs for the test cell assembly 1442. In one embodiment, the identifying label 1448 is a gamma radiation proof, radio-frequency identification tag ("RF ID tag") that can be read by a RF reader 14B (illustrated in FIG. 1A) to obtain the information regarding the test cell assembly 1442. This ensures electronic records and electronic signatures are considered trustworthy, reliable, and equivalent to paper records.

In one embodiment, the test cell assembly 1442 includes the sample inlet conduit 1442C and the sample outlet conduit 1442D that extends through the front panel 1344A of the module frame 1344. The sample inlet conduit 1442C and the sample outlet conduit 1442D can each include an end connector 1442G that allows each of the conduits 1442C, 1442D and the test cell assembly 1442 to be selectively coupled (in fluid communication) to the rest of spectroscopy system 10 (illustrated in FIG. 1A).

Figure 14E:
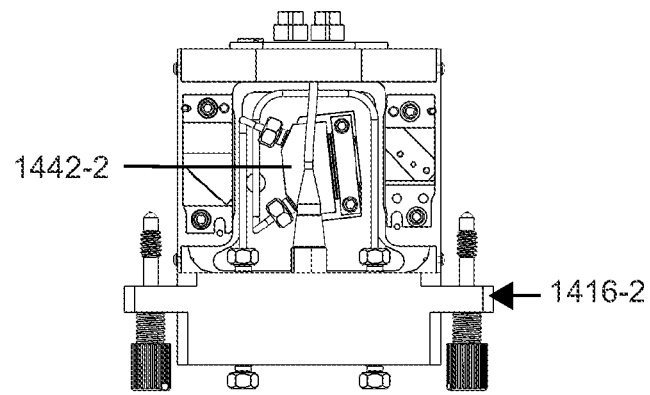
FIG. 14E is top view of three additional test cell modules.
Figure 14E:
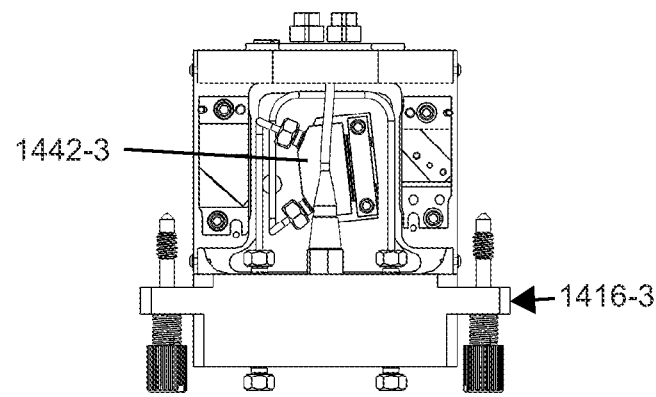
Figure 14E:
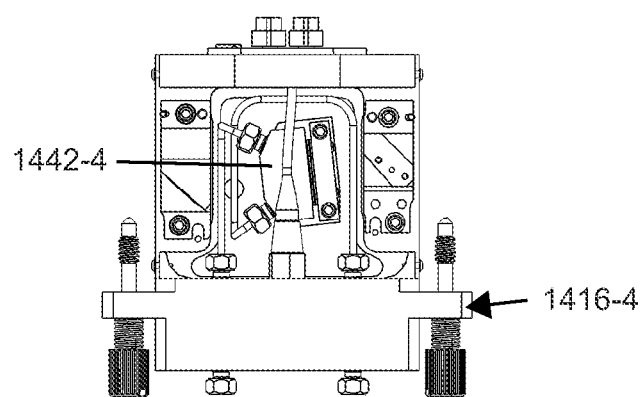

It should be noted that in the embodiment of FIGS. 14A-14D, the test cell module 1016 can be easily removed from the fluid analyzer 1014 (illustrated in FIG. 10A). Further, the test cell module 1016 of FIGS. 14A-14D includes the test cell assembly 1442 having a first path length of the beam through the test cell assembly 1442. FIG. 14E is top view of three alternative test cell modules, namely a second test cell module 1416-2, a third test cell module 1416-3, and a fourth test cell module 1416-4. In one implementation, (i) the second test cell module 1416-2 has a test cell assembly 1442-2 having a second path length that is different from the first path length; (ii) the third test cell module 1416-3 has a third test cell assembly 1442-3 having a third path length that is different from the first path length and the second path length; and (iii) the fourth test cell module 1416-4 has a fourth test cell assembly 1442-4 having a fourth path length that is different from the first path length, the second path length, the third path length. With this design, the test cell module 1016 of FIGS. 14A-14D having the first path length can be easily substituted with (i) the second test cell module 1416-2 having the second path length; (ii) the third test cell module 1416-3 having the third path length; and (iii) the fourth test cell module 1416-4 having the fourth path length. With this design, the test cell module 1016, 1416-2, 1416-3, 1416-4 with the desired path length can be easily swapped (by the end user) into the fluid analyzer 1014. It should be noted more than four or fewer that four alternative test modules can be utilized.

Figure 15A:
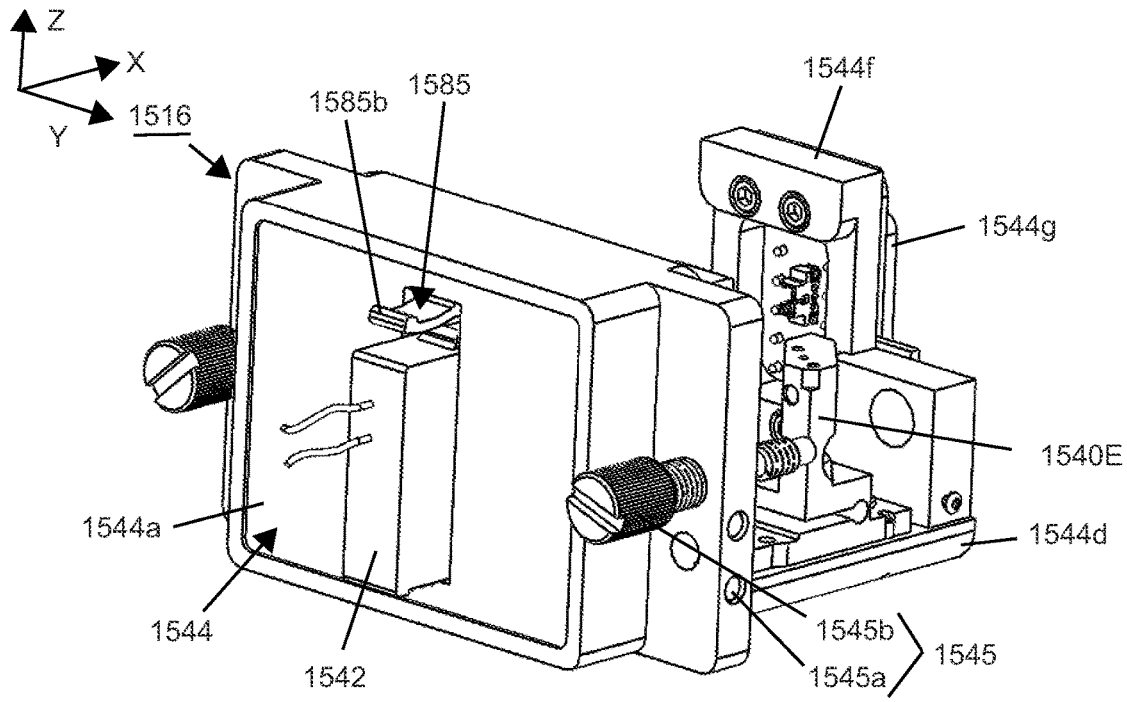
FIGS. 15A-15C are alternative perspective views of a portion of another implementation of the test cell module.
Figure 15B:
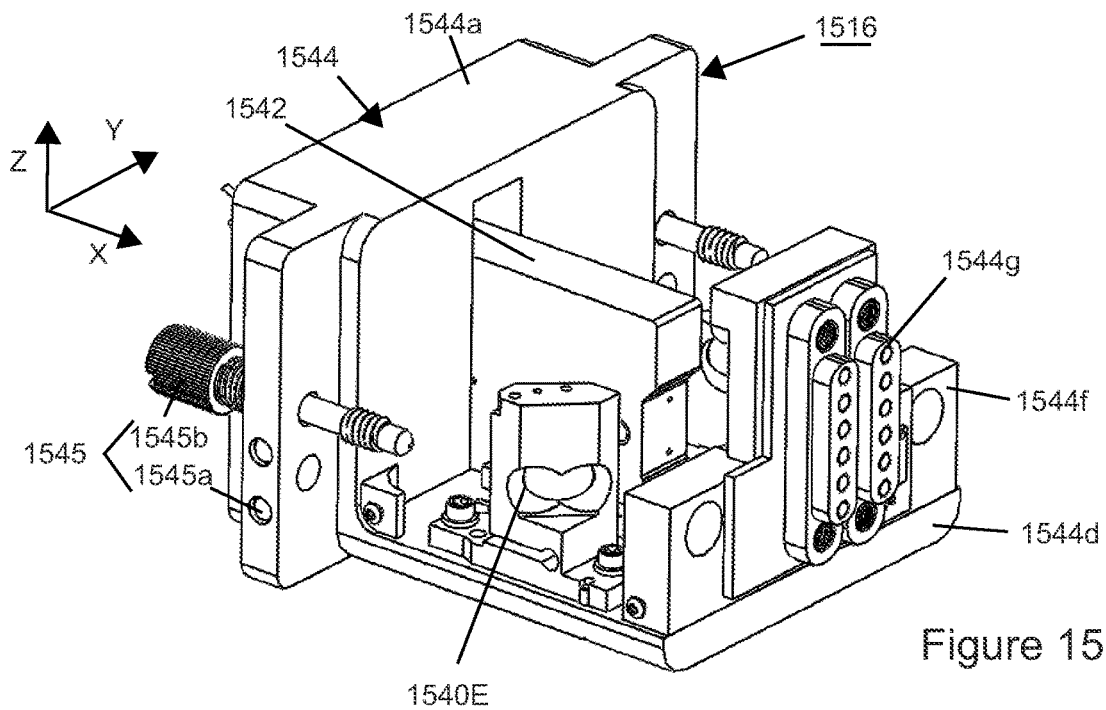
Figure 15C:
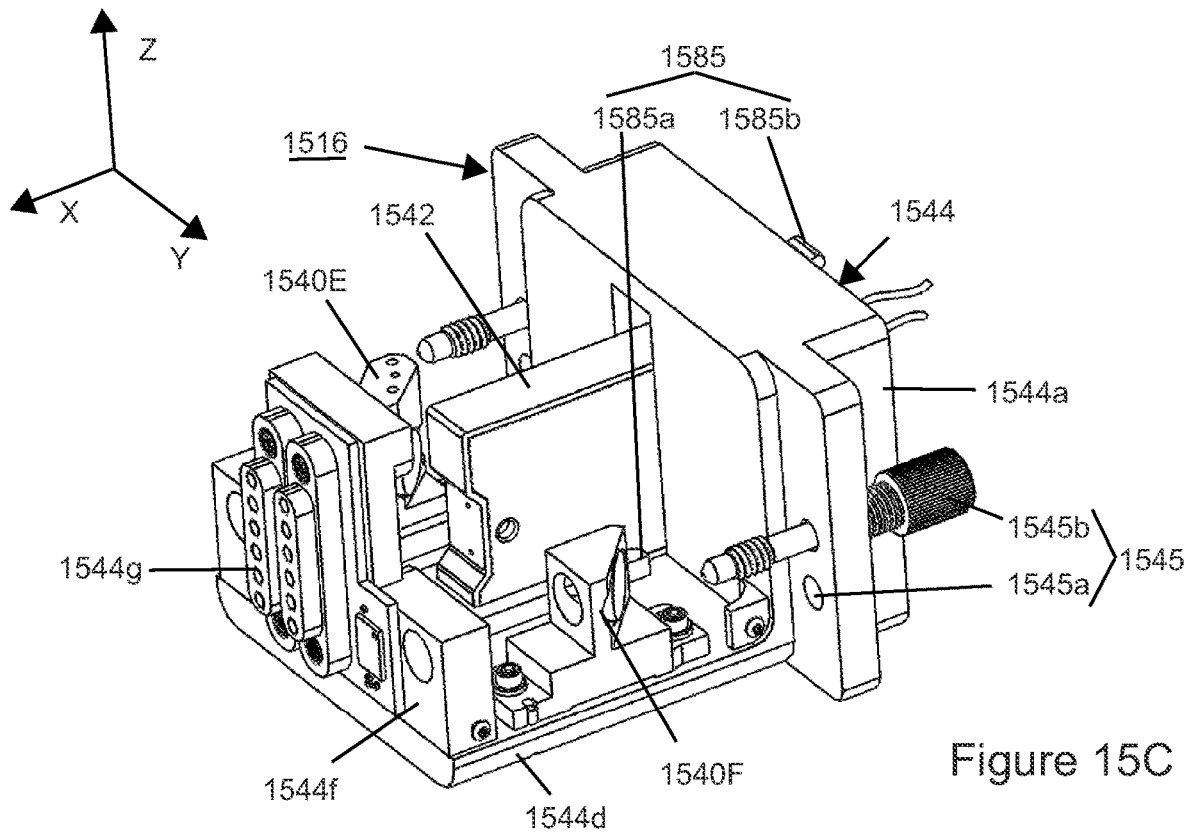
Figure 15D:
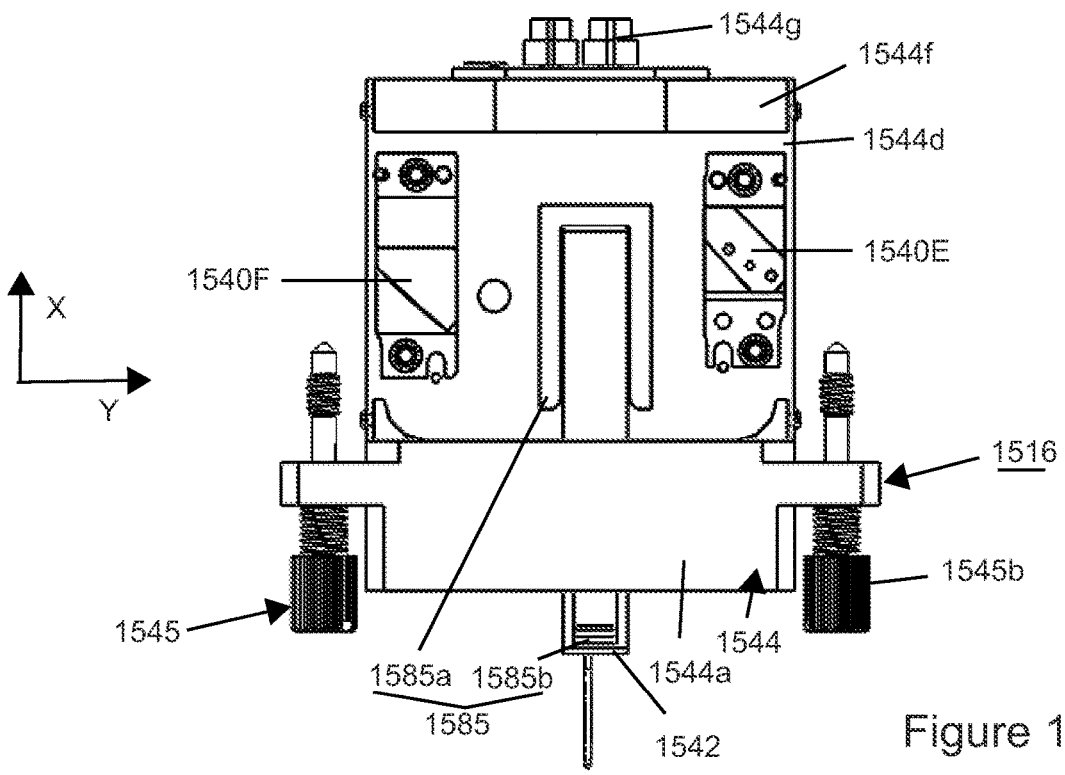
FIG. 15D is a top view of the portion of the test cell module of FIGS. 15A-15C.

FIGS. 15A-15C are alternative perspective views, and FIG. 15D is a top view of a portion of another implementation of the test cell module 1516. In this implementation, the test cell module 1516 is again designed to be used with the fluid analyzer 1014 illustrated in FIGS. 13A and 13B or any of the other fluid analyzer. In this design, the test cell module 1516 is again designed to be selectively inserted into and removed out of the module receiver 1384A (illustrated in FIGS. 13A, 13B) of the analyzer frame 1036 (illustrated in FIGS. 13A, 13B). Additionally, in this embodiment, a first coupler assembly 1545 allows the test cell module 1516 to be selectively coupled to the analyzer frame 1036 in a repeatable fashion, and selectively uncoupled and moved relative to the analyzer frame 1036. The design of the first coupler assembly 1545 can be similar to the corresponding coupler assembly 1345 described above. More specifically, in this design, the first coupler assembly 1545 includes (i) a first alignment assembly 1545a that is similar to the corresponding alignment assembly 1345a described in reference to FIGS. 13A-13H; and (ii) a first fastener assembly 1545b that is similar to the corresponding fastener assembly 1345b described in reference to FIGS. 13A-13H that cooperate to selectively couple the test cell module 1516 to the analyzer frame 1036 in a repeatable fashion.

Further, the test cell module 1516 includes a module frame 1544 having (i) a front module panel 1544a; and (ii) a module base 1544d that are somewhat similar to the corresponding components described above with reference to FIG. 13E. However, in FIGS. 15A-15D, a module cover 1344e (illustrated in FIG. 13E) is not shown to expose the components secured to the module base 1544d.

More specifically, in this embodiment, the test cell module 1516 also includes the splitter element 1540E, the third director 1540F, and the test cell assembly 1542. In this implementation, the splitter element 1540E and the third director 1540F are coupled (e.g. fixedly secured) to the module base 1544d and are somewhat similar to the corresponding components described above. However, in this implementation, the test cell assembly 1542 is removably coupled to the module base 1544d with a second coupler assembly 1585 in a repeatable fashion.

The design of the second coupler assembly 1585 can be varied. In one non-exclusive implementation, the second coupler assembly 1585 includes (i) a second alignment assembly 1585a that aligns the test cell assembly 1542 to the module frame 1544; and (ii) a second fastener assembly 1585b that fastens the test cell assembly 1542 to the module frame 1544 to the panel receiver 1384C. With this design, the coupler assembly 1585 aligns and secures the test cell assembly 1542 to the module frame 1544 about three axes (about the X, Y, and Z axes) and along three axes (along the X, Y, and Z axes).

Additionally, the module frame 1544 includes a module back panel 1544*f* that includes a module electrical connector 1544*g* that is similar to the corresponding component described above in reference to FIGS. 14A-14D.

With the design illustrated in FIGS. 15A-15D, (i) the test cell module 1516 (including the test cell assembly 1542) is selectively and repeatable attached to the analyzer frame 1036 with the first coupler assembly 1545; and (ii) the test cell assembly 1542 is selectively and repeatably attached to the module base 1544*d* and the analyzer frame 1036 with the second coupler assembly 1585 without adversely influencing the other components on the test cell module 1516. It should be noted that (i) the test cell module 1516 and/or the test cell assembly 1542 can be referred to as a first module, a second module or just a module; (ii) the first coupler assembly 1545 and/or the second coupler assembly 1585 can be referred to as the first coupler assembly, the second coupler assembly, or just the coupler assembly; (iii) the first alignment assembly 1545*a* and/or the second alignment assembly 1585*a* can be referred to as the first alignment assembly, the second alignment assembly, or just an alignment assembly; and/or (iv) the first fastener assembly 1545*a* and/or the second fastener assembly 1585*b* can be referred to as the first fastener assembly, the fastener alignment assembly, or just a fastener assembly Additionally, it should be noted that the fluid analyzer 1014 (illustrated in FIG. 13A) could be designed so that the test cell assembly 1542 is selectively and repeatably attached directly to the analyzer frame 1036 (w/o the removable test cell module 1516). In this design, only the test cell assembly 1542 is selectively and repeatably attached to the analyzer frame 1036.

Figure 15E:
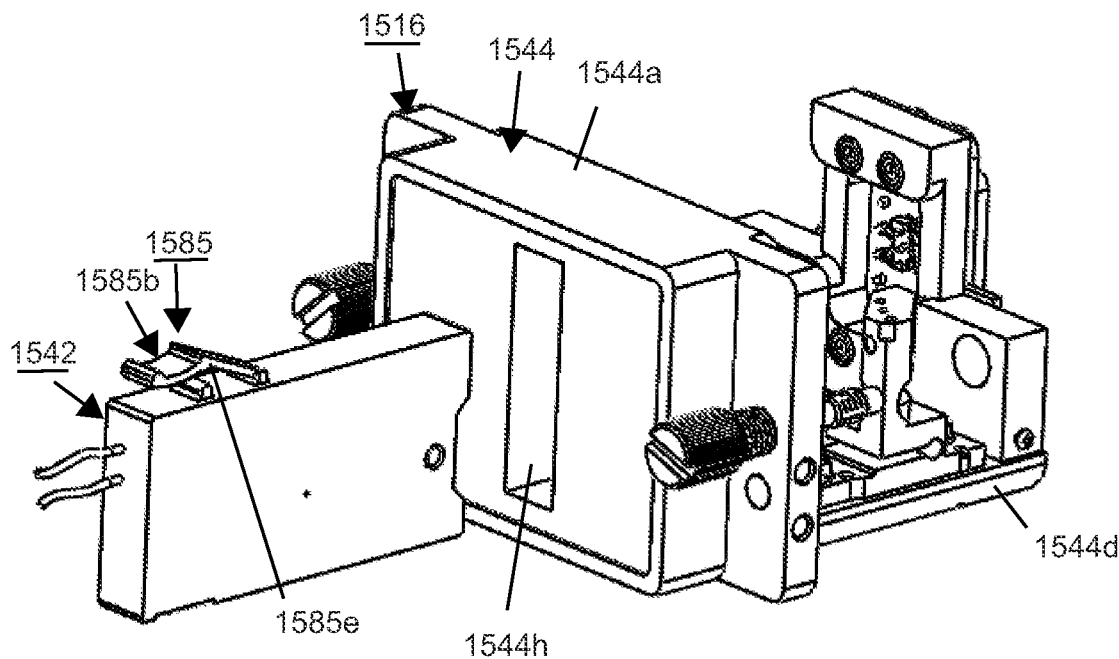
FIGS. 15E-15G are alternative, partly exploded perspective views of the test cell module of FIGS. 15A-15C.
Figure 15F:
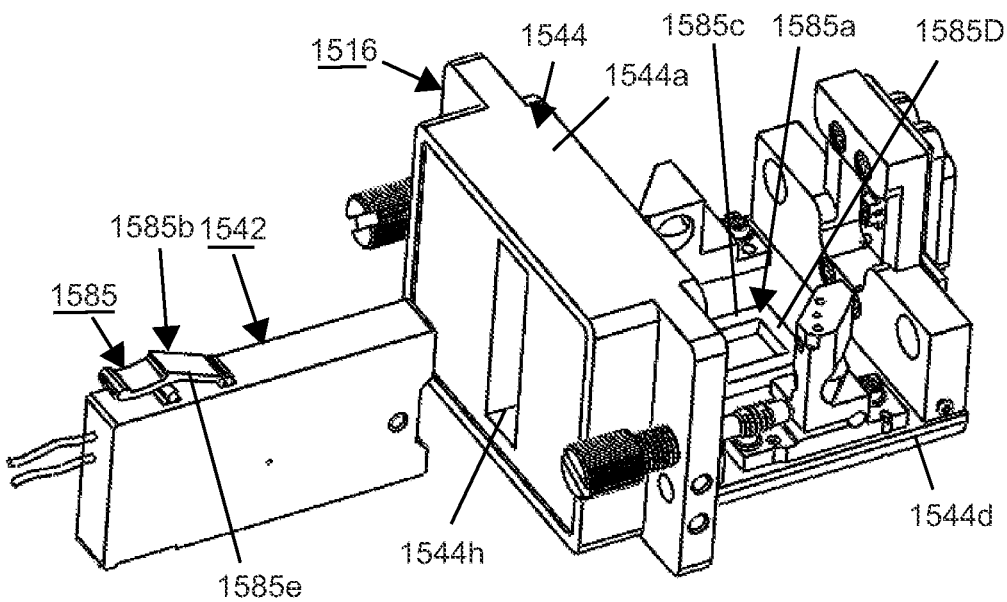
Figure 15G:
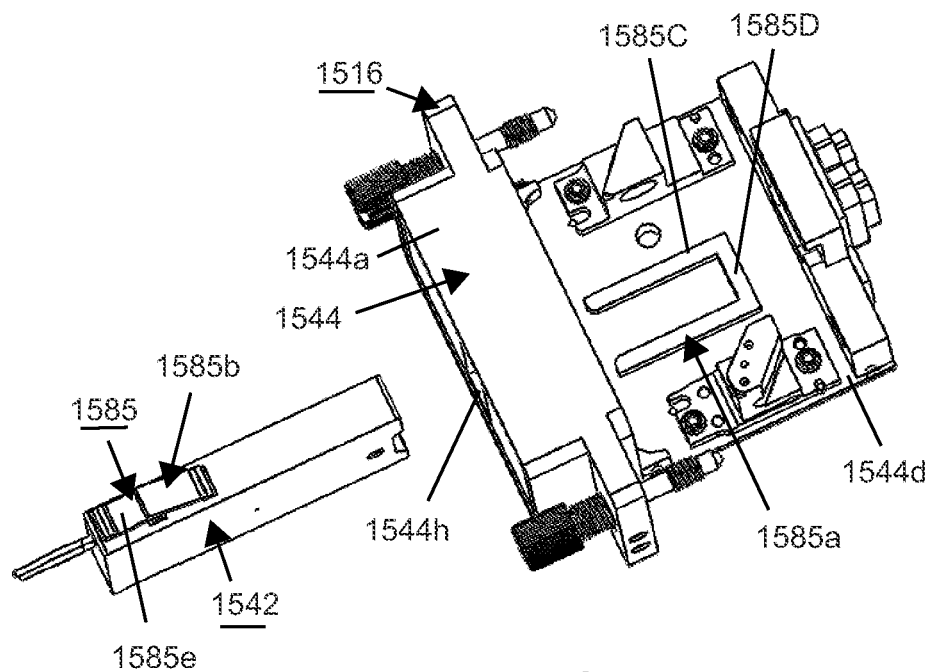
Figure 15H:
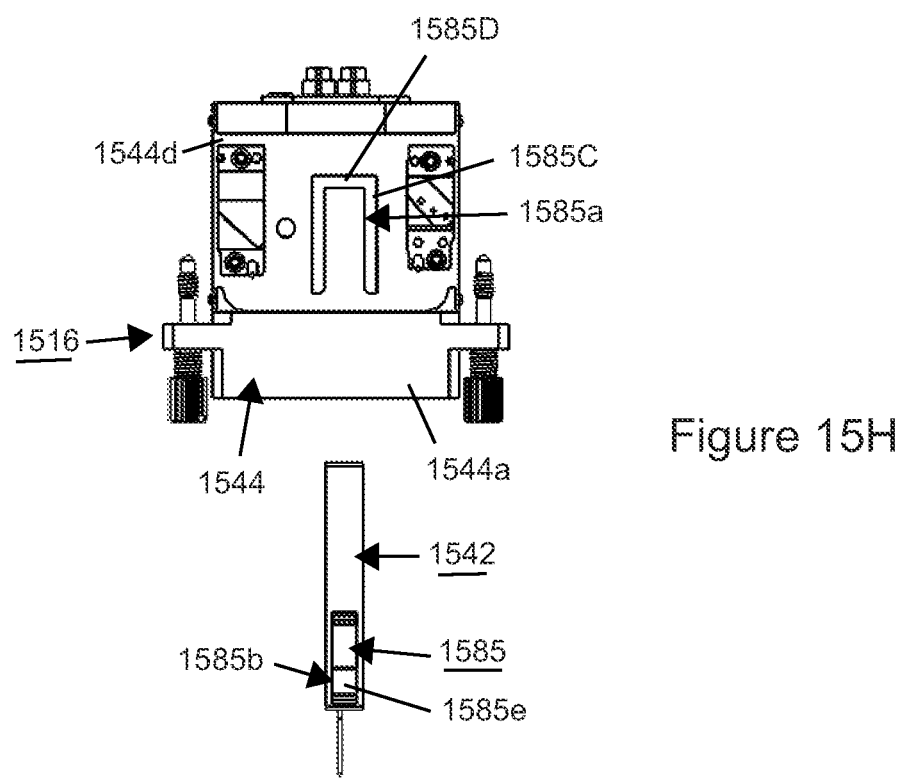
FIG. 15H is a top, exploded view of the test cell module of FIGS. 15A-15C.

FIGS. 15E-15G are alternative, partly exploded perspective views of the test cell module 1516 of FIGS. 15A-15C. In this implementation, the test cell assembly 1542 is illustrated away from the module frame 1544, and the second coupler assembly 1585 allows the test cell module 1516 to be selectively coupled to the module frame 1544 and the analyzer frame 1036 (illustrated in FIG. 13A) in a repeatable fashion, and selectively uncoupled and moved relative to the module frame 1544 and the analyzer frame 1036.

In one, non-exclusive implementation, the front module panel 1544*a* includes a panel aperture 1544*h* that is sized and shaped to receive the test cell assembly 1542 so that the test cell assembly 1542 can be inserted (at least partly) through the front module panel 1544*a* into the chamber formed by the analyzer frame 1036. Thus, the size and shape of the panel aperture 1544*h* will depend upon the design of the test cell assembly 1542. In FIGS. 15E-15G, the test cell assembly 1542 is generally rectangular shaped and the panel aperture 1544*h* is a rectangular shaped opening.

The design of the second alignment assembly 1585*a*, and the fastener assembly 1585*b* can be varied. In the non-exclusive implementation illustrated in FIGS. 15E-15G, (i) the second alignment assembly 1585*a* includes a rectangular "U" shaped guide frame having a pair of spaced apart sides 1585C and a back 1585D that is secured to the module base 1544*d*; and (ii) the fastener assembly 1585*b* includes a flexible, deflectable tab 1585*e* that selectively engages the front module panel 1544*a*. In this design, as the test cell assembly 1542 is inserted into the panel aperture 1544*h*, the sides 1585C of the second alignment assembly 1585*a* engage the sides of the test cell assembly 1542 to align the test cell assembly 1542 relative to the module base 1544*d*. Further, the test cell assembly 1542 is inserted until the test cell assembly 1542 engages the back 1585D of the second alignment assembly 1585*a*.

Moreover, when the test cell assembly 1542 is fully inserted, the deflectable tab 1585*e* of the fastener assembly 1585*b* engages the front module panel 1544*a* to fasten the test cell assembly 1542. In this embodiment, the deflectable tab 1585*e* cantilevers upward to engage the front module panel 1544*a*.

Figure 16A:
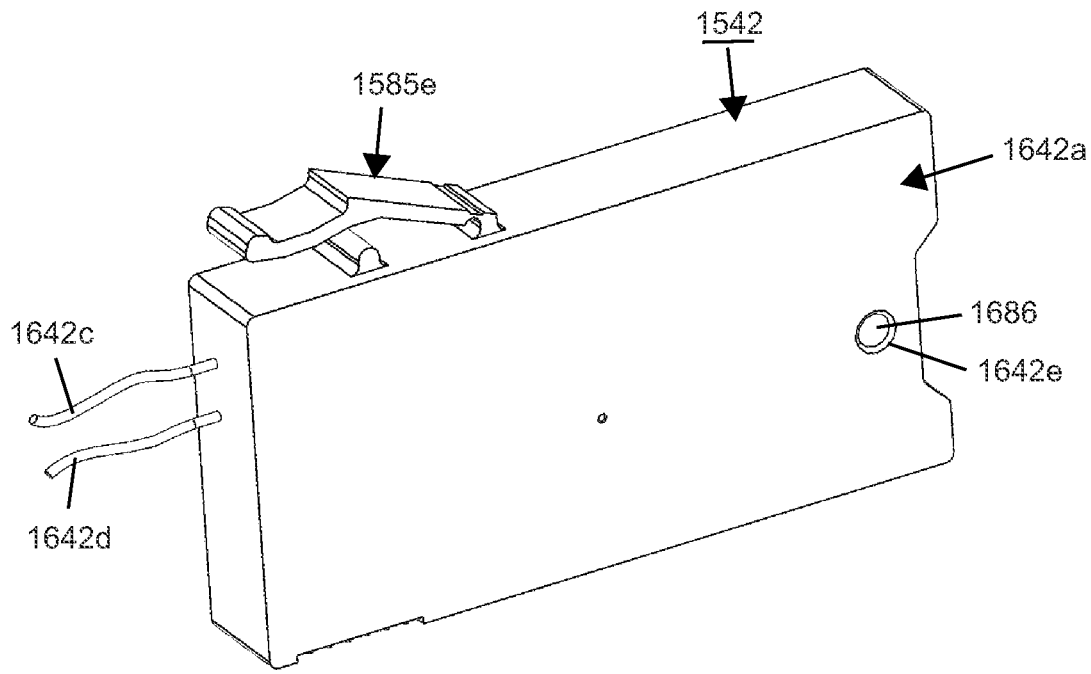
FIGS. 16A and 16B are alternative, perspective view of a test cell assembly of FIGS. 15A-15H
Figure 16B:
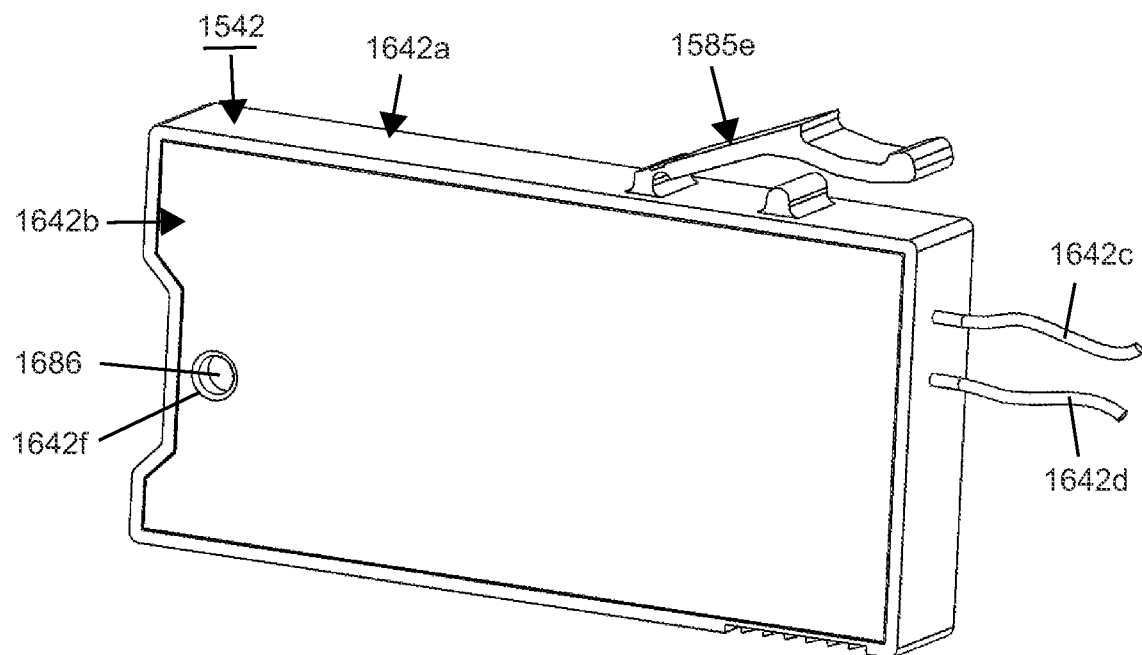

FIGS. 16A and 16B are alternative, perspective views of the test cell assembly 1542 and the deflectable tab 1585*e* of FIGS. 15A-15H. In this embodiment, the test cell assembly 1542 includes (i) a generally rectangular box shaped assembly frame 1642*a*; (ii) a rectangular plate shaped assembly cover 1642*b*; (iii) a sample inlet conduit 1642*c*; (iv) a sample outlet conduit 1642*d*; and (v) a test cell 1686.

In this non-exclusive design, (i) the assembly frame 1642*a* and the assembly cover 1642*b* cooperate to enclose and retain the test cell 1686; (ii) the assembly frame 1642*a* includes an inlet aperture 1642*e* to the test cell 1686 that allows the split laser beam 239C (illustrated in FIG. 2A) to reach the test cell 1686; (iii) the assembly cover 1642*b* includes an outlet aperture 1642*f* to the test cell 1686 that allows the test signal light 239B (illustrated in FIG. 2A) to exit the test cell 1686; (iv) the conduits 1642*c*, 1642*d* are in fluid communication with the test cell 1686; (v) the deflectable tab 1585*e* cantilevers upward from the assembly frame 1642*a*; and (vi) the deflectable tab 1585*e* defines a tab slot 1685 that selectively engages the front module panel 1544*a* (illustrated in FIG. 15H). With this design, the deflectable tab 1585*e* is bias upwards (away from the assembly frame 1642*a*) to engage the front module panel 1544*a*, and the deflectable tab 1585*e* can be bent towards the assembly frame 1642*a* to disengage the deflectable tab 1585*e* from the front module panel 1544*a*.

Figure 16C:
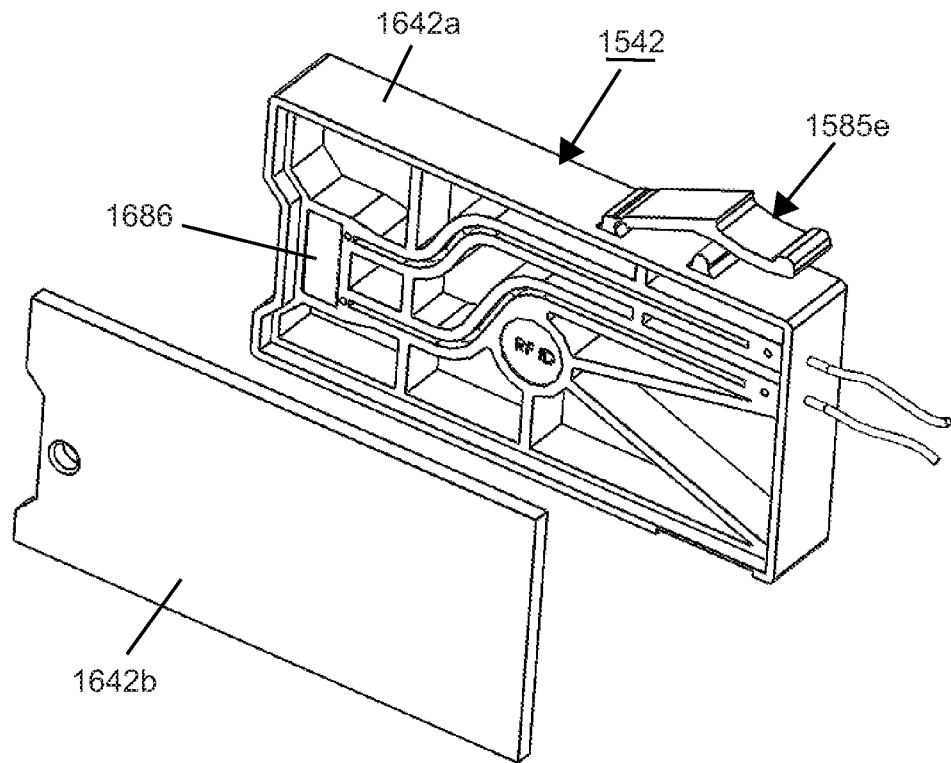
FIG. 16C is a partly exploded, perspective view of the test cell assembly of FIGS. 16A and 16B.

FIG. 16C is a partly exploded, perspective view of the test cell assembly 1542 and the deflectable tab 1585*e* of FIGS. 16A and 16B. More specifically, in FIG. 16C, the assembly cover 1642*b* is illustrated spaced apart from the assembly body 1642*a* to fully expose the test cell 1686. As non-exclusive examples, the assembly cover 1642*b* can be secured to the assembly body 1642*a* with an adhesive, a weld, a gasket, or in another fashion.

Figure 16D:
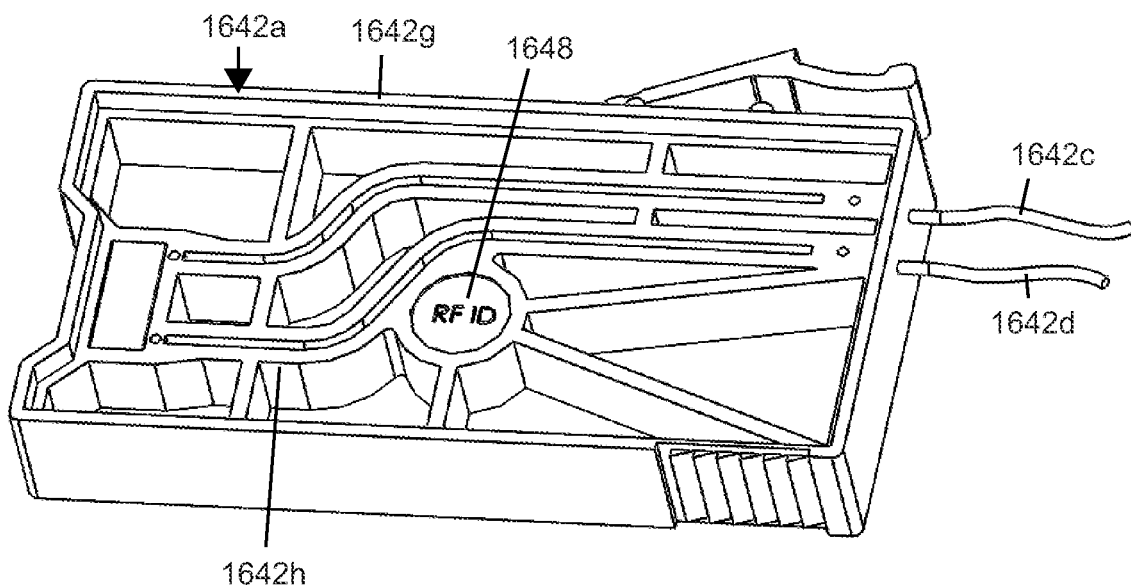
FIG. 16D is a perspective view of a portion of the test cell assembly of FIGS. 16A-16C.

FIG. 16D is a perspective view of the assembly body 1642*a*. In this embodiment, the assembly body 1642*a* includes a rectangular shaped outer frame 1642*g* and a plurality of internal ribs 1642*h*. Further, the inlet conduit 1642*c* and the outlet conduit 1642*d* are each formed within a separate internal rib 1642*h*. With this design, the conduits 1642*c*, 1642*d* extend from outside the assembly body 1642*a* to inside the assembly 1642*a* to be in fluid communication with the test cell 1686.

Additionally, the assembly body 1642*a* can include an identifying label 1648 that is similar to the corresponding component described above.

Figure 16E:
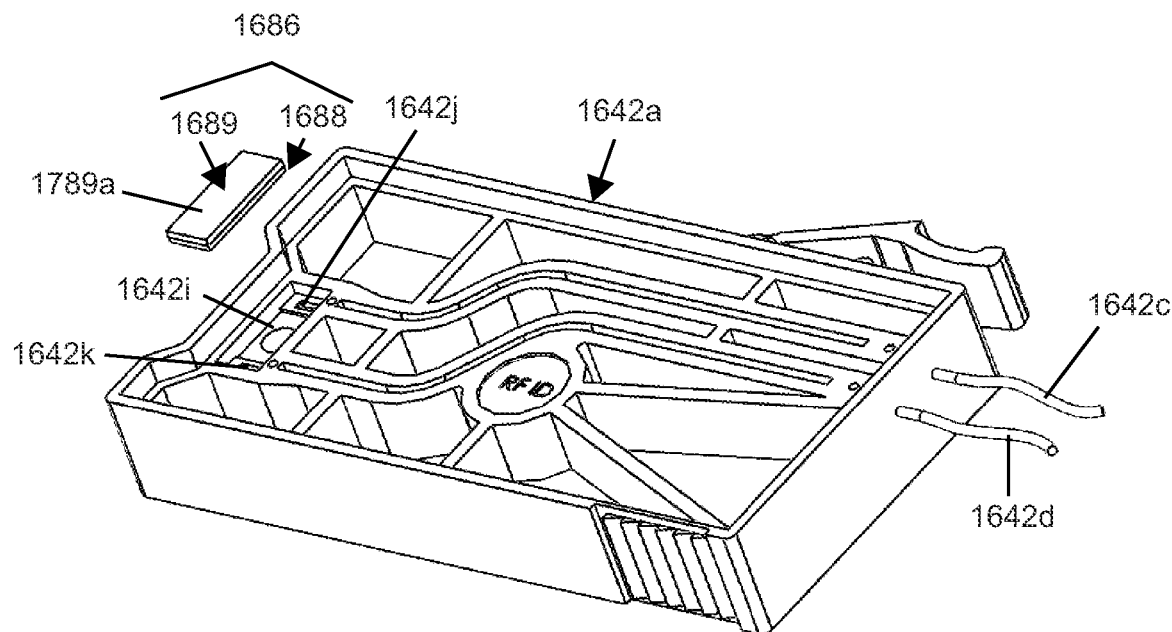
FIGS. 16E and 16F are alternative, partly exploded, perspective views of the portion of the test cell assembly of FIG. 16D.
Figure 16F:
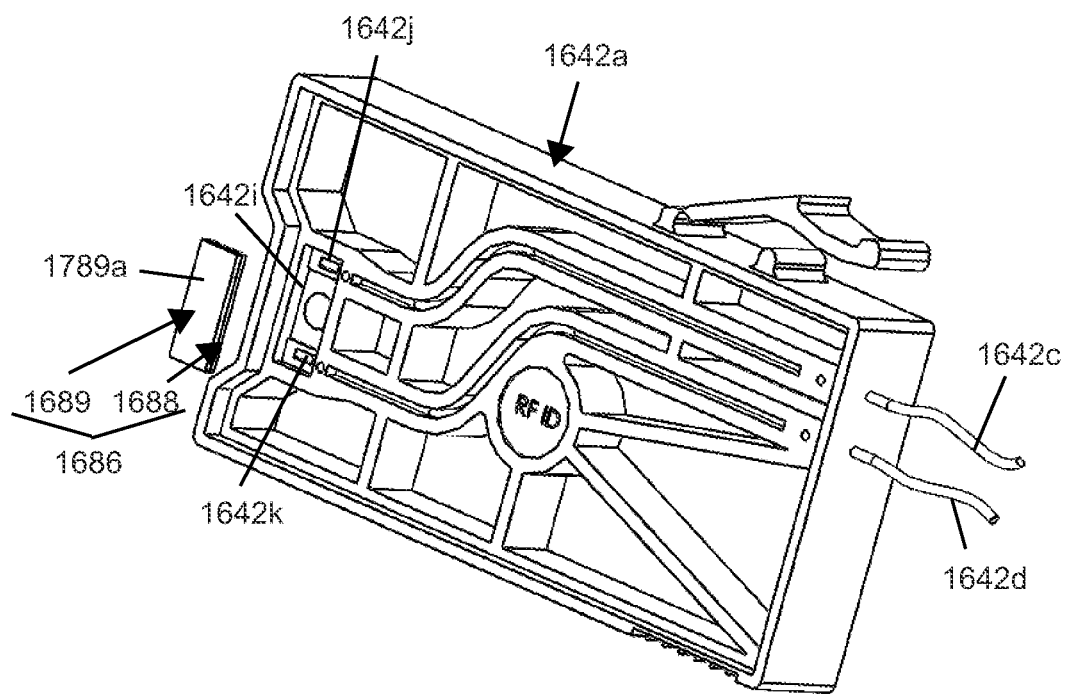

FIGS. 16E and 16F are alternative, partly exploded, perspective views of the portion of the assembly body 1642*a* of FIG. 16D with the test cell 1686 positioned away from the assembly body 1642*a*. In this design, the assembly body 1642*a* defines rectangular shape channel 1642*i*. Further, (i) the inlet conduit 1642*c* includes a rectangular shaped outlet 1642*j* that directs the sample 12 (illustrated in FIG. 1A) to the test cell 1686; and (ii) the outlet conduit 1642*d* includes a rectangular shaped inlet 1642*k* that receives the sample 12 from the test cell 1686. Alternatively, the outlet 1642*j* and the inlet 1642*k* can have a different configuration.

The design of the test cell 1686 can be varied. In one implementation, the test cell 1686 includes a cap section 1688 and a base section 1689 that are secured together. In this non-exclusive design, the test cell 1686 is generally rectangular box shaped, and each section 1688, 1689 is generally rectangular plate shaped. It should noted that each section 1688, 1689 can alternatively be referred to as a first section or a second section.

Figure 17A:
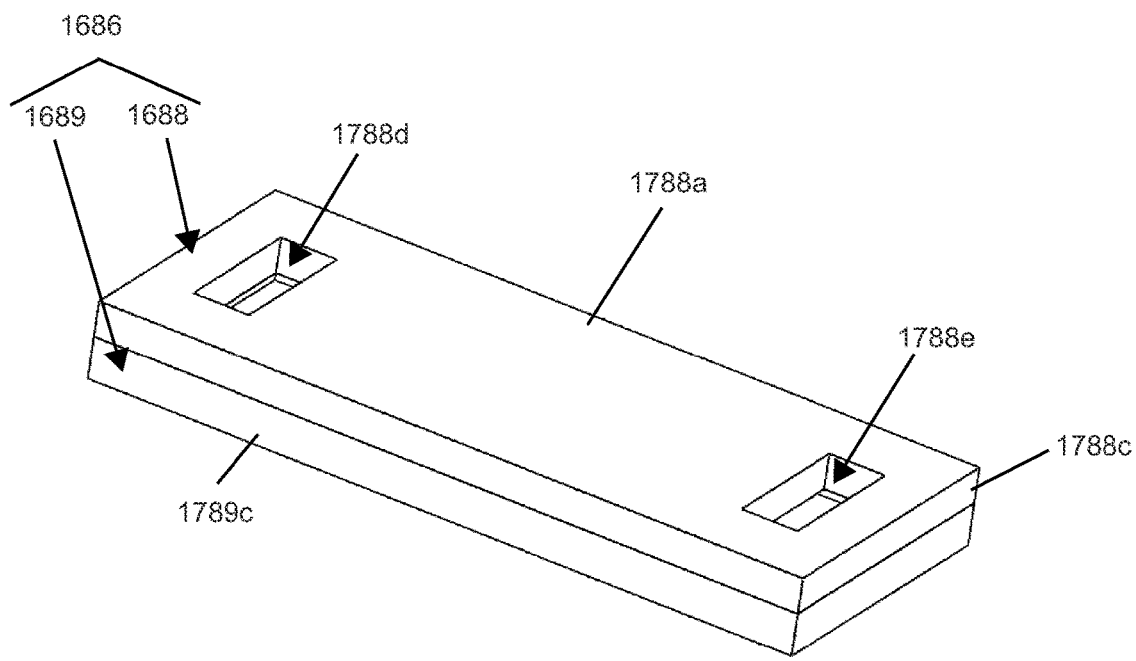
FIG. 17A is a perspective view of a test cell from FIGS. 16D-16F.
Figure 17B:
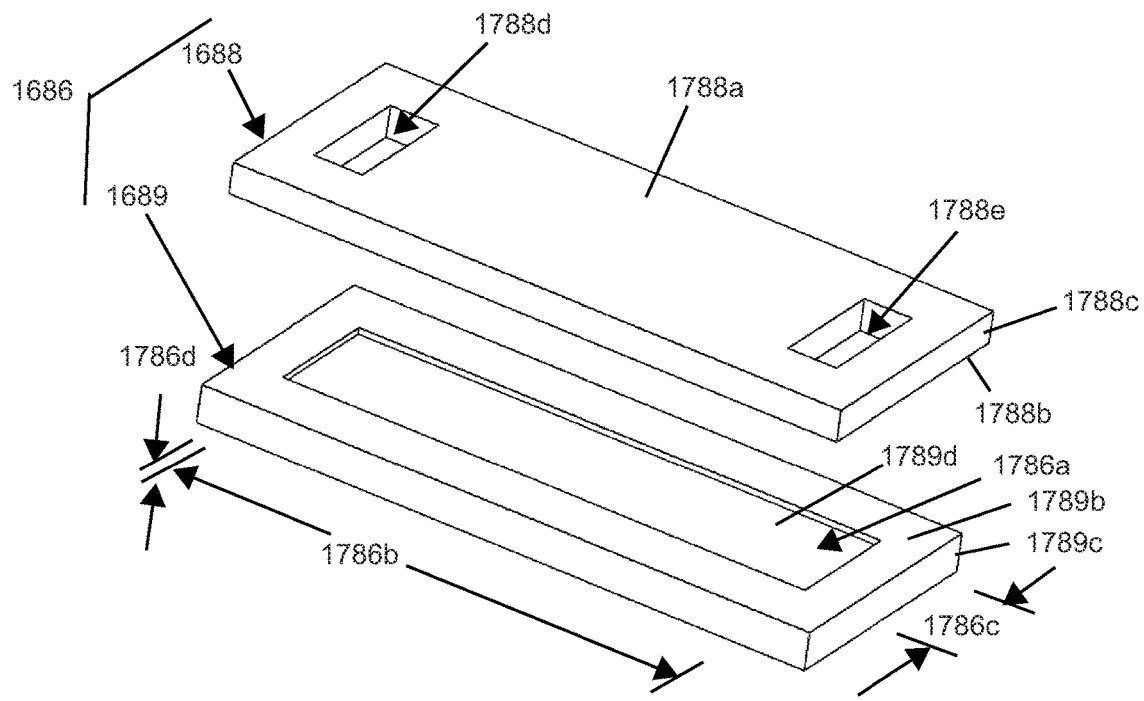
FIG. 17B is an exploded perspective view of the test cell of FIG. 17A.

FIG. 17A is a perspective view and FIG. 17B is an exploded perspective view of the test cell 1686 from FIGS. 16D-16F including the cap section 1688 and the base section 1689. In this embodiment, the cap section 1688 and the base section 1689 cooperate to define the test cell chamber 1786*a* that receives the sample 12 (illustrated in FIG. 1A) while it is being analyzed. The size, shape and design of the cap section 1688 and the base section 1689 can be varied to vary the size, shape and design of the test cell chamber 1786*a*.

In one design, the cap section 1688 is rigid, rectangular shaped and includes (i) an outer side 1788*a* that engages the assembly body 1642*a*; (ii) an inner side 1788*b* that is opposite to the outer side 1788*a*; and (iii) four side walls 1788*c* that extend between the outer side 1788*a* and the inner side 1788*c*. In this design, the outer side 1788*a*, the inner side 1788*b*, and each side wall 1788*c* are rectangular plate shaped. Further, the cap section 1688 includes a chamber inlet 1788*d* to the test cell chamber 1786*a*, and a chamber outlet 1788*e* from the test cell chamber 1786*a*. In this design, the chamber inlet 1788*d* and the chamber outlet 1788*e* each extend through the cap section 1688 from the outer side 1788*a* to the inner side 1788*b*. Further, (i) the cap section 1688 is secured to the assembly body 1642*a*; (ii) the chamber inlet 1788*d* is sealed to the outlet 1642*j* (illustrated in FIGS. 16E, 16F) of the inlet conduit 1642*c* (illustrated in FIGS. 16E, 16F) so that the sample 12 (illustrated in FIG. 1A) can be delivered to the test cell chamber 1786*a*; and (iii) the chamber outlet 1788*e* is sealed to the inlet 1642*k* (illustrated in FIGS. 16E, 16F) of the outlet conduit 1642*d* (illustrated in FIGS. 16E, 16F) so that the sample 12 can exit the test cell chamber 1786*a*. As non-exclusive examples, the cap section 1688 can be secured and sealed to the assembly body 1642*a* with an adhesive, a weld or in another fashion.

Further, in one example, the base section 1689 is rigid, rectangular shaped and includes (i) an outer side 1789*a* (illustrated in FIGS. 16E and 16F) that faces the assembly cover 1642*b* (illustrated in FIG. 16C); (ii) an inner side 1789*b* that is opposite to the outer side 1789*a*; and (iii) four side walls 1789*c* that extend between the outer side 1789*a* and the inner side 1789*c*. In this design, (i) the outer side 1788*a*, and each side wall 1788*c* are rectangular plate shaped; (ii) the inner side 1789*b* includes a slot 1789*d* (e.g. a cut-out); and (iii) the inner side 1789*b* of the base cell section 1689 is fixedly secured and sealed to the inner side 1788*b* of the cap cell section 1688 to form the test cell chamber 1786*a*. As non-exclusive examples, the cap cell section 1688 can be secured and sealed to the base cell section 1689 with an adhesive, a weld or in another fashion.

In one embodiment, each cell section 1688, 1689 is made of a material that is transmissive to the wavelengths of the output laser beam 249A (illustrated in FIG. 2A). As non-exclusive examples, each cell section 1688, 1689 can be of mid-infrared transmissive materials, such as diamond, calcium fluoride, zinc selenide, or Germanium. Alternatively, each cell section 1688, 1689 can be made of a non-transmissive material, but can include windows (not shown) that are transmissive to the wavelengths of the output laser beam 249A.

With the design in FIGS. 17A and 17B, the size and shape of the slot 1789*d* sets the size and shape of the test cell chamber 1786*a*. Thus, the slot 1789*d* can be precisely formed in the cap cell section 1688 to precisely form the test cell chamber 1786*a*. In alternative, non-exclusive implementations, the slot 1789*d* can be generally rectangular shaped, and the test cell chamber 1786*a* can be generally rectangular shaped. Further, as non-exclusive examples, the test cell chamber 1786*a* can have a chamber cross-section area measured orthogonal to the flow path of approximately 0.05, 0.08, 0.1, 0.15, 0.2, or 0.3 millimeters squared.

Further, in alternative, non-exclusive implementations, the test cell chamber 1786*a* can have (i) a cell length 1786*b* of approximately three, four, five, six, seven, eight, nine, ten, or twelve millimeters; (ii) a cell width 1786*c* of approximately 0.5, 1, 1.5, 2, 2.5, or 3 millimeters; and (iii) a cell thickness 1786*d* of approximately 0.01, 0.025, 0.05, 0.075, 0.1, 0.125, 0.15, 0.2, 0.5, 1.0, 1.5, 2, 2.2, 2.4, 2.5, or 3 millimeters. In one specific, non-exclusive example, the test cell chamber 1786*a* has a cell length 1786*b* of approximately 4.75 millimeters; a cell width 1786*c* of approximately 1.01 millimeters; and a cell thickness 1786*d* of approximately 0.15 millimeters. Alternatively, (i) one or more of the cell length 1786*b*, the cell width 1786*c*, and the cell thickness 1786*d* can be adjusted to achieve the desired volume, cross-sectional area, and path length of the test cell chamber 1786*a*.

It should be noted that the cell thickness 1786*d* defines the path length through the test cell chamber 1786*a*. Stated in another fashion, the path length of the illumination beam through the test cell chamber 1786*a* is defined by the depth of the slot 1789*d*. Thus, the depth of the slot 1789*d* can be adjusted to adjust the path length.

The size, shape, and design of the chamber inlet 1788*d* and the chamber outlet 1788*e* can be varied to match the size, shape, and design of the test cell chamber 1786*a*. In FIGS. 17A and 17B, the chamber inlet 1788*d* and the chamber outlet 1788*e* are each rectangular shaped. In one embodiment, (i) the chamber inlet 1788*d* has an inlet cross-sectional area; and (ii) the chamber outlet 1788*e* has an outlet cross-sectional area. In one embodiment, the chamber cross-sectional area is approximately equal to one or more (e.g. all) of (i) the inlet cross-sectional area; and (ii) the outlet cross-sectional area. In alternative, non-exclusive examples, the chamber cross-sectional area is within approximately 1, 2, 5, 10, 20, 25, 50, 75, 100, 200, or 500 percent, of one or more (e.g. all) of (i) the inlet cross-sectional area; and (ii) the outlet cross-sectional area. This minimizes dead volume and mixing of the sample 12 during the analysis in the test cell chamber 1786*a*.

Figure 18:
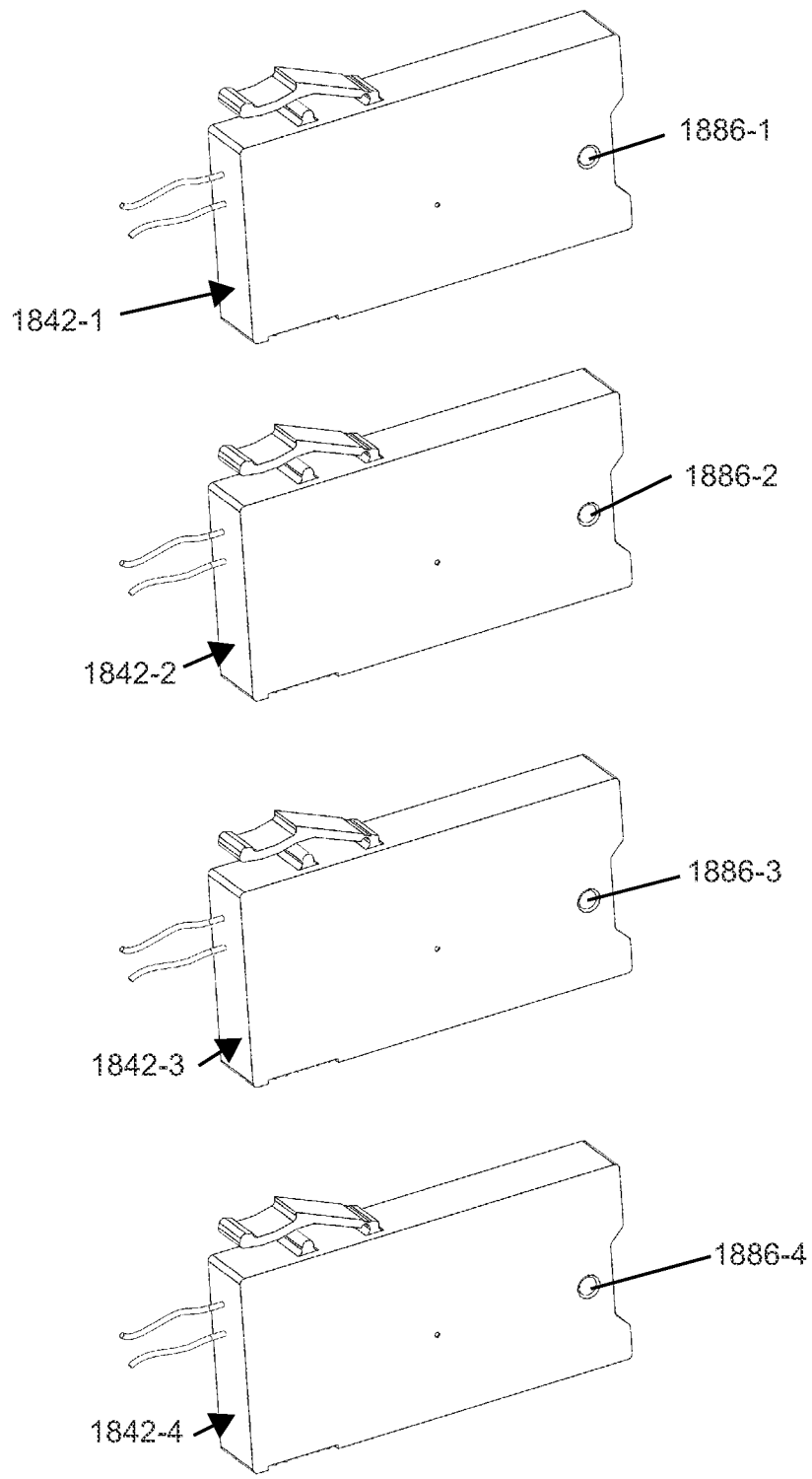
FIG. 18 is a perspective view of a plurality of alternative test cell assemblies.

FIG. 18 is a perspective view of a plurality of alternative test cell assemblies, namely a first test cell assembly 1842-1, a second test cell assembly 1842-2, a third test cell assembly 1842-3, and a fourth test cell assembly 1842-4 that are similar to the test cell assembly 1542 described above and illustrated in FIG. 16A. In one implementation, (i) the first test cell assembly 1842-1 has a test cell 1886-1 having a first path length; (ii) the second test cell assembly 1842-2 has a test cell 1886-2 having a second path length that is different from the first path length; (iii) the third test cell assembly 1842-3 having a third test cell 1886-3 having a third path length that is different from the first path length and the second path length; and (iii) the fourth test cell assembly 1842-4 having a fourth test cell 1886-4 having a fourth path length that is different from the first path length, the second path length, the third path length. With this design, the test cell assembly 1842-1-1842-4 with the desired path length can be easily swapped (by the end user) into the fluid analyzer 1014 in a repeatable fashion without moving any of the other components in the fluid analyzer 1014. Stated in another fashion, with this design, a path length of the fluid analyzer 1014 can be changed by changing the test cell assembly 1842-1-1842-4. It should be noted more than four or fewer that four alternative test cell assemblies test cell assembly 1842-1-1842-4 can be utilized.

Further, with this design, the test cell assembly 1842-1-1842-4 can be easily replaced when it becomes dirty. As a result thereof, the test cell assembly 1842-1-1842-4 can be disposable. As used herein, "disposable" shall mean that the test cell assembly 1842-1-1842-4 can be used to analyze one or more samples, and it is thrown away when it becomes fouled. As provided above each of the test cell assembly 1842-1-1842-4 can include a separate identifying label (not shown in FIG. 18).

Figure 19:
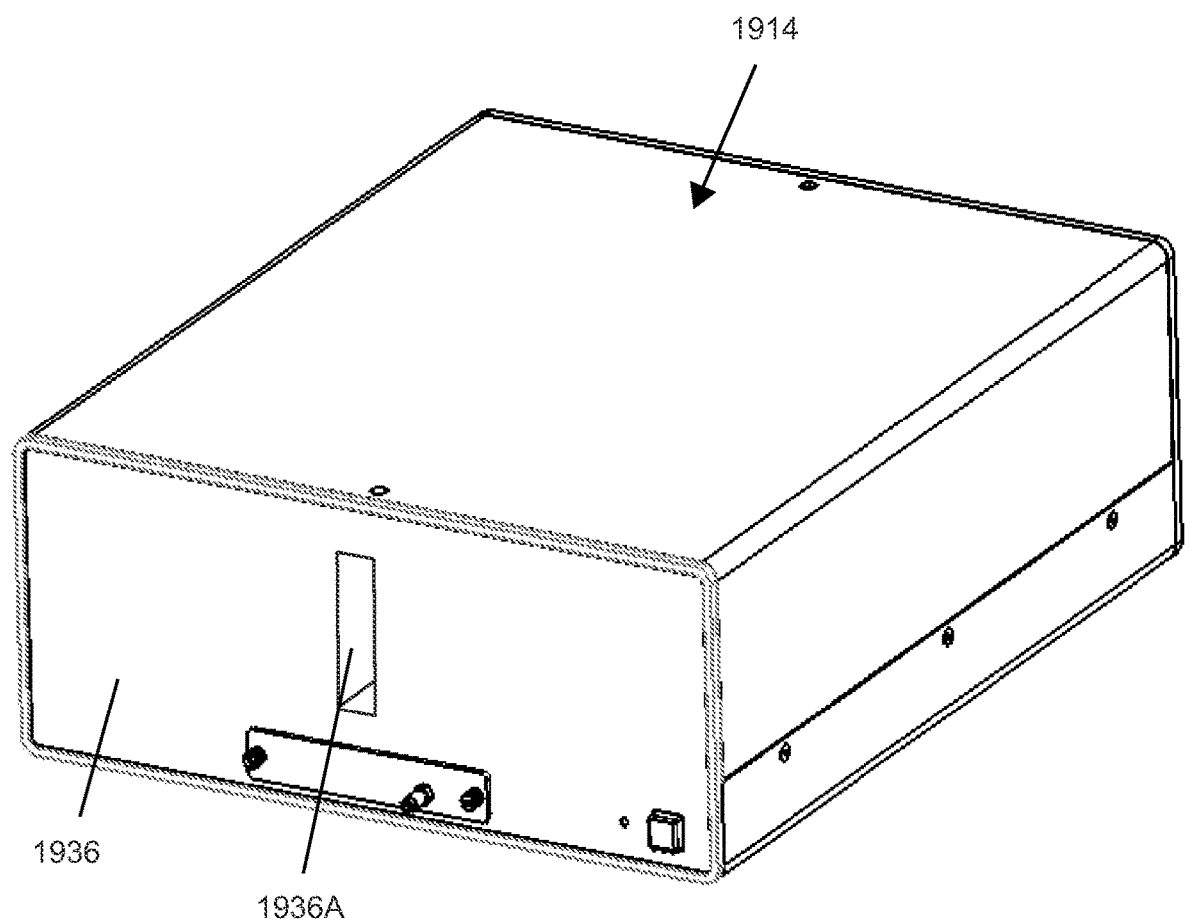
FIG. 19 is a perspective view of an alternative implementation of the fluid analyzer.

FIG. 19 is a perspective view of an alternative implementation of the fluid analyzer 1914, without the test cell assemblies 1842-1-1842-4 (illustrated in FIG. 18). In this design, the fluid analyzer 1914 is designed so that the test cell assembly 1842-1-1842-4 can be selectively and repeatably attached directly through a frame aperture 1936A in the analyzer frame 1936 (w/o the removable test cell module 1516). In this design, the test cell assembly 1842-1-1842-4 is selectively and repeatably attached to the analyzer frame 1936, without influencing the other components of the fluid analyzer 1914. Further the test cell assembly 1842-1-1842-4 can use a coupling assembly (not shown in FIG. 19) similar to that described above to precisely and repeatably align and secure the desired test cell assembly 1842-1-1842-4 to the analyzer frame 1914.

Figure 20:
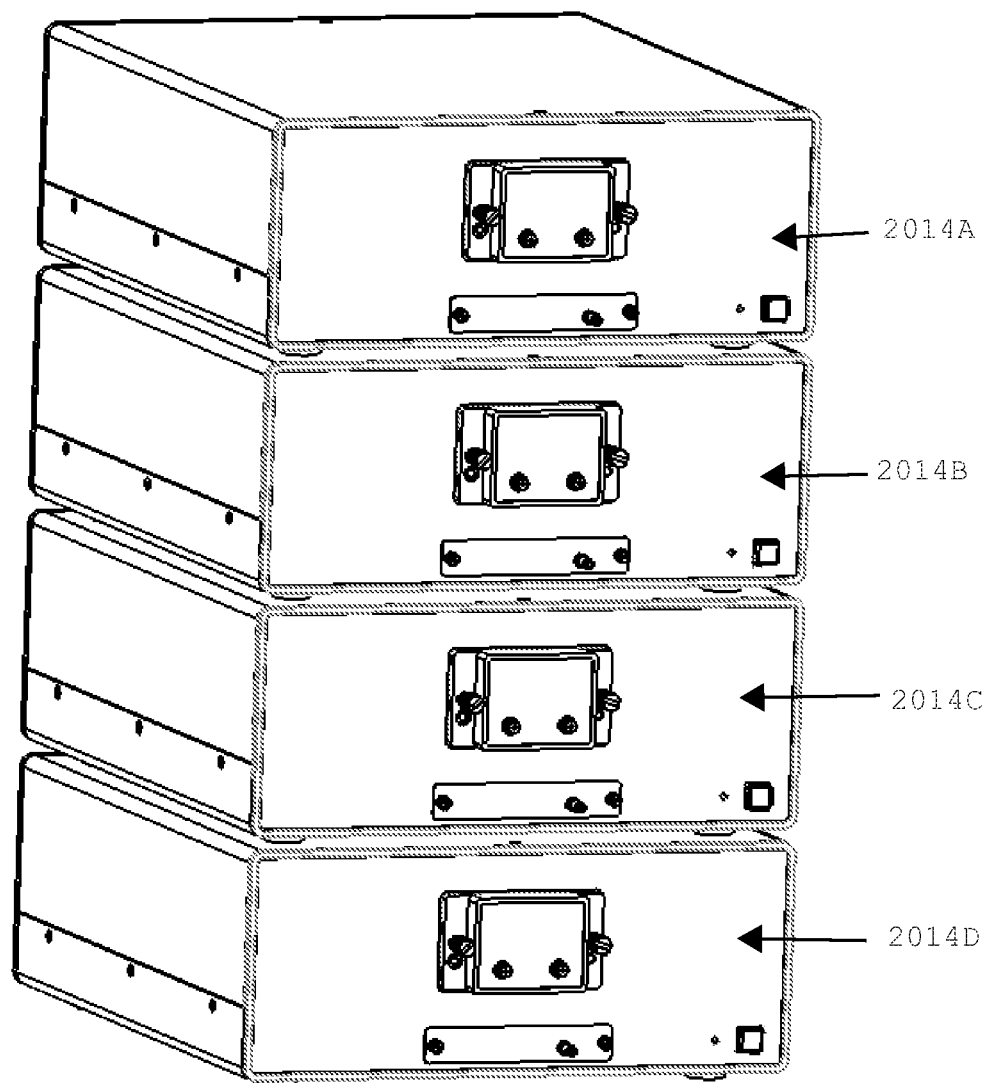
FIG. 20 is a perspective view of a plurality of analyzers.

FIG. 20 is a perspective view of a plurality of fluid analyzers 2014A-2014D (e.g. four) stacked. For convenience, moving from the top to bottom, the four fluid analyzers can be referred to as a first analyzer 2014A, a second fluid analyzer 2014B, a third fluid analyzer 2014C, and a fourth fluid analyzer 2014D. One or more of the fluid analyzers 2014A-2014D can be similar to the correspondingly named assembly described above.

With this design, the sample (not shown) can sequentially flow to each fluid analyzer 2014A-2014D. In this design, the sample can be sequentially analyzed by each fluid analyzer 2014A-2014D. For example, one or more of the fluid analyzer 2014A-2014D can analyze the sample at a different spectral range. It should be noted that the tubing required for the sequential flow is not shown in FIG. 20.

As non-exclusive examples, the fluid analyzer(s) disclosed herein allow for the simultaneous identification and quantitation (concentration) of many samples, including large and small molecules, intact or fractionated proteins, functionalized proteins, peptides, amino acids, saccharides, lipids, fats, nucleic acids, DNA and RNA chains, functionalized DNA and RNA chains, fermentation growth media, metabolites, simple sugars (e.g. glucose, maltose, fructose, etc), formulation buffers, salt buffers, sugar buffers, bodily fluids (e.g. blood serum, urine, sputum) over a wide range of pH conditions.

While the particular systems as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A fluid analyzer that analyzes a sample, the fluid analyzer comprising:
   a test cell assembly that receives the sample;
   a laser assembly that generates a tunable laser beam that is directed through the test cell assembly, the laser assembly being tunable over a tunable range; and
   a signal detector assembly that collects a test signal light transmitted through the test cell assembly, wherein a signal gain setting of the signal detector assembly is adjusted as the laser assembly is tuned over at least a portion of the tunable range.

2. The fluid analyzer of claim 1 further comprising a reference detector assembly; and a splitter element that splits a portion of the laser beam and directs the portion of laser beam at the reference detector assembly; wherein a reference gain setting of the reference detector assembly is adjusted as the laser is tuned over at least a portion of the tunable range.

3. The fluid analyzer of claim 2 wherein the reference gain setting of the reference detector assembly is adjusted as the laser is tuned over at least a portion of the tunable range as a function of the absorbance of the sample; and the signal gain setting of the signal detector assembly is adjusted as the laser is tuned over at least a portion of the tunable range as a function of the absorbance of the sample.

4. The fluid analyzer of claim 2 wherein the reference gain setting of the reference detector assembly is optimized for the magnitude of the light that is expected to be received by the reference detector assembly as the laser beam is tuned.

5. The fluid analyzer of claim 1 wherein the signal gain setting of the signal detector assembly is adjusted as the laser is tuned over at least a portion of the tunable range as a function of the absorbance of the sample.

6. The fluid analyzer of claim 1 wherein the signal gain setting of the signal detector assembly is optimized for the magnitude of the light that is expected to be received by the signal detector assembly as the laser beam is tuned.

7. The fluid analyzer of claim 1 further comprising a leak detection assembly that detects a leak in the test cell assembly.

8. The fluid analyzer of claim 7 wherein the leak detection assembly includes a reservoir that receives sample leaking from the test cell assembly and a leak sensor that detects when there is sufficient sample in the reservoir.

9. A method for analyzing a sample comprising:
   providing a test cell assembly that receives the sample;
   generating a tunable laser beam that is directed through the test cell assembly with a laser assembly that is tunable over a tunable range;
   collecting a test signal light transmitted through the test cell assembly with a signal detector assembly; and
   adjusting a signal gain setting of the signal detector assembly while the laser assembly is tuned over at least a portion of the tunable range and the test signal light is collected with the signal detector assembly.

10. The method of claim 9 further comprising providing a reference detector assembly; splitting a portion of the laser beam and directing the portion of laser beam at the reference detector assembly with a splitter element; and adjusting a reference gain setting of the reference detector assembly as the laser is tuned over at least a portion of the tunable range.

11. The method of claim 10 wherein adjusting a reference gain setting includes adjusting the reference gain setting as the laser is tuned over a portion of the tunable range as a function of the absorbance of the sample; and wherein the step of adjusting a signal gain setting includes adjusting the signal gain setting as the laser is tuned over at least a portion of the tunable range as a function of the absorbance of the sample.

12. The method of claim 10 wherein adjusting a reference gain setting of the reference detector assembly including adjusting to optimized for the magnitude of the light that is expected to be received by the reference detector assembly as the laser beam is tuned.

13. The method claim 9 wherein adjusting a signal gain setting includes adjusting the signal gain setting as the laser is tuned over at least a portion of the tunable range as a function of the absorbance of the sample.

14. The method of claim 9 wherein adjusting a signal gain setting includes optimizing the signal gain setting for the magnitude of the light that is expected to be received by the signal detector assembly as the laser beam is tuned.

15. The method of claim 9 further comprising detecting a leak in the test cell assembly with a leak detection assembly.

16. The method of claim 15 wherein detecting a leak includes receiving any sample leaking from the test cell assembly with a reservoir positioned below the test cell assembly, and detecting when there is sufficient sample in the reservoir with a leak sensor.

17. The method of claim 9 further comprising (i) providing a check frame; (ii) coupling a check substance to the check frame; and (iii) selectively moving the check frame between a self-check position and a test position relative to the analyzer frame with a check frame mover; wherein in the self-check position, the laser beam is directed through the check substance to create a check signal light that is collected by the signal detector assembly to evaluate the performance of the fluid analyzer; and wherein in the test position, the laser beam is directed through the sample in the test cell assembly to create a test signal light that is collected by the signal detector assembly to evaluate the sample.

18. The fluid analyzer of claim 1 comprising a self-check assembly that includes (i) a check frame; (ii) a check substance coupled to the check frame; and (iii) a check frame mover that selectively moves the check frame between a self-check position and a test position relative to the analyzer frame; wherein in the self-check position, the laser beam is directed through the check substance to create a check signal light that is collected by the signal detector assembly to evaluate the performance of the fluid analyzer; and wherein in the test position, the laser beam is directed through the sample in the test cell assembly to create a test signal light that is collected by the signal detector assembly to evaluate the sample.

* * * * *